(12) United States Patent
David et al.

(10) Patent No.: US 7,396,368 B2
(45) Date of Patent: *Jul. 8, 2008

(54) SYMMETRICAL DIAZO COMPOUNDS COMPRISING 4-PYRIDINIUM GROUPS AND A CATIONIC OR NON-CATIONIC LINKER, COMPOSITIONS COMPRISING THEM, METHOD FOR COLORING, AND DEVICE

(75) Inventors: Hervé David, La Varenne Saint Hilaire (FR); Andrew Greaves, Montevrain (FR); Nicolas Daubresse, La Celles St. Cloud (FR)

(73) Assignee: L'Oreal S.A., Paris (FR)

( * ) Notice: Subject to any disclaimer, the term of this patent is extended or adjusted under 35 U.S.C. 154(b) by 272 days.

This patent is subject to a terminal disclaimer.

(21) Appl. No.: 11/300,303

(22) Filed: Dec. 15, 2005

(65) Prior Publication Data

US 2006/0174422 A1 Aug. 10, 2006

Related U.S. Application Data

(60) Provisional application No. 60/681,448, filed on May 17, 2005.

(30) Foreign Application Priority Data

Dec. 15, 2004 (FR) .................................. 04 53008

(51) Int. Cl.
*A61Q 5/10* (2006.01)
*C09B 44/10* (2006.01)

(52) U.S. Cl. ........................ 8/405; 8/406; 8/435; 8/437; 8/569; 534/608

(58) Field of Classification Search ...................... 8/405, 8/406, 435, 437, 569; 546/249; 534/608
See application file for complete search history.

(56) References Cited

U.S. PATENT DOCUMENTS

| | | | |
|---|---|---|---|
| 3,151,106 A | 9/1964 | Tsang et al. | |
| RE30,199 E | 1/1980 | Rose et al. | |
| 4,557,732 A | 12/1985 | Hähnke et al. | |
| 4,823,985 A | 4/1989 | Grollier et al. | |
| 5,151,106 A | 9/1992 | Bhaumik et al. | |
| 5,380,340 A | 1/1995 | Neunhoeffer et al. | |
| 5,534,267 A | 7/1996 | Neunhoeffer et al. | |
| 5,663,366 A | 9/1997 | Neunhoeffer et al. | |
| 5,708,151 A | 1/1998 | Möckli | |
| 5,733,343 A | 3/1998 | Möckli | |
| 5,766,576 A | 6/1998 | Löwe et al. | |
| 5,792,221 A | 8/1998 | Lagrange et al. | |
| 5,852,179 A | 12/1998 | Dado | |
| 5,888,252 A | 3/1999 | Möckli | |
| 6,099,592 A | 8/2000 | Vidal et al. | |
| 6,099,593 A | 8/2000 | Terranova et al. | |
| 6,270,533 B1 | 8/2001 | Genet et al. | |
| 6,284,003 B1 | 9/2001 | Rose et al. | |
| 6,338,741 B1 | 1/2002 | Vidal et al. | |
| 6,645,258 B2 | 11/2003 | Vidal et al. | |
| 6,824,570 B2 | 11/2004 | Vidal et al. | |
| 6,881,230 B2 | 4/2005 | Vidal | |
| 6,884,265 B2 | 4/2005 | Vidal et al. | |
| 6,884,267 B2 | 4/2005 | Vidal et al. | |
| 6,893,471 B2 | 5/2005 | Vidal | |
| 7,001,436 B2 | 2/2006 | Vidal et al. | |
| 7,022,143 B2 | 4/2006 | Vidal et al. | |
| 7,247,713 B2 * | 7/2007 | David et al. | 534/608 |
| 7,288,639 B2 * | 10/2007 | David et al. | 534/608 |
| 2002/0050013 A1 | 5/2002 | Vidal et al. | |
| 2002/0095732 A1 | 7/2002 | Kravtchenko et al. | |
| 2002/0187435 A1 | 12/2002 | Manakli et al. | |
| 2003/0084516 A9 | 5/2003 | Kravtchenko et al. | |
| 2003/0106169 A1 | 6/2003 | Vidal et al. | |
| 2004/0093675 A1 | 5/2004 | Vidal et al. | |
| 2004/0093676 A1 | 5/2004 | Vidal et al. | |
| 2004/0107513 A1 | 6/2004 | Vidal et al. | |
| 2004/0127692 A1 | 7/2004 | David et al. | |
| 2004/0143911 A1 | 7/2004 | Vidal | |
| 2004/0168263 A1 | 9/2004 | Vidal | |
| 2004/0187225 A1 | 9/2004 | Vidal et al. | |

(Continued)

FOREIGN PATENT DOCUMENTS

DE 23 59 399 A1 6/1975

(Continued)

OTHER PUBLICATIONS

STIC Search Report dated Jun. 18, 2007.*

(Continued)

*Primary Examiner*—Eisa B Elhilo
(74) *Attorney, Agent, or Firm*—Finnegan, Henderson, Farabow, Garrett & Dunner L.L.P.

(57) ABSTRACT

Disclosed herein are symmetrical cationic diazo compounds chosen from compounds of formula (I), their resonance forms, their acid addition salts, and their solvates:

(I)

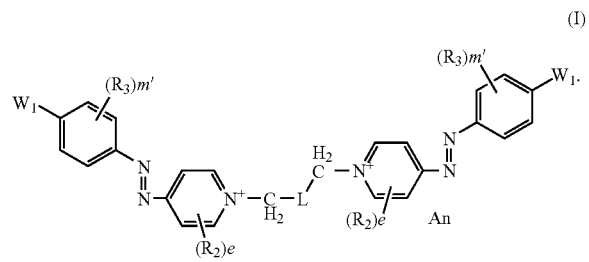

Also disclosed herein are dyeing compositions comprising such compounds as a direct dye in a medium appropriate for the dyeing of keratin fibers, a method of coloring keratin fibers comprising contacting the keratin fibers with such compositions, and a device comprising a plurality of compartments.

33 Claims, No Drawings

U.S. PATENT DOCUMENTS

| | | |
|---|---|---|
| 2004/0187228 A1 | 9/2004 | LaGrange |
| 2004/0200009 A1 | 10/2004 | Vidal |
| 2004/0221399 A1 | 11/2004 | Cotteret et al. |
| 2004/0244123 A1 | 12/2004 | Vidal et al. |
| 2004/0244124 A1 | 12/2004 | Plos et al. |
| 2005/0008594 A1 | 1/2005 | Plos et al. |
| 2005/0039268 A1 | 2/2005 | Plos et al. |

FOREIGN PATENT DOCUMENTS

| | | |
|---|---|---|
| DE | 38 43 892 A1 | 6/1990 |
| DE | 41 33 957 A1 | 4/1993 |
| DE | 195 43 988 A1 | 5/1997 |
| EP | 0 770 375 B1 | 5/1997 |
| EP | 0 714 954 B1 | 9/2002 |
| EP | 1 428 505 A1 | 6/2004 |
| EP | 1 433 474 A1 | 6/2004 |
| EP | 1 219 683 B1 | 7/2004 |
| EP | 1 464 327 A1 | 10/2004 |
| FR | 2 586 913 A1 | 3/1987 |
| FR | 2 692 572 A1 | 12/1993 |
| FR | 2 733 749 A1 | 11/1996 |
| FR | 2 750 048 A1 | 12/1997 |
| FR | 2 807 650 A1 | 10/2001 |
| FR | 2 822 693 A1 | 10/2002 |
| FR | 2 822 694 A1 | 10/2002 |
| FR | 2 822 696 A1 | 10/2002 |
| FR | 2 822 698 | 10/2002 |
| FR | 2 825 625 | 12/2002 |
| FR | 2 825 702 A1 | 12/2002 |
| FR | 2 829 926 A1 | 3/2003 |
| FR | 2 844 269 A1 | 3/2004 |
| GB | 1 026 978 | 4/1966 |
| GB | 1 153 196 | 5/1969 |
| JP | 02-19576 | 1/1990 |
| JP | 05-163124 | 6/1993 |
| WO | WO 94/08969 | 4/1994 |
| WO | WO 94/08970 | 4/1994 |
| WO | WO 95/01772 | 1/1995 |
| WO | WO 95/15144 | 6/1995 |
| WO | WO 96/15765 | 5/1996 |
| WO | WO 99/03834 A2 | 1/1999 |
| WO | WO 02/30374 A1 | 4/2002 |
| WO | WO 02/078596 A2 * | 10/2002 |
| WO | WO 02/078660 A1 | 10/2002 |
| WO | WO 02/080869 A2 | 10/2002 |
| WO | WO 02/100366 A2 | 12/2002 |
| WO | WO 02/100368 A1 | 12/2002 |
| WO | WO 02/100369 A2 | 12/2002 |
| WO | WO 02/100834 A1 | 12/2002 |
| WO | WO 2004/083312 A2 | 9/2004 |

OTHER PUBLICATIONS

English Language Derwent Abstract for DE 38 43 892 A1 (1990).
English Language Derwent Abstract for EP 0 770 375 B1 (1997).
English Language Derwent Abstract for JP 05-163124 (1993).
English Language Derwent Abstract for JP 2-19576 (1990).
French Search Report for French Patent Application No. FR 04/52998, priority document for co-pending U.S. Appl. No. 11/300,314, Aug. 3, 2005.
French Search Report for French Patent Application No. FR 04/52999, priority document for co-pending U.S. Appl. No. 11/300,271, Aug. 1, 2005.
French Search Report for French Patent Application No. FR 04/53000, priority document for co-pending U.S. Appl. No. 11/300,284, Aug. 3, 2005.
French Search Report for French Patent Application No. FR 04/53002, priority document for co-pending U.S. Appl. No. 11/300,300, Sep. 16, 2005.
French Search Report for French Patent Application No. FR 04/53006, priority document for co-pending U.S. Appl. No. 11/300,432, Sep. 19, 2005.
French Search Report for French Patent Application No. FR 04/53008, priority document for co-pending U.S. Appl. No. 11/300,303, Aug. 24, 2005.
French Search Report for French Patent Application No. FR 04/53005, priority document for co-pending U.S. Appl. No. 11/300,512, Aug. 23, 2005.
Co-pending U.S. Appl. No. 11/300,314, filed Dec. 15, 2005, by inventors David et al.
Co-pending U.S. Appl. No. 11/300,271, filed Dec. 15, 2005, by inventors David et al.
Co-pending U.S. Appl. No. 11/300,284, filed Dec. 15, 2005, by inventors David et al.
Co-pending U.S. Appl. No. 11/300,300, filed Dec. 15, 2005, by inventors David et al.
Co-pending U.S. Appl. No. 11/300,432, filed Dec. 15, 2005, by inventors David et al.
Co-pending U.S. Appl. No. 11/300,512, filed Dec. 15, 2005, by inventors David et al.
E. Buncel et al.; "Studies Of Azo And Azoxy Dyestuffs—16†Investigations Of The Protonation And Tautomeric Equilibria Of 4-(p'-Hydroxyphenylazo)Pyridine And Related Substrates;" *Tetrahedron*; (1983); pp. 1091-1101; vol. 39, No. 7.
I. Onyido et al.; "Heteroaromatic Azo-Activated Nucleophilic Substitutions. The Reaction of 4-(p-Methoxyphenylazo)Pyridinium Methiodide With Piperidine In Dimethyl Sulphoxide;" *Heterocycles*; (1987); pp. 313-317; vol. 26, No. 2.
M. H. Habibi et al., "Efficient Catalytic Oxidation Of Primary Aromatic Amines To Azo Derivatives By Manganese(III) Tetraphenylporphyrin†," *J. Chem. Research (S)*, (1998), pp. 648-649, vol. 10.
X.-Y. Wang et al.; "The Preparation Of Symmetrical Azobenzenes From Anilines By Phase Transfer Catalyzed Method;" *Synthetic Communications*; (1999); pp. 2271-2276; vol. 29, No. 13.

* cited by examiner

US 7,396,368 B2

SYMMETRICAL DIAZO COMPOUNDS COMPRISING 4-PYRIDINIUM GROUPS AND A CATIONIC OR NON-CATIONIC LINKER, COMPOSITIONS COMPRISING THEM, METHOD FOR COLORING, AND DEVICE

CROSS-REFERENCE TO RELATED APPLICATION

This application claims benefit of U.S. Provisional Application No. 60/681,448, filed May 17, 2005, the contents of which are incorporated herein by reference. This application also claims benefit of priority under 35 U.S.C. § 119 to French Patent Application No. 04 53008, filed Dec. 15, 2004, the contents of which are also incorporated herein by reference.

FIELD OF THE INVENTION

Disclosed herein are symmetrical cationic diazo compounds comprising 4-pyridinium groups and a cationic or non-cationic linker, dyeing compositions comprising such compounds as a direct dye in a medium appropriate for the dyeing of keratin fibers, a method for coloring keratin fibers comprising contacting the keratin fibers with this composition, and a device having a plurality of compartments for applying the compositions.

BACKGROUND OF THE INVENTION

It is known practice to dye keratin fibers, for example, human keratin fibers such as the hair, with dyeing compositions comprising direct dyes. These compounds may be colored, and coloring, molecules having an affinity for the fibers. It is known practice, for example, to use direct dyes of nitrobenzene type, anthraquinone dyes, nitropyridines, and dyes of azo, xanthene, acridine, azine, and triarylmethane type.

Commonly these dyes are applied to the fibers, optionally in the presence of an oxidizing agent if a simultaneous fiber lightening effect is desired. When the leave-in time has elapsed, the fibers may be rinsed, optionally washed, and dried.

The colorations which result from the use of direct dyes are temporary or semi-permanent colorations, because the nature of the interactions which bind the direct dyes to the keratin fiber, and their desorption from the surface and/or the core of the fiber, are responsible for their relatively low tinctorial strength and relatively poor wash resistance and/or perspiration resistance.

European Patent Application No. 1 377 263 discusses employing direct cationic diazo dyes comprising two cationic heterocyclic groups. These compounds, although representing an advance in the art, give dyeing results which nevertheless remain capable of improvement.

DETAILED DESCRIPTION OF THE INVENTION

For the purposes of the present disclosure, and in the absence of any indication otherwise:

An alkyl(ene) radical or the alkyl(ene) moiety of a radical is linear or branched.

An alkyl(ene) radical or the alkyl(ene) moiety of a radical is said to be substituted when it comprises at least one substituent chosen from:
hydroxyl groups,
$C_1$-$C_4$ alkoxy and $C_2$-$C_4$ (poly)hydroxyalkoxy groups,
amino groups,
amino groups substituted by one or two identical or different $C_1$-$C_4$ alkyl groups which optionally carry at least one hydroxyl or $C_1$-$C_2$ alkoxy group, it being possible for the alkyl radicals to form, together with the nitrogen atom to which they are attached, a heterocycle comprising 5 or 7 ring members, which is saturated or unsaturated, is optionally aromatic, is optionally substituted and comprises optionally at least one other heteroatom which may be different or not from nitrogen,
alkylcarbonylamino radicals (R'CO—NR—) in which the radical R is chosen from hydrogen and $C_1$-$C_4$ alkyl radicals and the radical R' is chosen from $C_1$-$C_2$ alkyl radicals,
alkylsulphonyl radicals (R"—$SO_2$—) in which the radical R" is chosen from $C_1$-$C_4$ alkyl radicals,
alkylsulphinyl radicals (R"—SO—) in which the radical R" is chosen from $C_1$-$C_4$ alkyl radicals, and
alkylcarbonyl radicals (R"—CO—) in which the radical R" is chosen from $C_1$-$C_4$ alkyl radicals.

An aromatic or non-aromatic, saturated or unsaturated (hetero)cyclic radical, or the aromatic or non-aromatic, saturated or unsaturated (hetero)cyclic moiety of a radical, is said to be substituted when it comprises at least one substituent, carried, for example, by a carbon atom, chosen from:
optionally substituted $C_1$-$C_{16}$, for example, $C_1$-$C_8$, alkyl radicals;
halogen atoms such as chlorine, fluorine, and bromine;
hydroxyl groups;
$C_1$-$C_4$ alkoxy and $C_2$-$C_4$ (poly)hydroxyalkoxy radicals;
amino radicals;
amino radicals substituted by one or two identical or different $C_1$-$C_4$ alkyl radicals which optionally carry at least one group chosen from hydroxyl, amino, $C_1$-$C_4$ (mono- or di-)alkylamino, and $C_1$-$C_2$ alkoxy groups, it being possible for the two alkyl radicals, together with the nitrogen atom to which they are attached, to form a heterocycle comprising from 1 to 3 heteroatoms, for example, from 1 to 2 heteroatoms, chosen from N, O, and S, the heterocycle comprising from 5 to 7 ring members, being saturated or unsaturated and aromatic or non-aromatic, and optionally being substituted. In at least one embodiment, the heteroatom(s) may be nitrogen;
alkylcarbonylamino radicals (R'CO—NR—) in which the radical R is chosen from hydrogen and $C_1$-$C_4$ alkyl radicals and the radical R' is chosen from $C_1$-$C_2$ alkyl radicals;
aminocarbonyl radicals (($R)_2$N—CO—) in which the radicals R, which may be identical or different, are independently chosen from hydrogen and $C_1$-$C_4$ alkyl radicals;
alkylsulphonylamino radicals (R'''$SO_2$—NR—) in which the radical R is chosen from hydrogen and $C_1$-$C_4$ alkyl radicals and the radical R''' is chosen from $C_1$-$C_4$ alkyl and phenyl radicals; and
aminosulphonyl radicals (($R)_2$N—$SO_2$—) in which the radicals R, which may be identical or different, are independently chosen from hydrogen and $C_1$-$C_4$ alkyl radicals.

The compounds according to the present disclosure are termed "symmetrical" when there exists a plane of symmetry perpendicular to the linker L. In other words, the two formula members on either side of the linker L are identical.

Where the different groups forming part of the structure of the compounds according to the present disclosure are substituted, it is understood that a skilled person will select them such that the symmetry of the molecule is respected.

It is desirable to provide direct dyes which do not exhibit the drawbacks of existing direct dyes.

Accordingly, disclosed herein are symmetrical cationic diazo compounds of formula (I) below, their resonance forms, their acid addition salts, and/or their solvates:

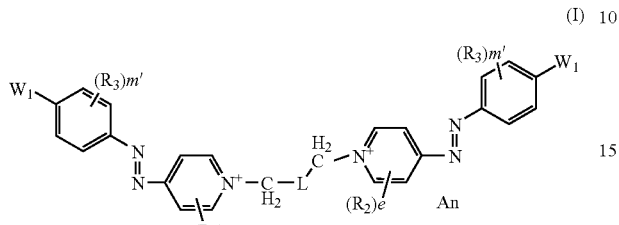

(I)

in which:
the radicals $R_2$, which may be identical or different, are independently chosen from:
optionally substituted $C_1$-$C_{16}$ alkyl radicals optionally interrupted by at least one entity chosen from heteroatoms, groups comprising at least one heteroatom, and combinations thereof, chosen, for example, from oxygen, nitrogen, sulphur, —CO—, —$SO_2$—, and combinations thereof, said alkyl radical being further optionally substituted by at least one group chosen from thio (—SH), $C_1$-$C_4$ thioalkyl; $C_1$-$C_4$ alkylsulphinyl, and $C_1$-$C_4$ alkylsulphonyl groups;
hydroxyl groups,
$C_1$-$C_4$ alkoxy groups,
$C_2$-$C_4$ (poly)hydroxyalkoxy groups;
alkoxycarbonyl groups (R"O—CO—) in which R" is chosen from $C_1$-$C_4$ alkyl radicals,
alkylcarbonyloxy radicals (R"CO—O—) in which R" is chosen from $C_1$-$C_4$ alkyl radicals,
alkylcarbonyl radicals (R"—CO—) in which R" is chosen from $C_1$-$C_4$ alkyl radicals,
amino groups,
amino groups substituted by one or two identical or different $C_1$-$C_4$ alkyl radicals optionally carrying at least one hydroxyl group, it being possible for the two alkyl radicals optionally to form, together with the nitrogen atom to which they are attached, a heterocycle comprising from 1 to 3 heteroatoms, for example, from 1 to 2 heteroatoms, chosen from N, O, and S, said heterocycle comprising from 5 to 7 ring members, and being saturated or unsaturated, aromatic or non-aromatic, and optionally substituted. In at least one embodiment, the heteroatom(s) may be nitrogen;
alkylcarbonylamino groups (R"CO—NR—) in which the radical R" is chosen from $C_1$-$C_4$ alkyl radicals and the radical R is chosen from hydrogen and $C_1$-$C_4$ alkyl radicals;
aminocarbonyl groups ((R)$_2$N—CO—) in which the radicals R, which may be identical or different, are independently chosen from hydrogen and $C_1$-$C_4$ alkyl radicals;
ureido groups (N(R)$_2$—CO—NR—) in which the radicals R, which may be identical or different, are independently chosen from hydrogen and $C_1$-$C_4$ alkyl radicals;
aminosulphonyl groups ((R)$_2$N—$SO_2$—) in which the radicals R, which may be identical or different, are independently chosen from hydrogen and $C_1$-$C_4$ alkyl radicals;
alkylsulphonylamino groups (R"$SO_2$—NR—) in which R" is chosen from $C_1$-$C_4$ alkyl radicals and R is chosen from hydrogen and $C_1$-$C_4$ alkyl radicals;
optionally substituted aryl radicals;
optionally substituted ($C_1$-$C_4$ alkyl)aryl radicals;
alkylsulphinyl groups (R"—SO—) in which R" is chosen from $C_1$-$C_4$ alkyl radicals;
alkylsulphonyl groups (R"—$SO_2$—) in which R" is chosen from $C_1$-$C_4$ alkyl radicals;
nitro groups;
cyano groups;
halogen atoms, for example, chlorine and fluorine;
thio groups (HS—); and
alkylthio groups (R"S—) in which the radical R" is chosen from optionally substituted $C_1$-$C_4$ alkyl radicals;
when e is 2, the two radicals $R_2$ may optionally form, together with the carbon atoms to which they are attached, a secondary, aromatic or non-aromatic ring comprising from 5 to 6 ring members, for example, 6 members, which is optionally substituted by at least one identical or non-identical group chosen from hydroxyl groups, $C_1$-$C_4$ alkyl groups, $C_1$-$C_4$ alkoxy groups, $C_2$-$C_4$ (poly)hydroxyalkoxy groups, amino groups, and amino groups substituted by one or two identical or different $C_1$-$C_4$ alkyl radicals which optionally carry at least one hydroxyl group;
e is an integer ranging from 0 to 4; when e is less than 4, the one or more unsubstituted carbon atoms of the heterocycle carry a hydrogen atom,
the radicals $R_3$, which may be identical or different, are independently chosen from:
optionally substituted $C_1$-$C_{16}$ alkyl radicals optionally interrupted by at least one entity chosen from heteroatoms and groups comprising at least one heteroatom and chosen, for example, from oxygen, nitrogen, sulphur, —CO—, —$SO_2$—, and combinations thereof,
hydroxyl groups,
$C_1$-$C_4$ alkoxy groups,
$C_2$-$C_4$ (poly)hydroxyalkoxy groups;
alkoxycarbonyl groups (R"O—CO—) in which R" is chosen from $C_1$-$C_4$ alkyl radicals,
alkylcarbonyloxy radicals (R"CO—O—) in which R" is chosen from $C_1$-$C_4$ alkyl radicals;
alkylcarbonyl radicals (R"—CO—) in which R" is chosen from $C_1$-$C_4$ alkyl radicals;
amino groups;
amino groups substituted by one or two identical or different $C_1$-$C_4$ alkyl radicals optionally carrying at least one hydroxyl group; it being possible for the two alkyl radicals optionally to form, together with the nitrogen atom to which they are attached, a heterocycle comprising from 1 to 3 heteroatoms, for example, from 1 to 2 heteroatoms, chosen from N, O, and S, the heterocycle comprising from 5 to 7 ring members, and being saturated or unsaturated, aromatic or non-aromatic, and optionally substituted;
alkylcarbonylamino groups (R"CO—NR—) in which the radical R" is chosen from $C_1$-$C_4$ alkyl radicals and the radical R is chosen from hydrogen and $C_1$-$C_4$ alkyl radicals;

aminocarbonyl groups ($(R)_2N$—CO—) in which the radicals R, which may be identical or different, are independently chosen from hydrogen and $C_1$-$C_4$ alkyl radicals;

ureido groups ($N(R)_2$—CO—NR—) in which the radicals R, which may be identical or different, are independently chosen from hydrogen and $C_1$-$C_4$ alkyl radicals;

aminosulphonyl groups ($(R)_2N$—$SO_2$—) in which the radicals R, which may be identical or different, are independently chosen from hydrogen and $C_1$-$C_4$ alkyl radicals;

alkylsulphonylamino groups ($RSO_2$—NR—) in which the radicals R, which may be identical or different, are independently chosen from hydrogen and $C_1$-$C_4$ alkyl radicals;

thio groups (HS—);

alkylthio groups (R"S—) in which the radical R" is chosen from $C_1$-$C_4$ alkyl radicals;

alkylsulphinyl groups (R"—SO—) in which R" is chosen from $C_1$-$C_4$ alkyl radicals;

alkylsulphonyl groups (R"—$SO_2$—) in which R" is chosen from $C_1$-$C_4$ alkyl radicals;

nitro groups;

cyano groups; and halogen atoms, for example, chlorine and fluorine;

when m' is greater than or equal to 2, two adjacent radicals $R_3$ may form, together with the carbon atoms to which they are attached, a secondary, aromatic or non-aromatic ring comprising 6 ring members, which is optionally substituted by at least one identical or different group chosen from hydroxyl groups, $C_1$-$C_4$ alkyl groups, $C_1$-$C_4$ alkoxy groups, $C_2$-$C_4$ (poly)hydroxyalkoxy groups, amino groups, amino groups substituted by one or two identical or different $C_1$-$C_4$ alkyl radicals which optionally carry at least one hydroxyl group;

m' is an integer ranging from 0 to 4; when m' is less than 4, the one or more unsubstituted carbon atoms of the heterocycle carry a hydrogen atom;

the radicals $W_1$, which are identical, are chosen from:
hydrogen,
halogen atoms chosen from bromine, chlorine, and fluorine. In at least one embodiment, the halogen atoms may be chosen from chlorine and fluorine, and —$NR_5R_6$, $OR_7$, —$NR_4$—Ph—$NR_5R_6$, —$NR_4$—Ph—$OR_7$, —O—Ph—$OR_7$, and —O—Ph—$NR_5R_6$ groups; wherein:

$R_4$ and $R_7$, which may be identical or different, are independently chosen from hydrogen, optionally substituted $C_1$-$C_{20}$, for example, $C_1$-$C_{16}$, alkyl radicals, optionally substituted $C_1$-$C_3$ aralkyl radicals, and optionally substituted phenyl radicals;

$R_5$ and $R_6$, which may be identical or different, are independently chosen from hydrogen, optionally substituted $C_1$-$C_{20}$, for example, $C_1$-$C_{16}$, alkyl radicals, optionally substituted phenyl radicals, optionally substituted $C_1$-$C_3$ aralkyl radicals, and alkylcarbonyl radicals (R"—CO—) in which R" is chosen from $C_1$-$C_4$ alkyl radicals;

$R_5$ and $R_6$ may optionally form, together with the nitrogen atom to which they are attached, a heterocycle comprising from 1 to 3 heteroatoms, for example, from 1 to 2 heteroatoms, chosen from N, O and S, said heterocycle comprising from 5 to 7 ring members, and being saturated or unsaturated, aromatic or non-aromatic, and optionally substituted. In at least one embodiment said heteroatom(s) may be nitrogen;

$R_5$ and $R_6$ may form, together with the carbon atom of the aromatic ring adjacent to that to which —$NR_5R_6$ is attached, a 5- or 6-membered saturated heterocycle; and Ph is chosen from optionally substituted phenyl radicals;

L is chosen from cationic linkers and non-cationic linkers;

the electroneutrality of the compound of formula (I) being ensured by at least one identical or non-identical, cosmetically acceptable anion An.

Also disclosed herein are dyeing compositions comprising the compounds described herein and their acid addition salts, as direct dyes in a medium appropriate for the dyeing of keratin fibers.

Further disclosed herein is a method for coloring keratin fibers comprising contacting a composition according to the present disclosure with the fibers, which may be dry or wet, for a time sufficient to give the desired effect.

Still further disclosed herein is a device comprising a plurality of compartments and containing in a first compartment a composition according to the present disclosure and in a second compartment an oxidizing composition.

The present inventors have discovered that the compounds of formula (I) as defined above may exhibit effective resistance to external agents, for example, shampoos, and may do so even when the keratin fiber is sensitized. Furthermore, these compounds may exhibit improved dyeing properties, such as improved chromaticity, improved coloring power, and low selectivity, i.e., the compounds of the present disclosure may allow colorations to be obtained which are more uniform between the end and the root of the hair.

Other characteristics and advantages of the present disclosure will appear more clearly from reading the description and the examples presented below.

In the present disclosure, and in the absence of any indication otherwise, the end-points delimiting a range of values are included in that range.

Symmetrical Diazo Compounds

As indicated above, the present disclosure provides compounds corresponding to formula (I).

According to one embodiment, the radicals $R_2$ in formula (I), which may be identical or different, may be independently chosen from:

halogen atoms chosen from chlorine and fluorine;

$C_1$-$C_4$ alkyl radicals optionally substituted by at least one identical or non-identical radical chosen from hydroxyl, $C_1$-$C_2$ alkoxy, $C_2$-$C_4$ (poly)hydroxyalkoxy, amino, $C_1$-$C_2$ (di)alkylamino, thio (—SH), $C_1$-$C_4$ alkylsulphinyl, $C_1$-$C_4$ alkylsulphonyl, and $C_1$-$C_4$ thioalkyl radicals;

phenyl radicals optionally substituted by at least one identical or non-identical radical chosen from hydroxyl, $C_1$-$C_2$ alkoxy, $C_2$-$C_4$ (poly)hydroxyalkoxy, amino, and $C_1$-$C_2$ (di)alkylamino radicals and halogen atoms such as chlorine or fluorine;

$C_1$-$C_4$ alkoxy radicals;

$C_1$-$C_4$ alkylsulphonylamino radicals;

$C_2$-$C_4$ (poly)hydroxyalkoxy radicals;

amino radicals;

$C_1$-$C_2$ (di)alkylamino radicals;

$C_2$-$C_4$ (poly)hydroxyalkylamino radicals;

alkylsulphonylamino radicals (R"$SO_2$N—) in which the radical R" is chosen from $C_1$-$C_4$ alkyl radicals;

aminosulphonyl radicals (($R)_2NSO_2$—) in which the radicals R, which may be identical or different, are independently chosen from hydrogen and $C_1$-$C_4$ alkyl radicals;

alkylthio radicals (R"S—) in which the radical R" is chosen from $C_1$-$C_4$ alkyl radicals;

alkylsulphinyl radicals (R"SO—) in which the radical R" is chosen from $C_1$-$C_4$ alkyl radicals;

alkylsulphonyl radicals (R"—$SO_2$—) in which the radical R" is chosen from $C_1$-$C_4$ alkyl radicals; and alkylcarbonylamino radicals (RCONR—) in which the radicals R, which may be identical or different, are independently chosen from hydrogen and $C_1$-$C_4$ alkyl radicals.

According to another embodiment, the identical or non-identical radicals $R_2$ may be independently chosen from methyl, ethyl, 2-hydroxyethyl, 2-methoxyethyl, methylsulphonyl ($CH_3SO_2$—), methylcarbonylamino ($CH_3CONH$—), hydroxyl, amino, methylamino, dimethylamino, 2-hydroxyethylamino, methoxy, ethoxy, and phenyl radicals.

According to further embodiment, the two radicals $R_2$ may optionally form, together with the carbon atoms to which they are attached, a secondary, 6-membered aromatic ring optionally substituted by at least one identical or different group chosen from hydroxyl groups, $C_1$-$C_4$ alkyl groups, $C_1$-$C_4$ alkoxy groups, amino groups, and amino groups substituted by one or two identical or different $C_1$-$C_4$ alkyl radicals which optionally carry at least one group chosen from hydroxyl and methylcarbonylamino groups.

In accordance with this embodiment, the two radicals $R_2$ may optionally form, together with the carbon atoms to which they are attached, a secondary, 6-membered aromatic ring optionally substituted by at least one identical or different group chosen from hydroxyl, methoxy, ethoxy, amino, acylamino, 2-hydroxyethylamino, dimethylamino, (di)-2-hydroxyethylamino, and/or methylcarbonylamino groups.

In at least one embodiment, the coefficient e may be equal to 0.

According to one embodiment, the radicals $R_3$, which may be identical or different, may be independently chosen from:
optionally substituted $C_1$-$C_{16}$, for example, $C_1$-$C_8$, alkyl radicals;
halogen atoms such as chlorine and fluorine;
hydroxyl groups;
$C_1$-$C_2$ alkoxy radicals;
$C_2$-$C_4$ (poly)hydroxyalkoxy radicals;
amino radicals;
amino radicals substituted by one or two identical or different $C_1$-$C_4$ alkyl radicals which optionally carry at least one group chosen from hydroxyl and $C_1$-$C_4$ alkoxy groups, it being possible for the two alkyl radicals to form, together with the nitrogen to which they are attached, a heterocycle comprising from 1 to 3 heteroatoms, for example, from 1 to 2 heteroatoms, chosen from N, O, and S, the heterocycle comprising from 5 to 7 ring members, being saturated or unsaturated, aromatic or non-aromatic, and being optionally substituted. In at least one embodiment, the heteroatom(s) may be nitrogen;
alkylcarbonylamino radicals (R"CO—NR—) in which the radical R" is chosen from $C_1$-$C_4$ alkyl radicals and the radical R is chosen from hydrogen and $C_1$-$C_4$ alkyl radicals;
alkylsulphonylamino radicals (R"$SO_2$—NR—) in which the radical R is chosen from hydrogen and $C_1$-$C_4$ alkyl radical and the radical R" is chosen from $C_1$-$C_4$ alkyl radicals;

aminosulphonyl radicals (($R)_2N$—$SO_2$—) in which the radicals R, which may be identical or different, is chosen from hydrogen and $C_1$-$C_4$ alkyl radicals;

alkylthio radicals (R"S') in which the radical R" is chosen from $C_1$-$C_4$ alkyl radicals; and alkylsulphonyl radicals (R"—$SO_2$—) in which the radical R" is chosen from $C_1$-$C_4$ alkyl radicals.

In another embodiment, the radicals $R_3$, which may be identical or different, may be independently chosen from:
$C_1$-$C_4$ alkyl radicals optionally substituted by at least one radical chosen from hydroxyl radicals, $C_1$-$C_2$ alkylcarbonylamino radicals, amino radicals substituted by two identical or different $C_1$-$C_2$ alkyl radicals which optionally carry at least one hydroxyl group, and $C_1$-$C_2$ alkoxy radicals, it being possible for these two alkyl radicals optionally to form, together with the nitrogen atom to which they are attached, a 5- or 6-membered heterocycle which is saturated or unsaturated and is optionally aromatic, chosen, for example, from pyrrolidine, piperazine, homopiperazine, pyrrole, imidazole, and pyrazole heterocycles;
$C_2$-$C_4$ hydroxyalkoxy radicals;
halogens chosen from chlorine and fluorine;
amino radicals;
amino radicals substituted by one or two identical or different $C_1$-$C_2$ alkyl radicals which optionally carry at least one hydroxyl group;
methylcarbonylamino radicals;
methylsulphonylamino radicals;
hydroxyl radicals;
$C_1$-$C_2$ alkoxy radicals; and
methylsulphonyl radicals.

According to this embodiment, the radicals $R_3$, which may be identical or different, may be independently chosen from:
methyl, ethyl, propyl, 2-hydroxyethyl, methoxy, ethoxy, 2-hydroxyethyloxy, 3-hydroxypropyloxy, and 2-methoxyethyl radicals;
methylsulphonylamino radicals;
amino, methylamino, dimethylamino, and 2-hydroxyethylamino radicals;
methylcarbonylamino radicals;
hydroxyl radicals;
chlorine; and
methylsulphonyl radicals.

According to another embodiment, when the coefficient m' is greater than or equal to 2, two adjacent radicals $R_3$ may form, together with the carbon atoms to which they are attached, a secondary, 6-membered aromatic ring optionally substituted by at least one identical or different group chosen from hydroxyl groups, —$NR_4$—Ph, —$NR_4$—Ph—$NR_5R_6$ and —$NR_4$—Ph—$OR_7$ groups, $C_1$-$C_4$ alkyl groups, $C_1$-$C_4$ alkoxy groups, $C_2$-$C_4$ (poly)hydroxyalkoxy groups, $C_1$-$C_4$ alkylcarbonylamino groups, amino groups, and amino groups substituted by one or two identical or different $C_1$-$C_4$ alkyl radicals which optionally carry at least one hydroxyl group.

According to this embodiment, two adjacent radicals $R_3$ may form, together with the carbon atoms to which they are attached, a secondary, 6-membered aromatic ring which is optionally substituted by at least one group chosen from hydroxyl, methoxy, ethoxy, 2-hydroxyethyloxy, amino, methylcarbonylamino, (di)-2-hydroxyethylamino, —NH—Ph, —NH—Ph—$NH_2$, —NH—Ph—$NHCOCH_3$, —NH—Ph—OH, and —NH—Ph—$OCH_3$ groups.

In accordance with one embodiment, the radicals $R_4$ and $R_7$ of $W_1$, which may be identical or different, may be chosen from:
hydrogen;

$C_1$-$C_6$ alkyl radicals which are optionally substituted by at least one identical or different group chosen from hydroxyl and $C_1$-$C_2$ alkoxy groups; and aryl and arylalkyl radicals, such as phenyl and benzyl, the aryl moieties being optionally substituted, for example, by at least one identical or different radical chosen from chlorine, amino radicals, hydroxyl radicals, $C_1$-$C_2$ alkoxy radicals, amino radicals which are mono- or disubstituted by one or two identical or different $C_1$-$C_4$ alkyl radicals which optionally carry at least one hydroxyl group.

In accordance with another embodiment of the present disclosure, the radicals $R_4$ and $R_7$, which may be identical or different, may be independently chosen from:

hydrogen;

optionally substituted $C_1$-$C_3$ alkyl radicals, such as methyl, ethyl, 2-hydroxyethyl, and 2-methoxyethyl radicals; and phenyl radicals which are optionally substituted by at least one identical or non-identical radical chosen from hydroxyl radicals, $C_1$-$C_2$ alkoxy radicals, amino radicals, and amino radicals substituted by at least one $C_1$-$C_4$ alkyl group which optionally carry at least one hydroxyl group.

In yet another embodiment, the radicals $R_4$ and $R_7$, which may be identical or different, may be independently chosen from:

hydrogen;

methyl, ethyl, and 2-hydroxyethyl radicals;

phenyl radicals which are optionally substituted by at least one radical chosen from hydroxyl, methoxy, amino, (di)methylamino, and (di)(2-hydroxyethyl)amino radicals.

According to one embodiment, the radicals $R_5$ and $R_6$ of $W_1$, which may be identical or different, may be independently chosen from:

hydrogen;

alkylcarbonyl radicals (R"—CO—) in which R" is chosen from optionally substituted $C_1$-$C_4$ alkyl radicals, $C_1$-$C_6$ alkyl radicals which are optionally substituted by at least one identical or non-identical group chosen from hydroxyl, $C_1$-$C_2$ alkoxy, amino, and $C_1$-$C_4$ (di)alkylamino groups; the alkyl radicals being optionally further substituted by at least one identical or non-identical group chosen from $C_1$-$C_4$ alkylsulphonyl groups, $C_1$-$C_4$ alkylsulphinyl groups, and $C_1$-$C_4$ alkylcarbonyl groups, and aryl and arylalkyl radicals, such as phenyl and benzyl, the aryl moieties being optionally substituted by at least one group chosen from chlorine, amino groups, hydroxyl groups, $C_1$-$C_4$ alkoxy groups, and amino groups which are mono- or disubstituted by one or two identical or different $C_1$-$C_4$ alkyl radicals which optionally carry at least one hydroxyl group.

In accordance with another embodiment of the present disclosure, the radicals $R_5$ and $R_6$, which may be identical or different, may be chosen from:

hydrogen;

methylcarbonyl, ethylcarbonyl, and propylcarbonyl radicals;

optionally substituted $C_1$-$C_3$ alkyl radicals, such as methyl, ethyl, 2-hydroxyethyl, and 2-methoxyethyl radicals; and phenyl radicals which are optionally substituted by at least one radical chosen from hydroxyl radicals, $C_1$-$C_2$ alkoxy radicals, amino radicals, and amino radicals substituted by at least one identical or non-identical $C_1$-$C_4$ alkyl group which optionally carries at least one hydroxyl group.

In yet another embodiment, the radicals $R_5$ and $R_6$, which may be identical or different, may be chosen from:

hydrogen;

methyl, ethyl, and 2-hydroxyethyl radicals;

methylcarbonyl, ethylcarbonyl, and propylcarbonyl radicals; and phenyl radicals which are optionally substituted by at least one radical chosen from hydroxyl, methoxy, amino, (di)methylamino, and (di)(2-hydroxyethyl)amino radicals.

In a further embodiment of the present disclosure, the radicals $R_5$ and $R_6$ may form, together with the nitrogen atom to which each is attached, a heterocycle comprising from 1 to 3 heteroatoms, for example, from 1 to 2 heteroatoms, chosen from N, O, and S, the heterocycle comprising from 5 to 7 ring members, and being saturated or unsaturated, aromatic or non-aromatic, and optionally substituted. In at least one embodiment, the heteroatom(s) may be nitrogen.

The heterocycle comprising from 5 to 7 ring members may be chosen, for example, from piperidine, 2-(2-hydroxyethylpiperidine), 4-(aminomethyl)piperidine, 4-(2-hydroxyethyl)piperidine, 4-(dimethylamino)piperidine, piperazine, 1-methylpiperazine, 1-(2-hydroxyethyl)piperazine, 1-(2-aminoethyl)piperazine, 1-hydroxyethylethoxypiperazine, homopiperazine, 1-methyl-1,4-perhydrodiazepine, pyrrole, 1,4-dimethylpyrrole, 1-methyl-4-ethylpyrrole, and 1-methyl-4-propylpyrrole heterocycles.

In at least one embodiment, the heterocycle comprising from 5 to 7 ring members may be chosen from piperidine, piperazine, homopiperazine, pyrrole, imidazole, and pyrazole heterocycles which are optionally substituted by at least one identical or non-identical radical chosen from methyl, hydroxyl, amino, and/or (di)methylamino radicals.

According to another embodiment, the radicals $R_5$ and $R_6$, which may be identical or different, may be chosen from alkyl radicals which, independently of one another, may form, with the carbon atom of the aromatic ring optionally substituted by a hydroxyl and adjacent to that to which —$NR_5R_6$ is attached, a 5- or 6-membered saturated heterocycle.

For example, the group —$NR_5R_6$ with the aromatic nucleus optionally substituted by a hydroxyl may correspond to the following compounds:

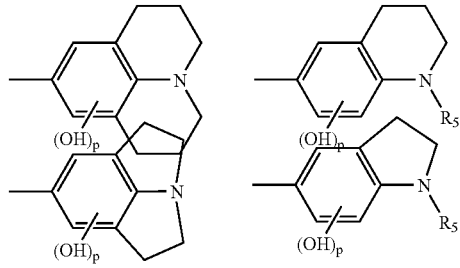

where p = 0 or 1

In at least one embodiment, L may be chosen from non-cationic linkers.

According to this embodiment, the non-cationic linker L connecting the two different azo chromophores may be chosen from:

covalent bonds;

optionally substituted $C_1$-$C_{40}$, for example, $C_1$-$C_{20}$ alkyl radicals optionally interrupted by a saturated or unsaturated, aromatic or non-aromatic (hetero)cycle comprising from 3 to 7 ring members which is optionally substituted and optionally fused, the alkyl radicals being optionally interrupted by at least one entity chosen from heteroatoms and groups comprising at least one heteroatom, for example, oxygen, nitrogen, sulphur, —CO—, —SO$_2$—, and combinations thereof, with the proviso that the linker L does not contain an azo, nitro, nitroso, or peroxo bond; and optionally substituted phenyl radicals.

According to this embodiment, examples of alkyl-type linkers L include, but are not limited to, methylene, ethylene, linear or branched propylene, linear or branched butylene, linear or branched pentylene, and linear or branched hexylene radicals which are optionally substituted and/or interrupted as indicated above.

These identical or different substituents may be chosen from hydroxyl, $C_1$-$C_2$ alkoxy, $C_1$-$C_2$ dialkylamino, ($C_1$-$C_4$ alkyl)carbonyl, and $C_1$-$C_4$ alkyl sulphonyl substituents.

Examples of aromatic or non-aromatic, saturated or unsaturated cycles or heterocycles interrupting the alkyl radical of the linker L include, but are not limited to, phenylene, naphthylene, phenanthrylene, triazinyl, pyrimidinyl, pyridinyl, pyridazinyl, quinoxalinyl, and cyclohexyl radicals.

In at least one embodiment, the linker L may be chosen from:

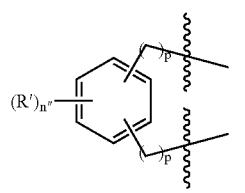

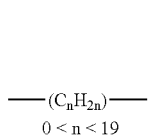

—(C$_n$H$_{2n}$)—
0 < n < 19 p is 0 or 1
n″ is an integer between 0 and 4

—(C$_n$H$_{2n}$)$_2$—X
0 < n < 10

X = NH, NR$_4$, O
S, SO, SO$_2$

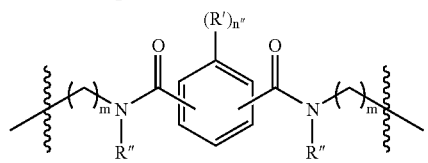

m is an integer between 0 and 6
n″ is an integer between 0 and 4

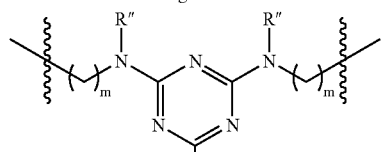

m is an integer between 0 and 6
Z = OH, NR$_8$R$_9$

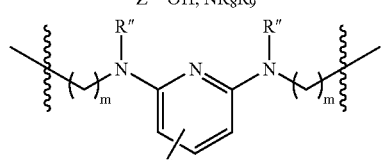

m is an integer between 0 and 6
n‴ is an integer between 0 and 3

In these formulae:
R′ has the same definition as R$_3$;
R″ radicals, which are identical, are chosen from hydrogen and $C_1$-$C_4$ alkyl radicals;
R$_8$ and R$_9$, which may be identical or different, are independently chosen from hydrogen and $C_1$-$C_8$ alkyl radicals which are optionally substituted by at least one identical or different radical chosen from hydroxyl, $C_1$-$C_2$ alkoxy, $C_2$-$C_4$ (poly)hydroxyalkoxy, amino, $C_1$-$C_2$ (di)alkylamino, and optionally substituted aryl radicals.

Further examples of suitable linking arms L include, but are not limited to:

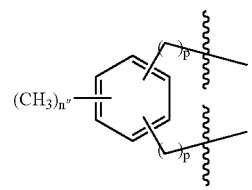

p is 0 or 1
n″ is an integer between 0 and 4

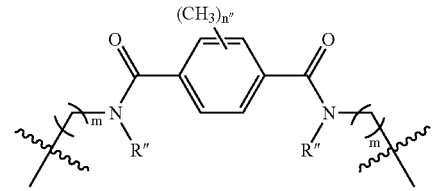

m is an integer between 0 and 6
n″ is an integer between 0 and 4

The aromatic ring positions not substituted by a methyl radical carry a hydrogen atom In another embodiment, the linker may be chosen from cationic linkers.

According to this embodiment, cationic linker L connecting the two different azo chromophores may be chosen from:

$C_2$-$C_{40}$ alkyl radicals which carry at least one cationic charge and are optionally substituted and/or optionally interrupted by at least one saturated or unsaturated, aromatic or non-aromatic, identical or different (hetero) cycle comprising from 3 to 7 ring members and/or optionally interrupted by at least one entity chosen from heteroatoms, groups comprising at least one heteroatom, and combinations thereof, for example, oxygen, nitrogen, sulphur, —CO—, —SO$_2$—, and combinations thereof, with the proviso that the linker L does not contain an azo, nitro, nitroso, or peroxo bond; and with the proviso that the linker L carries at least one cationic charge.

According to this embodiment, the cationic linker L may be chosen from $C_2$-$C_{20}$ alkyl radicals:

1—interrupted by at least one group corresponding to the following formulae:

(a)
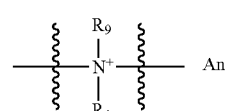
An (b)
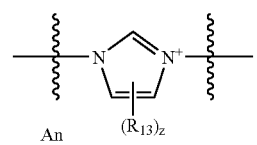
An

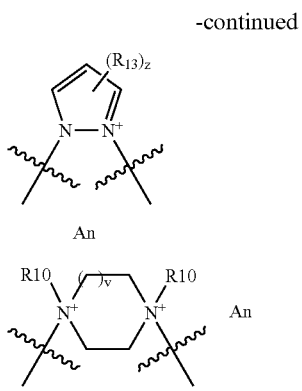

(c)

(d)

in which:
R$_9$ and R$_{10}$, which may be identical or different, are independently chosen from C$_1$-C$_8$ alkyl radicals; C$_1$-C$_6$ monohydroxyalkyl radicals; C$_2$-C$_6$ polyhydroxyalkyl radicals; C$_1$-C$_6$ alkoxy-C$_1$-C$_6$ alkyl radicals; aryl radicals, such as phenyl, which are optionally substituted; arylalkyl radicals such as benzyl which are optionally substituted; C$_1$-C$_6$ aminoalkyl radicals; C$_1$-C$_6$ aminoalkyl radicals whose amines are substituted by one or two identical or different C$_1$-C$_4$ alkyl radicals; and C$_1$-C$_6$ alkylsulphonyl radicals, two radicals R$_9$ may form, together with the nitrogen atom to which they are attached, a saturated or unsaturated ring which is optionally substituted and comprises from 5 to 7 ring members, R$_{13}$ radicals, which may be identical or different, may be independently chosen from halogen atoms chosen from bromine, chlorine, and fluorine, C$_1$-C$_6$ alkyl radicals, C$_1$-C$_6$ monohydroxyalkyl radicals, C$_2$-C$_6$ polyhydroxyalkyl radicals, C$_1$-C$_6$ alkoxy radicals, C$_1$-C$_4$ (di)alkylamino radicals, hydroxycarbonyl radicals, C$_1$-C$_6$ alkylcarbonyl radicals, C$_1$-C$_6$ thioalkyl radicals, C$_1$-C$_6$ alkylthio radicals, C$_1$-C$_6$ alkylsulphonyl radicals, optionally substituted benzyl radicals, and phenyl radicals which are optionally substituted by at least one radical chosen from methyl, hydroxyl, amino, and methoxy radicals, An is chosen from organic anions, inorganic anions, and anion mixtures, z is an integer ranging from 1 to 3; wherein if z is <3, the one or more unsubstituted carbon atoms carry a hydrogen atom;

v is an integer equal to 1 or 2, for example, v is equal to 1,

2—optionally interrupted by at least one entity chosen from heteroatoms, groups comprising at least one heteroatom, and combinations thereof, for example, oxygen, nitrogen, sulphur, —CO—, and —SO$_2$—, with the proviso that there is no nitro, nitroso, or peroxo bond or group in the linker L;

3—and optionally substituted by at least one radical chosen from hydroxyl radicals, C$_1$-C$_2$ alkoxy radicals, C$_2$-C$_4$ (poly)hydroxyalkoxy radicals, amino radicals substituted by at least one linear or branched C$_1$-C$_2$ alkyl group which optionally carries at least one hydroxyl group.

According to one embodiment, in formulae (a) and (d), R$_9$ and R$_{10}$, which may be identical or different, may be independently chosen from C$_1$-C$_6$ alkyl radicals, C$_1$-C$_4$ monohydroxyalkyl radicals, C$_2$-C$_4$ polyhydroxyalkyl radicals, C$_1$-C$_6$ alkoxy-C$_2$-C$_4$ alkyl radicals, and a C$_2$-C$_6$ dimethylaminoalkyl radicals.

In at least one embodiment, R$_9$ and R$_{10}$, which may be identical or different may be independently chosen from methyl, ethyl, and 2-hydroxyethyl radicals.

According to one embodiment, in formulae (b) and (c), R$_{13}$ may be chosen from halogen atoms chosen from chlorine and fluorine, C$_1$-C$_6$ alkyl radicals, C$_1$-C$_4$ monohydroxyalkyl radicals, C$_1$-C$_4$ alkoxy radicals, hydroxycarbonyl radicals, C$_1$-C$_6$ alkylthio radicals, and amino radicals disubstituted by a C$_1$-C$_4$ alkyl radical.

In another embodiment, in formulae (b) and (c), R$_{13}$ may be chosen from chlorine, and methyl, ethyl, 2-hydroxyethyl, methoxy, hydroxycarbonyl, and dimethylamino radicals.

In yet another embodiment, in formulae (b) and (c), z may be equal to 0.

In formula (I), An is chosen from organic anions, inorganic anions, and anion mixtures, allowing the charge or charges on the compounds of formula (I) to be balanced. An may be chosen for example from halides such as chloride, bromide, fluoride, and iodide; hydroxides; sulphates; hydrogensulphates; alkylsulphates for which the linear or branched alkyl moieties are chosen from C$_1$-C$_6$ alkyls, such as the methylsulphate ion, ethylsulphate; carbonates; hydrogencarbonates; salts of carboxylic acids, such as formate, acetate, citrate, tartrate, and oxalate; alkylsulphonates for which the linear or branched alkyl moieties are chosen from C$_1$-C$_6$ alkyls, such as the methylsulphonate ion; arylsulphonates for which the aryl moieties, for example, phenyl, are optionally substituted by at least one C$_1$-C$_4$ alkyl radical, such as 4-tolylsulphonate; and alkylsulphonyls such as mesylate.

The acid addition salts of the compounds of formula (I) may include, for example, the addition salts with an organic or inorganic acid such as hydrochloric acid, hydrobromic acid, sulphuric acid, and (alkyl- or phenyl-)sulphonic acids such as p-toluene-sulphonic acid and methylsulphonic acid.

The solvates of compounds of formula (I) may include, for example, the hydrates of such compounds and the combination of these compounds with linear or branched C$_1$-C$_4$ alcohols such as methanol, ethanol, isopropanol, and n-propanol.

In at least one embodiment of the present disclosure, the compounds symmetrical diazo compounds disclosed herein may be chosen from compounds of formulae (I'), (II'), and (III') below, their resonance forms, their acid addition salts, and/or their solvates:

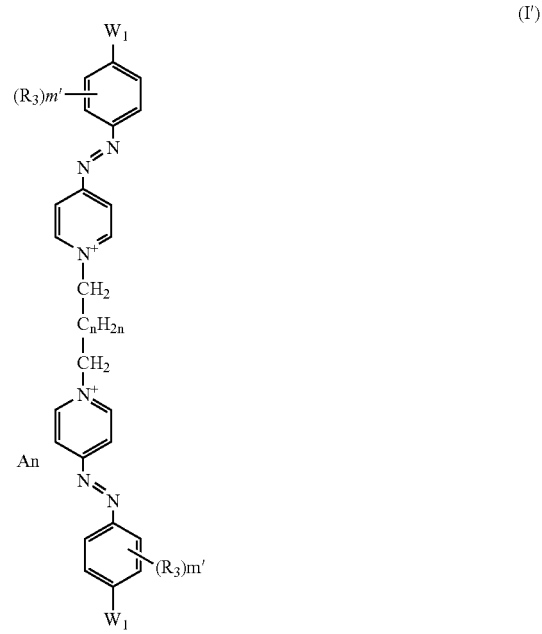

-continued
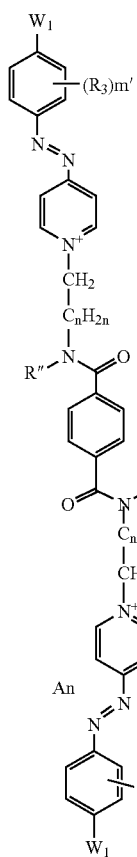
R″ = H, Me
n = integer between 1 and 6
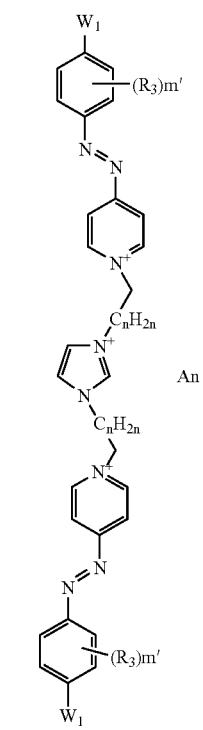
n = integer between 1 and 6
In accordance with another embodiment of the present disclosure, the symmetrical diazo compounds may be chosen from compounds of the formulae below, their resonance forms, their acid addition salts, and/or their solvates:
(I″)
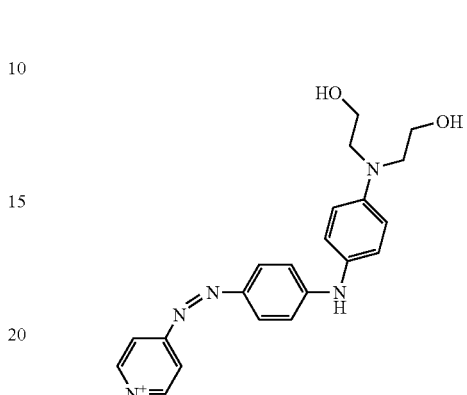
(I‴)
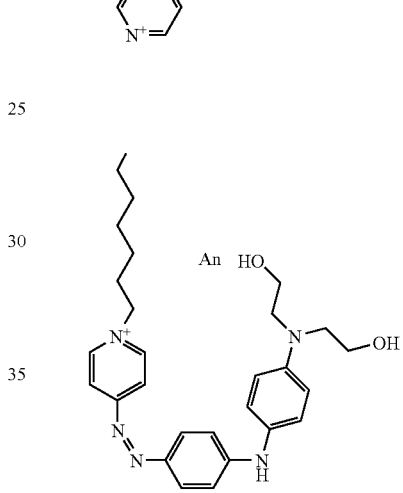
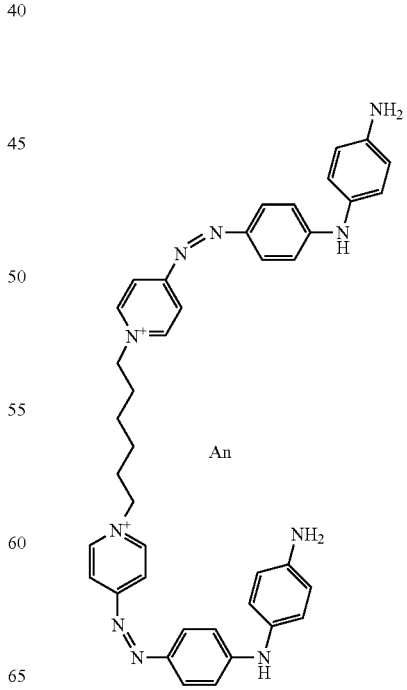

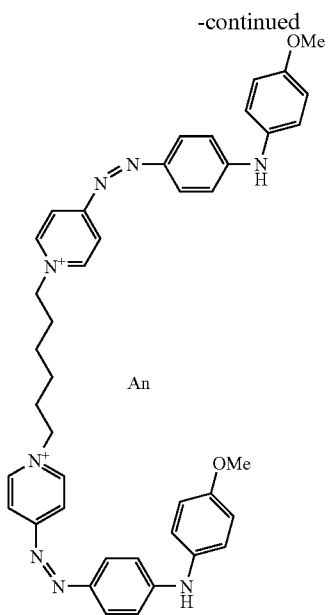
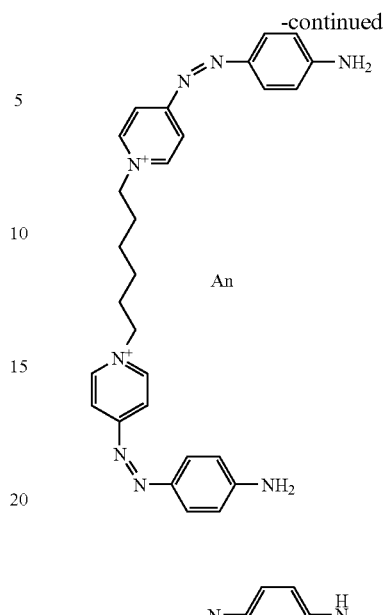
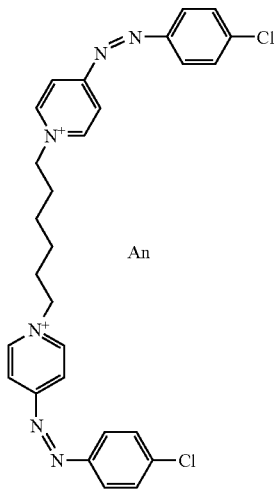
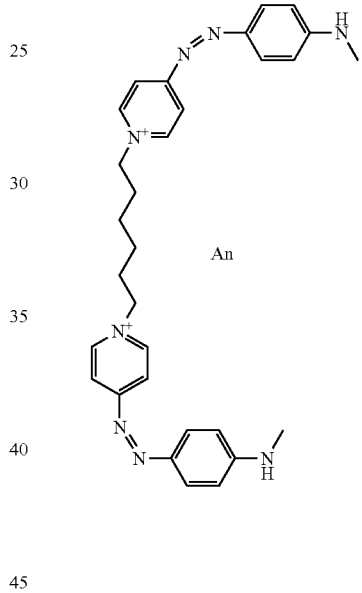
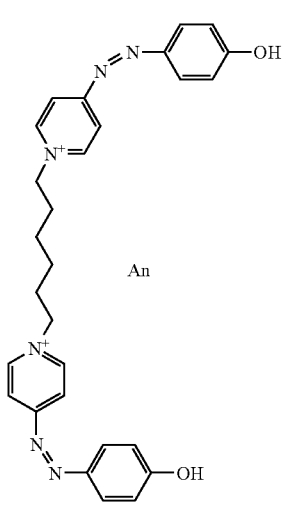
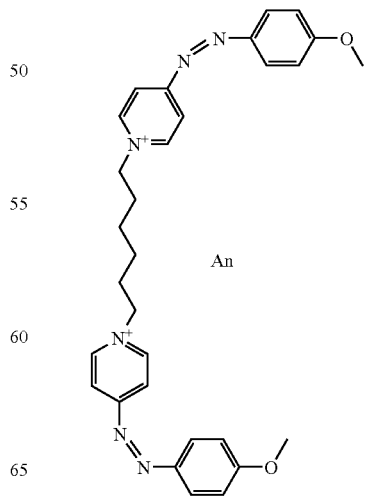

-continued
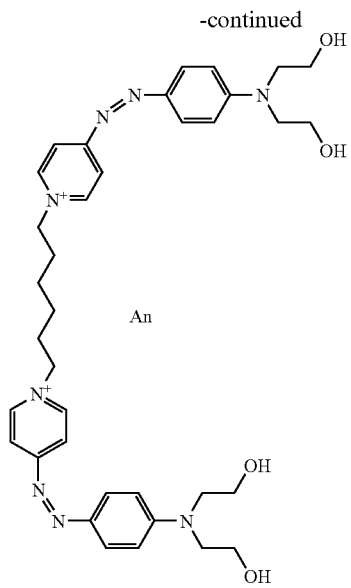
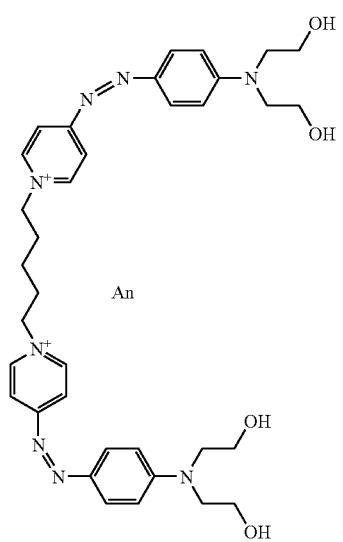
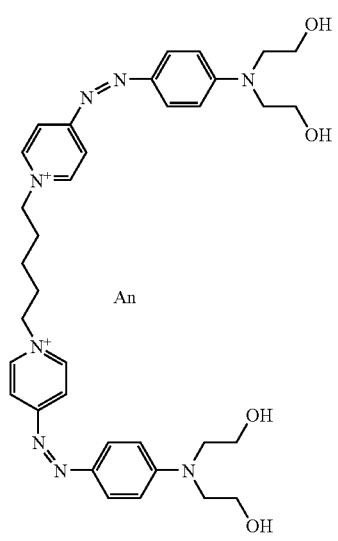
-continued
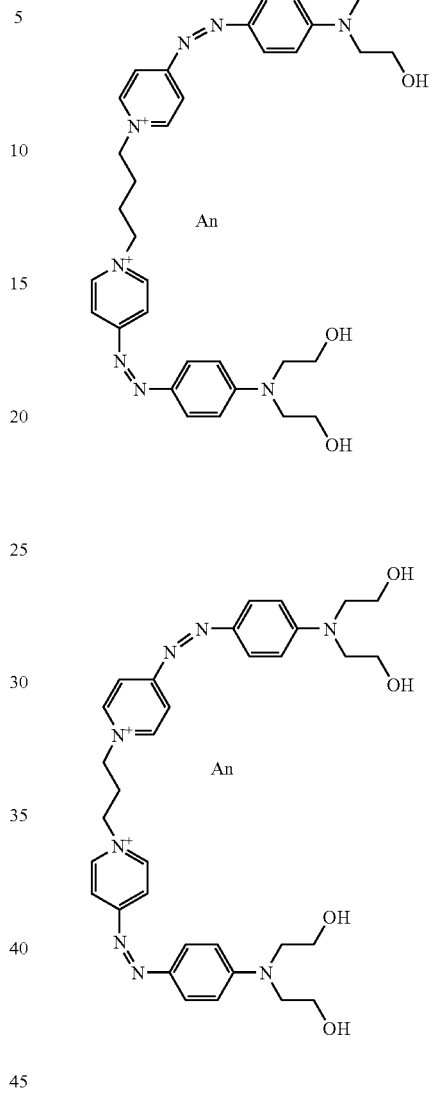
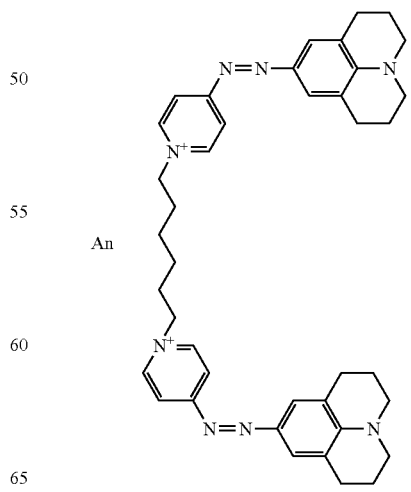

-continued
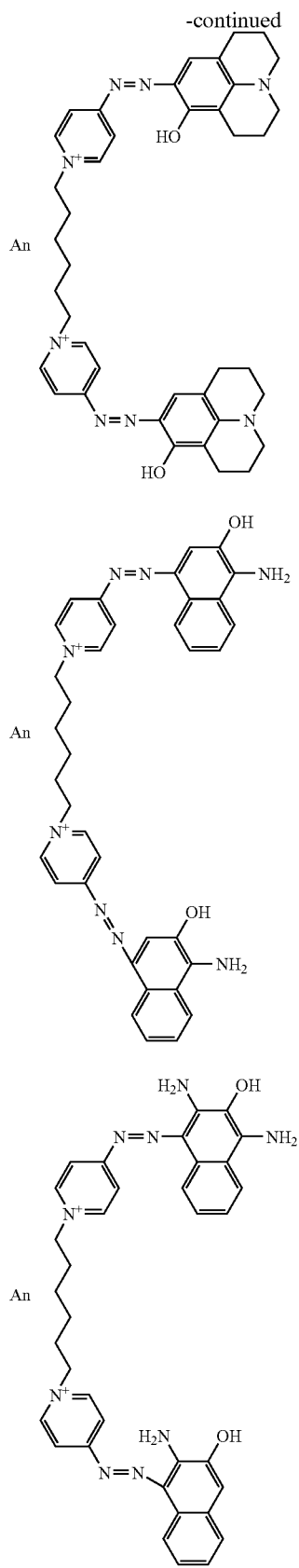
-continued
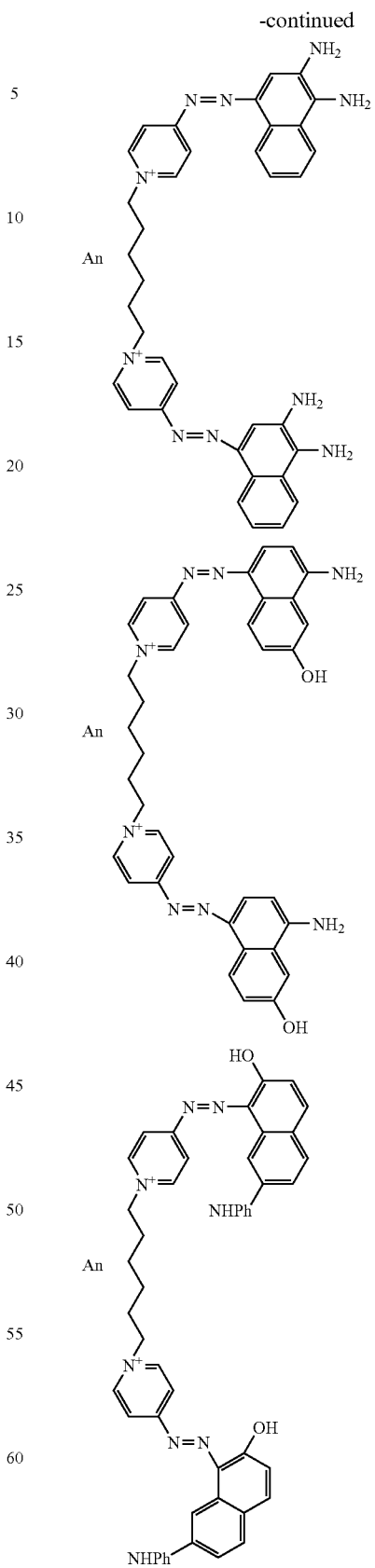

-continued
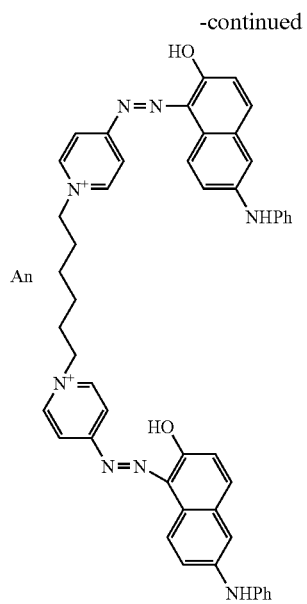
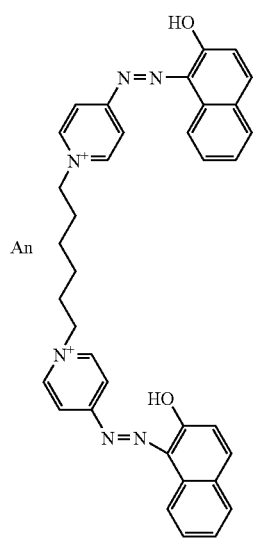
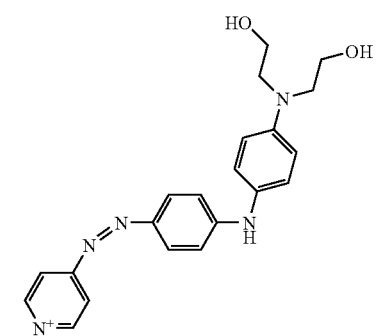
-continued
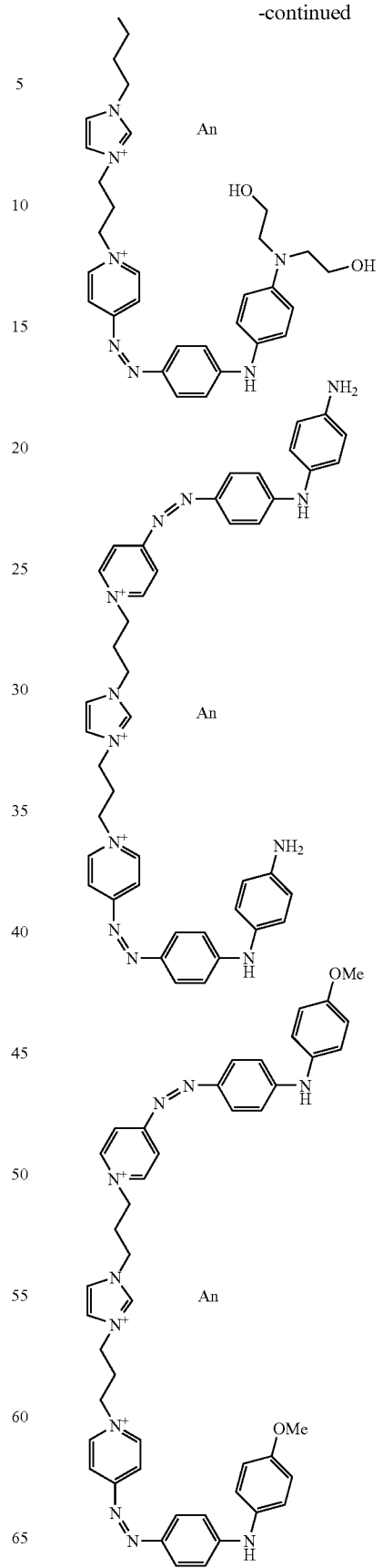

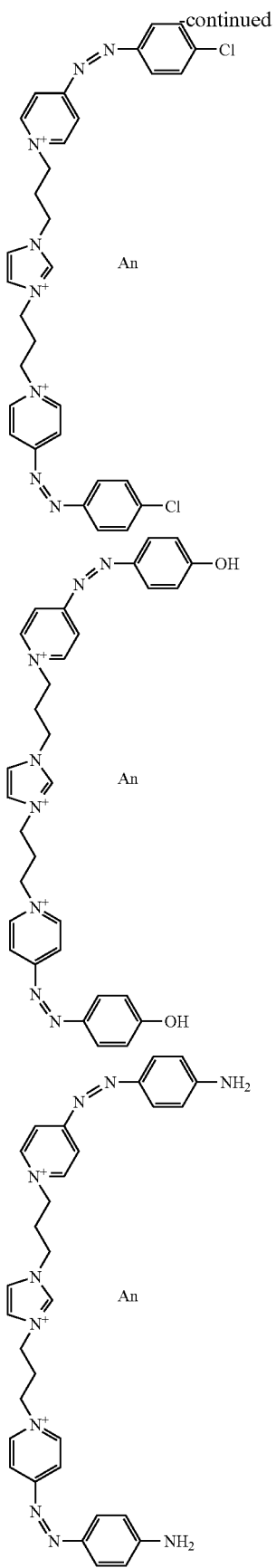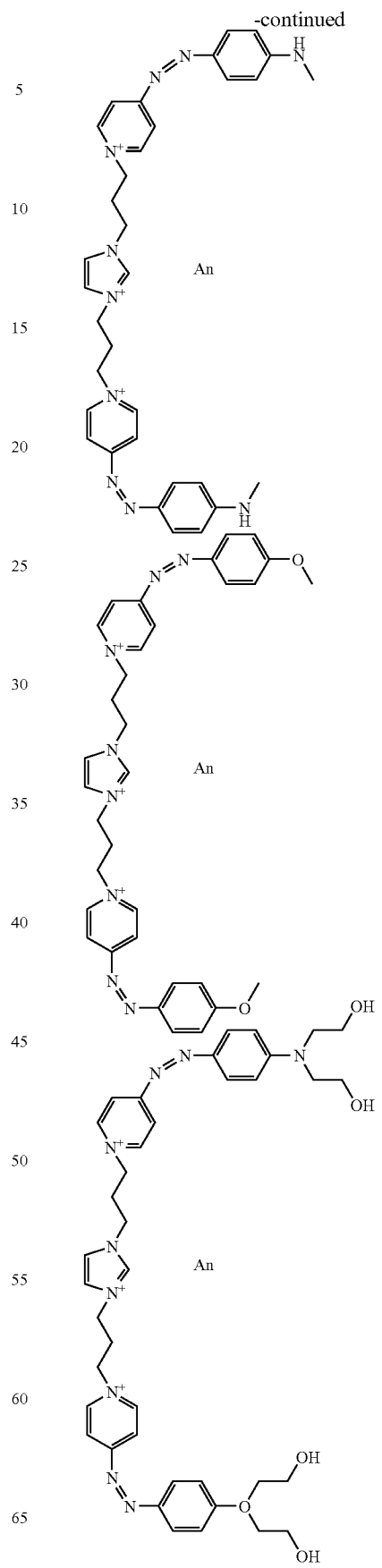

-continued
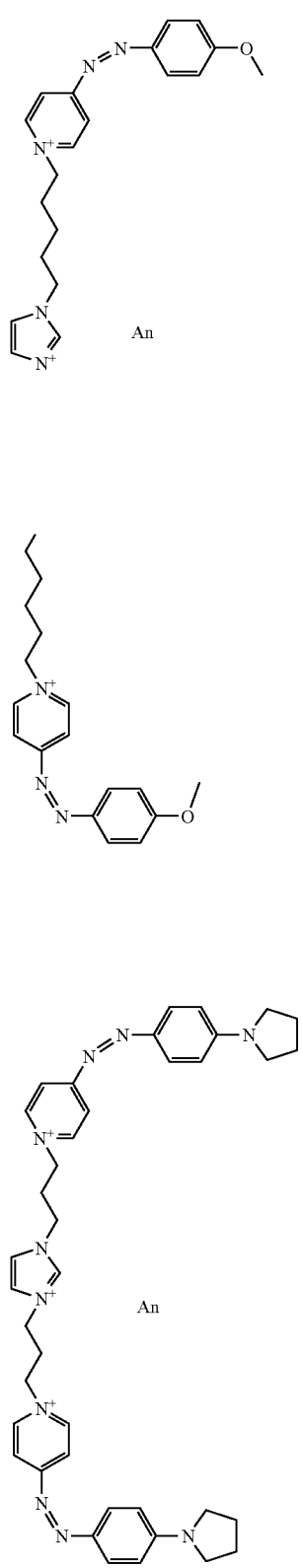
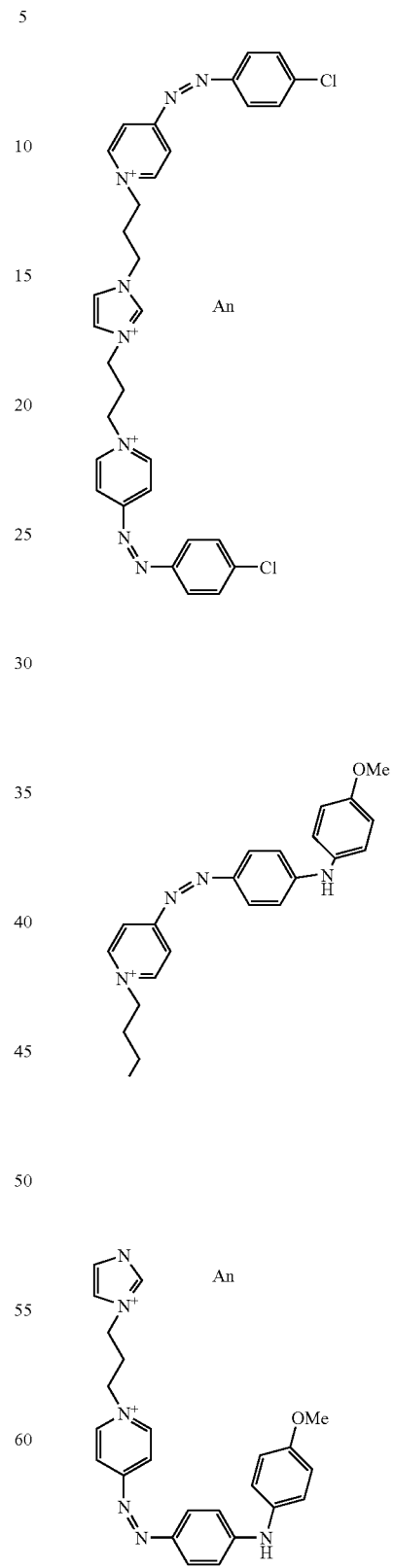

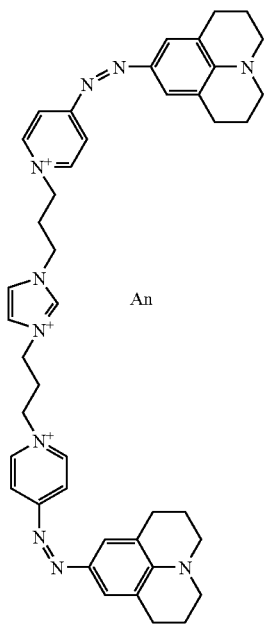
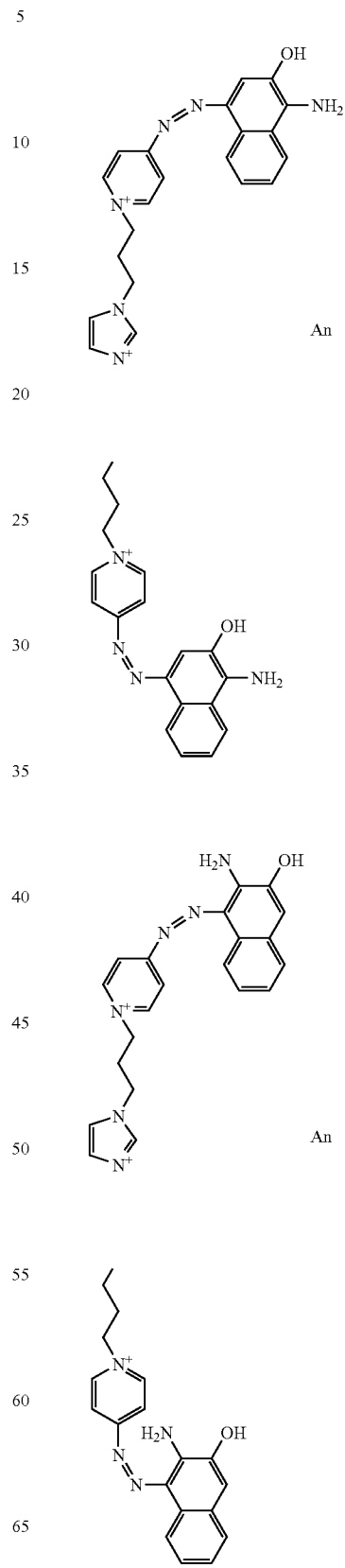

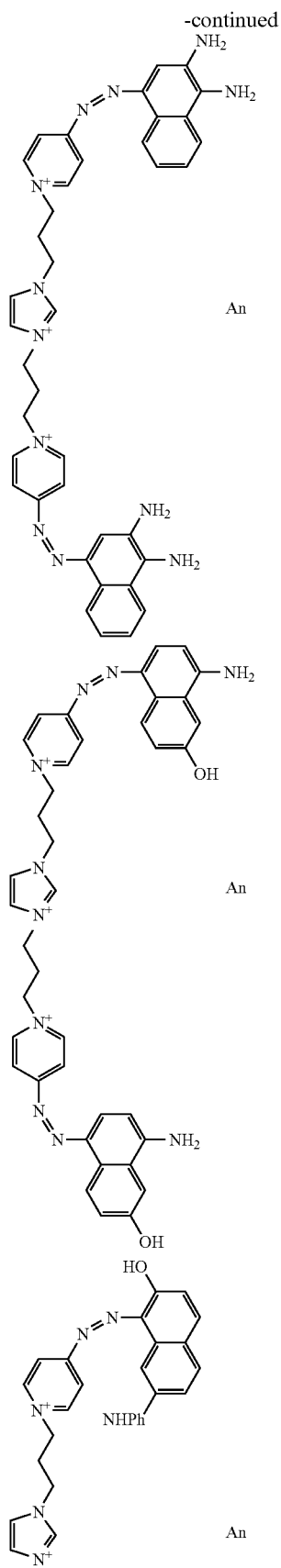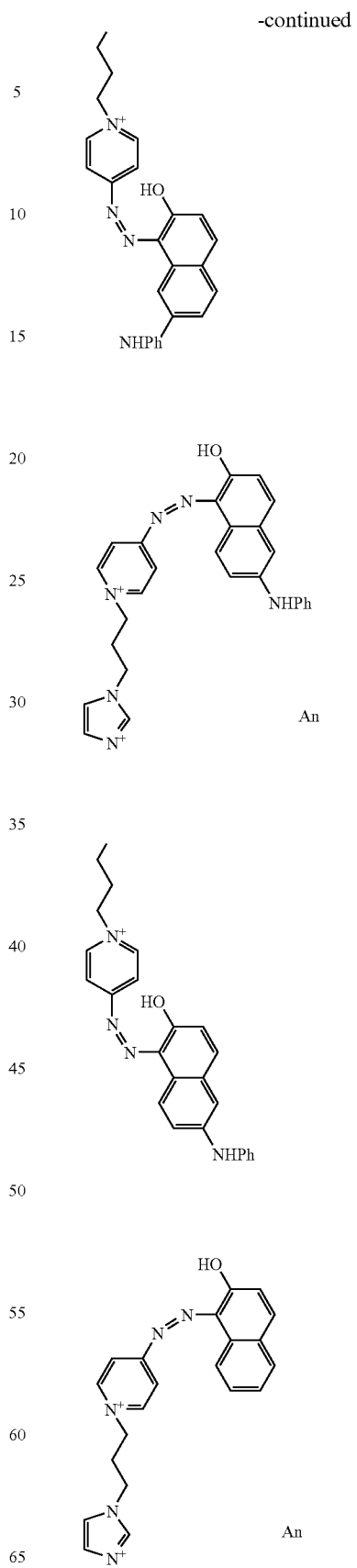

-continued

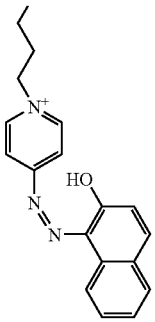

The compounds corresponding to the monoazo species may be obtained from preparation processes described, for example, in U.S. Pat. Nos. 5,708,151, 3,151,106, and 5,852,179; *J. Chem. Res., Synop.* 1998, 10, 648-9; *Heterocycles,* 1987, 26 (2) 313-7; *Synth. Commun.* 1999, 29 (13), 2271-6; and *Tetrahedron,* 1983, 39 (7), 1091-1101. The diazo compounds may be synthesized in accordance with the processes described, for example, in European Patent Application No. 1 377 263.

Dyeing Composition

Also disclosed herein is a dyeing composition comprising at least one symmetrical cationic diazo compound chosen from compounds of formula (I) and their acid addition salts, as direct dye in a medium appropriate for the dyeing of keratin fibers.

The at least one symmetrical cationic diazo compound may be present in the dyeing composition in an amount ranging from 0.001% to 20% by weight relative to the total weight of the dyeing composition, for example, from 0.01% to 10% by weight, or from 0.05% to 5% by weight.

Oxidation Bases

The dyeing composition according to the present disclosure may also comprise at least one oxidation base. This oxidation base may be chosen from the oxidation bases conventionally used in oxidation dyeing, for example, para-phenylenediamines, bis(phenyl)alkylenediamines, para-aminophenols, ortho-aminophenols, and heterocyclic bases.

Examples of para-phenylenediamines include, but are not limited to, para-phenylenediamine, para-tolylenediamine, 2-chloro-para-phenylenediamine, 2,3-dimethyl-para-phenylenediamine, 2,6-dimethyl-para-phenylenediamine, 2,6-diethyl-para-phenylenediamine, 2,5-dimethyl-para-phenylenediamine, N,N-dimethyl-para-phenylenediamine, N,N-diethyl-para-phenylenediamine, N,N-dipropyl-para-phenylenediamine, 4-amino-N,N-diethyl-3-methylaniline, N,N-bis(β-hydroxyethyl)-para-phenylenediamine, 4-N,N-bis(β-hydroxyethyl)amino-2-methylaniline, 4-N,N-bis(β-hydroxy-ethyl)amino-2-chloroaniline, 2-β-hydroxyethyl-para-phenylenediamine, 2-fluoro-para-phenylenediamine, 2-isopropyl-para-phenylenediamine, N-(β-hydroxypropyl)-para-phenylenediamine, 2-hydroxymethyl-para-phenylenediamine, N,N-dimethyl-3-methyl-para-phenylenediamine, N-ethyl—N-(β-hydroxyethyl)-para-phenylenediamine, N-(β,γ-dihydroxypropyl)-para-phenylenediamine, N-(4'-aminophenyl)-para-phenylenediamine, N-phenyl-para-phenylenediamine, 2-β-hydroxyethyloxy-para-phenylenediamine, 2-β-acetylaminoethyloxy-para-phenylenediamine, N-(β-methoxyethyl)-para-phenylenediamine, 4-aminophenylpyrrolidine, 2-thienyl-para-phenylenediamine, 2-β-hydroxyethylamino-5-aminotoluene, and the acid addition salts thereof.

Non-limiting examples of para-phenylenediamines include para-phenylenediamine, para-tolylenediamine, 2-isopropyl-para-phenylenediamine, 2-β-hydroxyethyl-para-phenylenediamine, 2-β-hydroxyethyloxy-para-phenylenediamine, 2,6-dimethyl-para-phenylenediamine, 2,6-diethyl-para-phenylenediamine, 2,3-dimethyl-para-phenylenediamine, N,N-bis(β-hydroxyethyl)-para-phenylenediamine, 2-chloro-para-phenylenediamine and 2-β-acetylaminoethyloxy-para-phenylenediamine, and the acid addition salts thereof.

Suitable bis(phenyl)alkylenediamines include, for example, N,N'-bis(β-hydroxyethyl)-N,N'-bis(4'-aminophenyl)-1,3-diaminopropanol, N,N'-bis(β-hydroxyethyl)-N,N'-bis(4'-aminophenyl)ethylenediamine, N,N'-bis(4-aminophenyl)tetramethylenediamine, N,N'-bis(β-hydroxyethyl)-N,N'-bis(4-aminophenyl)tetramethylenediamine, N,N'-bis(4-methyl-aminophenyl)tetramethylenediamine, N,N'-bis(ethyl)-N,N'-bis(4'-amino-3'-methylphenyl)ethylenediamine and 1,8-bis(2,5-diaminophenoxy)-3,6-dioxaoctane, and the acid addition salts thereof.

Examples of para-aminophenols include, but are not limited to, para-aminophenol, 4-amino-3-methylphenol, 4-amino-3-fluorophenol, 4-amino-3-hydroxymethylphenol, 4-amino-2-methylphenol, 4-amino-2-hydroxymethylphenol, 4-amino-2-methoxymethylphenol, 4-amino-2-aminomethylphenol, 4-amino-2-(β-hydroxyethylaminomethyl)phenol and 4-amino-2-fluorophenol, and the acid addition salts thereof.

Non-limiting examples of ortho-aminophenols include 2-aminophenol, 2-amino-5-methylphenol, 2-amino-6-methylphenol and 5-acetamido-2-aminophenol, and the acid addition salts thereof.

Suitable heterocyclic bases include, for example, pyridine derivatives, pyrimidine derivatives, and pyrazole derivatives.

Examples of pyridine derivatives include, but are not limited to, compounds described, for example, in British Patent Nos. 1 026 978 and 1 153 196, such as 2,5-diaminopyridine, 2-(4-methoxyphenyl)amino-3-aminopyridine, 2,3-diamino-6-methoxypyridine, 2-(β-methoxyethyl)amino-3-amino-6-methoxypyridine and 3,4-diamino-pyridine, and the acid addition salts thereof.

Non-limiting examples of pyrimidine derivatives include the compounds described, for example, in German Patent No. 2 359 399; Japanese Patent Application No. 88-169 571; Japanese Patent No. 5-163 124; European Patent No. 0 770 375, and International Patent Application No. WO 96/15765, such as 2,4,5,6-tetraaminopyrimidine, 4-hydroxy-2,5,6-triaminopyrimidine, 2-hydroxy-4,5,6-triaminopyrimidine, 2,4-dihydroxy-5,6-diaminopyrimidine and 2,5,6-triaminopyrimidine, and pyrazolopyrimidine derivatives such as those mentioned in French Patent Application No. 2 750 048, for example, pyrazolo[1,5-a]pyrimidine-3,7-diamine; 2,5-dimethylpyrazolo[1,5-a]pyrimidine-3,7-diamine; pyrazolo[1,5-a]pyrimidine-3,5-diamine; 2,7-dimethylpyrazolo[1,5-a]pyrimidine-3,5-diamine; 3-aminopyrazolo[1,5-a]pyrimidin-7-ol; 3-aminopyrazolo[1,5-a]pyrimidin-5-ol; 2-(3-aminopyrazolo[1,5-a]pyrimidin-7-ylamino)ethanol, 2-(7-aminopyrazolo[1,5-a]pyrimidin-3-ylamino)ethanol, 2-[(3-aminopyrazolo[1,5-a]pyrimidin-7-yl)(2-hydroxyethyl) amino]ethanol, 2-[(7-aminopyrazolo[1,5-a]pyrimidin-3-yl)(2-hydroxyethyl)amino]ethanol, 5,6-dimethylpyrazolo[1,5-a]pyrimidine-3,7-diamine, 2,6-dimethylpyrazolo[1,5-a]pyrimidine-3,7-diamine, 2,5, N7, N7-tetramethylpyrazolo[1,5-a]pyrimidine-3,7-diamine and 3-amino-5-methyl-7-imidazolylpropylaminopyrazolo[1,5-a]pyrimidine, the acid addition salts thereof, and the tautomeric forms thereof, when a tautomeric equilibrium exists.

Suitable pyrazole derivatives include, for example, the compounds described, for instance in German Patent Nos. 3 843 892 4 133 957, International Patent Application Nos. WO 94/08969 and WO 94/08970, French Patent Application No. 2 733 749, and German Patent Application No. 195 43 988, such as 4,5-diamino-1-methylpyrazole, 4,5-diamino-1-(β-hydroxyethyl)pyrazole, 3,4-diaminopyrazole, 4,5-diamino-1-(4'-chlorobenzyl)pyrazole, 4,5-diamino-1,3-dimethylpyrazole, 4,5-diamino-3-methyl-1-phenylpyrazole, 4,5-diamino-1-methyl-3-phenylpyrazole, 4-amino-1,3-dimethyl-5-hydrazinopyrazole, 1-benzyl-4,5-diamino-3-methylpyrazole, 4,5-diamino-3-tert-butyl-1-methylpyrazole, 4,5-diamino-1-tert-butyl-3-methylpyrazole, 4,5-diamino-1-(β-hydroxyethyl)-3-methylpyrazole, 4,5-diamino-1-ethyl-3-methylpyrazole, 4,5-diamino-1-ethyl-3-(4'-methoxyphenyl) pyrazole, 4,5-diamino-1-ethyl-3-hydroxymethylpyrazole, 4,5-diamino-3-hydroxymethyl-1-methylpyrazole, 4,5-diamino-3-hydroxymethyl-1-isopropylpyrazole, 4,5-diamino-3-methyl-1-isopropylpyrazole, 4-amino-5-(2'-aminoethyl) amino-1,3-dimethylpyrazole, 3,4,5-triaminopyrazole, 1-methyl-3,4,5-triaminopyrazole, 3,5-diamino-1-methyl-4-methylaminopyrazole and 3,5-diamino-4-(β-hydroxyethyl) amino-1-methylpyrazole, and the acid addition salts thereof.

The at least one oxidation base may be present in the dyeing composition in a total amount ranging from 0.001% to 10% by weight of the total weight of the dyeing composition, for example, from 0.005% to 6% by weight.

Couplers

The dyeing composition according to the present disclosure may also contain at least one coupler conventionally used for dyeing keratin fibers. Examples of couplers include, but are not limited to, meta-phenylenediamines, meta-aminophenols, meta-diphenols, naphthalenic couplers, and heterocyclic couplers.

Further non-limiting examples of suitable couplers include 2-methyl-5-aminophenol, 5-N-(β-hydroxyethyl)amino-2-methylphenol, 6-chloro-2-methyl-5-aminophenol, 3-aminophenol, 1,3-dihydroxybenzene, 1,3-dihydroxy-2-methylbenzene, 4-chloro-1,3-dihydroxybenzene, 2,4-diamino-1-(β-hydroxyethyloxy)benzene, 2-amino-4-(β-hydroxyethylamino)-1-methoxybenzene, 1,3-diaminobenzene, 1,3-bis(2,4-diaminophenoxy)propane, 3-ureidoaniline, 3-ureido-1-dimethylaminobenzene, sesamol, 1-β-hydroxyethylamino-3,4-methylenedioxybenzene, α-naphthol, 2-methyl-1-naphthol, 6-hydroxyindole, 4-hydroxyindole, 4-hydroxy-N-methylindole, 2-amino-3-hydroxypyridine, 6-hydroxybenzomorpholine, 3,5-diamino-2,6-dimethoxypyridine, 1-N-(β-hydroxyethyl)amino-3,4-methylenedioxybenzene and 2,6-bis(β-hydroxy-ethylamino) toluene, and the acid addition salts thereof.

The at least one coupler may be present in the dyeing composition in a total amount ranging from 0.001% to 10% by weight of the total weight of the dyeing composition, for example, from 0.005% to 6% by weight.

In general, the acid addition salts that may be used in the context of the dyeing compositions of the present disclosure for the oxidation bases and couplers may be chosen from those listed in the context of the definition of the compounds of formula (I). For example, the acid addition salts may include the addition salts with an organic or inorganic acid such as hydrochloric acid, hydrobromic acid, sulphuric acid, and (alkyl- or phenyl-)sulphonic acids such as p-toluenesulphonic acid and methylsulphonic acid.

Additional Direct Dyes

The composition according to the present disclosure may optionally comprise at least one additional direct dye other than the compounds of formula (I). This dye may be chosen from cationic and nonionic species.

Non-limiting examples of suitable additional direct dyes include nitrobenzene dyes; azo, azomethine, methine, tetraazapentamethine, anthraquinone, naphthoquinone, benzoquinone, phenothiazine, indigoid, xanthene, phenanthridine, and phthalocyanine dyes; dyes derived from triarylmethane; natural dyes; and mixtures thereof.

The at least one additional direct dye may be chosen, for example, from red and orange nitrobenzene dyes, such as:
1-hydroxy-3-nitro-4-N-(γ-hydroxypropyl)aminobenzene,
N-(β-hydroxyethyl)amino-3-nitro-4-aminobenzene,
1-amino-3-methyl-4-N-(β-hydroxyethyl)amino-6-nitrobenzene,
1-hydroxy-3-nitro-4-N-(β-hydroxyethyl)aminobenzene,
1,4-diamino-2-nitrobenzene,
1-amino-2-nitro-4-methylaminobenzene,
N-(β-hydroxyethyl)-2-nitro-para-phenylenediamine,
1-amino-2-nitro-4-(β-hydroxyethyl)amino-5-chlorobenzene,
2-nitro-4-aminodiphenylamine,
1-amino-3-nitro-6-hydroxybenzene,
1-(β-aminoethyl)amino-2-nitro-4-(β-hydroxyethyloxy) benzene,
1-(β,γ-dihydroxypropyl)oxy-3-nitro-4-(β-hydroxyethyl) aminobenzene,
1-hydroxy-3-nitro-4-aminobenzene,
1-hydroxy-2-amino-4,6-dinitrobenzene,
1-methoxy-3-nitro-4-(β-hydroxyethyl)aminobenzene,
2-nitro-4'-hydroxydiphenylamine, and
1-amino-2-nitro-4-hydroxy-5-methylbenzene.

The at least one additional direct dye may also be chosen from yellow and green-yellow nitrobenzene direct dyes; for example:
1-β-hydroxyethyloxy-3-methylamino-4-nitrobenzene,
1-methylamino-2-nitro-5-(β,γ-dihydroxypropyl)oxybenzene,
1-(β-hydroxyethyl)amino-2-methoxy-4-nitrobenzene,
1-(β-aminoethyl)amino-2-nitro-5-methoxybenzene,
1,3-di(β-hydroxyethyl)amino-4-nitro-6-chlorobenzene,
1-amino-2-nitro-6-methylbenzene,
1-(β-hydroxyethyl)amino-2-hydroxy-4-nitrobenzene,
N-(β-hydroxyethyl)-2-nitro-4-trifluoromethylaniline,
4-(β-hydroxyethyl)amino-3-nitrobenzenesulphonic acid,
4-ethylamino-3-nitrobenzoic acid,
4-(β-hydroxyethyl)amino-3-nitrochlorobenzene,
4-(β-hydroxyethyl)amino-3-nitromethylbenzene,
4-(β,γ-dihydroxypropyl)amino-3-nitrotrifluoromethylbenzene,
1-(β-ureidoethyl)amino-4-nitrobenzene,
1,3-diamino-4-nitrobenzene,
1-hydroxy-2-amino-5-nitrobenzene,
1-amino-2-[tris(hydroxymethyl)methyl]amino-5-nitrobenzene,
1-(β-hydroxyethyl)amino-2-nitrobenzene, and
4-(β-hydroxyethyl)amino-3-nitrobenzamide.

The at least one additional direct dye may also be chosen from blue and violet nitrobenzene direct dyes; for instance:
1-(β-hydroxyethyl)amino-4-N,N-bis(β-hydroxyethyl) amino-2-nitrobenzene,
1-(γ-hydroxypropyl)amino-4-N,N-bis(β-hydroxyethyl) amino-2-nitrobenzene,
1-(β-hydroxyethyl)amino-4-(N-methyl-N-β-hydroxyethyl)amino-2-nitrobenzene, 1-(β-hydroxyethyl)amino-4-(N-ethyl-N-β-hydroxyethyl)amino-2-nitrobenzene,
1-(β,γ-dihydroxypropyl)amino-4-(N-ethyl-N-β-hydroxyethyl)amino-2-nitrobenzene, and
2-nitro-para-phenylenediamines having the following formula:

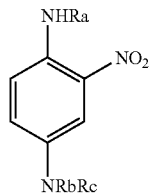

in which:
Rb is chosen from $C_1$-$C_4$ alkyl radicals and β-hydroxyethyl, β-hydroxypropyl, and γ-hydroxypropyl radicals;
Ra and Rc, which may be identical or different, are independently chosen from β-hydroxyethyl, β-hydroxypropyl, γ-hydroxypropyl, and β,γ-dihydroxypropyl radicals,
with the proviso that at least one of the radicals Rb, Rc, or Ra is a γ-hydroxypropyl radical,
and
with the proviso that Rb and Rc are not simultaneously β-hydroxyethyl radicals when Rb is a γ-hydroxypropyl radical,
such as those described in French Patent No. 2 692 572.

Examples of azo direct dyes include, but are not limited to, the cationic azo dyes described in International Patent Application Nos. WO 95/15144, WO 95/01772, WO 02/078660, WO 02/100834, and WO 02/100369, European Patent No. 0 714 954, and French Patent Application Nos. 2 822 696, 2 825 702, 2 825 625, 2 822 698, 2 822 693, 2 822 694, 2 829 926, 2 807 650, and 2 844 269.

Further non-limiting examples of azo direct dyes include:
1,3-dimethyl-2-[[4-(dimethylamino)phenyl]azo]-1H-imidazolium chloride,
1,3-dimethyl-2-[(4-aminophenyl)azo]-1H-imidazolium chloride, and
1-methyl-4-[(methylphenylhydrazono)methyl]pyridinium methylsulphate.

Other suitable azo direct dyes include, for example, dyes described in the Color Index International 3rd edition, such as:
Disperse Red 17,
Acid Yellow 9,
Acid Black 1,
Basic Red 22,
Basic Red 76,
Basic Yellow 57,
Basic Brown 16,
Acid Yellow 36,
Acid Orange 7,
Acid Red 33,
Acid Red 35,
Basic Brown 17,
Acid Yellow 23,
Acid Orange 24, and
Disperse Black 9.

Still further examples of azo direct dyes include, but are not limited to, 1-(4'-aminodiphenylazo)-2-methyl-4-[bis(β-hydroxyethyl)amino]benzene and 4-hydroxy-3-(2-methoxyphenylazo)-1-naphthalenesulphonic acid.

Non-limiting examples of quinone direct dyes include:
Disperse Red 15,
Solvent Violet 13,
Acid Violet 43,
Disperse Violet 1,
Disperse Violet 4,
Disperse Blue 1,
Disperse Violet 8,
Disperse Blue 3,
Disperse Red 11,
Acid Blue 62,
Disperse Blue 7,
Basic Blue 22,
Disperse Violet 15,
Basic Blue 99,
1-N-methylmorpholiniumpropylamino-4-hydroxyanthraquinone,
1-aminopropylamino-4-methylaminoanthra-quinone,
1-aminopropylaminoanthraquinone,
5-β-hydroxyethyl-1,4-diaminoanthraquinone,
2-aminoethylaminoanthraquinone, and
1,4-bis(β,γ-dihydroxypropylamino)anthraquinone.

Examples of azine dyes include, but are not limited to:
Basic Blue 17, and
Basic Red 2.

Suitable triarylmethane dyes include, for example:
Basic Green 1,
Acid Blue 9,
Basic Violet 3,
Basic Violet 14,
Basic Blue 7,
Acid Violet 49,
Basic Blue 26, and
Acid Blue 7.

Non-limiting examples of indoamine dyes include:
2-β-hydroxyethylamino-5-[bis(β-4'-hydroxyethyl)amino]anilino-1,4-benzoquinone;
2-β-hydroxyethylamino-5-(2'-methoxy-4'-amino)anilino-1,4-benzoquinone;
3-N-(2'-chloro-4'-hydroxy)phenylacetyl-amino-6-methoxy-1,4-benzoquinoneimine;
3-N-(3'-chloro-4'-methylamino)phenylureido-6-methyl-1,4-benzoquinoneimine; and
3-[4'-N-(ethylcarbamylmethyl)amino]phenylureido-6-methyl-1,4-benzoquinoneimine.

Examples of tetraazapentamethine dyes include, but are not limited to the following compounds given in the table below, wherein An is defined above:

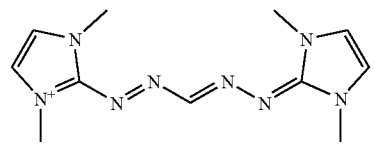

An

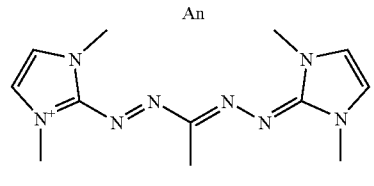

An

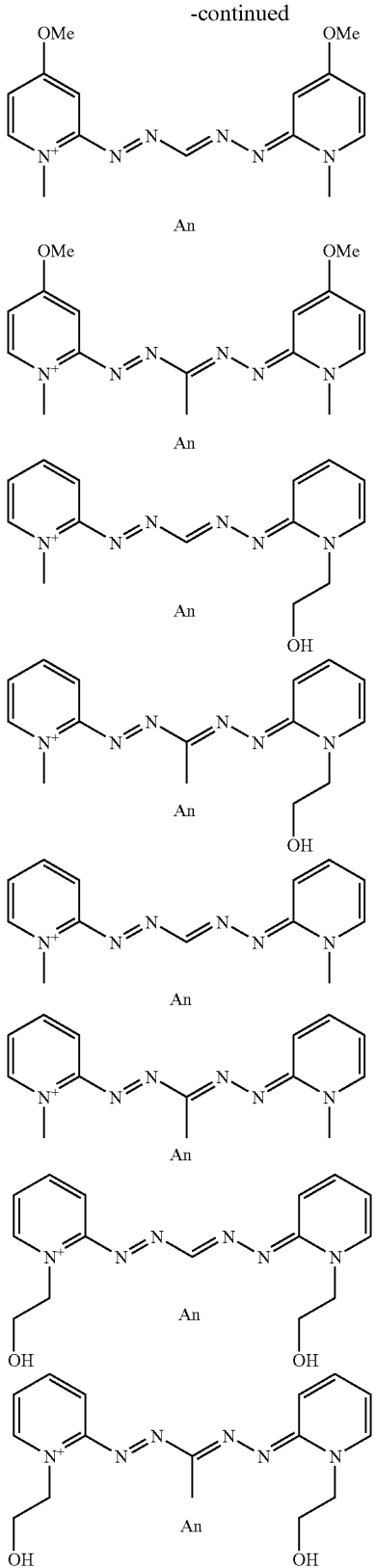

Suitable natural direct dyes may be chosen, for example, from lawsone, juglone, alizarin, purpurin, carminic acid, kermesic acid, purpurogallin, protocatechaldehyde, indigo, isatin, curcumin, spinulosin, and apigenidin. Extracts or decoctions containing these natural dyes may also be used, for example, henna-based poultices and extracts.

The at least one additional direct dye may be present in the dyeing composition in an amount ranging from 0.001% to 20% by weight relative to the total weight of the composition, for example, from 0.01% to 10% by weight relative to the total weight of the composition.

Medium Suitable for Dyeing

The medium that is suitable for dyeing, also known as the dye vehicle, may generally comprise water or of a mixture of water and of at least one organic solvent to dissolve any compounds that would not be sufficiently water-soluble.

The at least one organic solvent may be chosen from linear or branched, saturated or unsaturated monoalcohols and diols comprising from 2 to 10 carbon atoms, such as ethyl alcohol, isopropyl alcohol, hexylene glycol (2-methyl-2,4-pentanediol), neopentyl glycol and 3-methyl-1,5-pentanediol; aromatic alcohols such as benzyl alcohol and phenylethyl alcohol; glycols and glycol ethers, for instance, ethylene glycol monomethyl, monoethyl and monobutyl ether, propylene glycol and its ethers such as propylene glycol monomethyl ether, butylene glycol, and dipropylene glycol; diethylene glycol alkyl ethers, for example, $C_1$-$C_4$ ethers, for instance, diethylene glycol monoethyl ether and monobutyl ether; and mixtures thereof. In at least one embodiment, the at least one organic solvent may be chosen from saturated monoalcohols and diols.

The at least one solvent may be present in the dyeing composition in an amount ranging from 1% to 40% by weight, for example, from 5% to 30% by weight, relative to the total weight of the composition.

Adjuvants

The dyeing composition in accordance with the present disclosure may also include at least one adjuvant conventionally used in compositions for dyeing the hair, such as anionic, cationic, nonionic, amphoteric, zwitterionic surfactants, and mixtures thereof; anionic, cationic, nonionic, amphoteric, zwitterionic polymers, and mixtures thereof; mineral and organic thickeners, for example, anionic, cationic, non-ionic, and amphoteric polymeric associative thickeners; antioxidants; penetrants; sequestrants; fragrances; buffers; dispersants; conditioning agents, for instance, silicones, which may or may not be volatile or be modified; film-forming agents; ceramides; preservatives; and opacifiers.

The at least one adjuvant may be present in the composition in an amount for each of them ranging from 0.01% to 20% by weight relative to the total weight of the composition.

A person skilled in the art will of course take care to select the at least one optional additional compound such that the advantageous properties intrinsically associated with the oxidation dyeing composition in accordance with the present disclosure are not, or not substantially, adversely affected by the envisaged addition.

The pH of the dyeing composition in accordance with the present disclosure may range generally from 3 to 12, for example, from 5 to 11. The pH may be adjusted to the desired value using acidifying or alkalifying agents conventionally used in the dyeing of keratin fibers, or alternatively using standard buffer systems.

Examples of suitable acidifying agents include, but are not limited to, mineral and organic acids such as hydrochloric acid; orthophosphoric acid; sulphuric acid; carboxylic acids, such as acetic acid, tartaric acid, citric acid, and lactic acid; and sulphonic acids.

Non-limiting examples of alkalifying agents include aqueous ammonia; alkaline carbonates; alkanolamines such as monoethanolamine, diethanolamine, triethanolamine, and derivatives thereof; sodium hydroxide; potassium hydroxide; and compounds of the following formula:

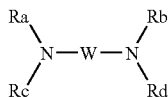

in which
W is chosen from propylene residues optionally substituted by at least one entity chosen from hydroxyl groups and $C_1$-$C_4$ alkyl radicals; and
Ra, Rb, Rc, and Rd, which may be identical or different, are independently chosen from hydrogen, $C_1$-$C_4$ alkyl radicals, and $C_1$-$C_4$ hydroxyalkyl radicals.

The dyeing composition according to the present disclosure may be in various forms chosen, for example, from liquids, creams, gels, and any other forms suitable for dyeing keratin fibers such as human hair.

Oxidizing Agents

The composition according to the present disclosure may further comprise at least one oxidizing agent. In this case, the composition may be referred to as a ready-to-use composition.

As used herein, a "ready-to-use composition" is a composition intended to be applied immediately to the keratin fibers, i.e., it may be stored in unmodified form before use or may result from the extemporaneous mixing of two or more compositions.

A ready-to-use composition may also be obtained by mixing a composition according to the present disclosure with an oxidizing composition.

The at least one oxidizing agent may be chosen from any oxidizing agents conventionally used in the field. For example, the at least one oxidizing agent may be chosen from hydrogen peroxide; urea peroxide; alkali metal bromates; persalts such as perborates and persulphates; and enzymes, for example, peroxidases, 2-electron oxidoreductases such as uricases, and 4-electron oxygenases such as laccases. In at least one embodiment, the at least one oxidizing agent may be hydrogen peroxide.

The at least one oxidizing agent may be present in the ready-to-use composition in an amount ranging from 1% to 40% by weight, relative to the total weight of the ready-to-use composition, for example, from 1% to 20% by weight relative to the total weight of the ready-to-use composition.

Generally, the oxidizing composition may be an aqueous composition and may be in the form of a solution or an emulsion.

A dye composition free of oxidizing agent may be mixed with about 0.5 to 10 weight equivalents of the oxidizing composition.

In at least one embodiment, the pH of the ready-to-use composition may range from 4 to 12, for example, from 7 to 11.5.

The pH of the composition may be adjusted using an acidifying or alkalifying agent chosen, for example, from those mentioned previously in the context of the description of adjuvants according to the present disclosure.

Method for Dyeing

Further disclosed herein is a method for coloring comprising the application of a dyeing composition according to the present disclosure to wet or dry keratin fibers.

The application to the fibers of the dyeing composition comprising at least one symmetrical cationic diazo compound chosen from compounds of formula (I) and the acid addition salts thereof, optionally at least one oxidation base optionally combined with at least one coupler, and optionally at least one additional direct dye, may be performed in the presence of at least one oxidizing agent.

This oxidizing agent may be added to the composition comprising the at least one compound of formula (I) and the optional oxidation bases, couplers, and/or additional direct dyes, either at the time of use or directly on the keratin fiber.

The oxidizing composition may also include various adjuvants conventionally used in compositions for dyeing the hair and as defined above.

The pH of the oxidizing composition containing the oxidizing agent may be such that, after mixing with the dye composition, the pH of the resulting composition applied to the keratin fibers may range from 4 to 12, for example, from 7 to 11.5. The pH may be adjusted to the desired value by means of acidifying or alkalifying agents conventionally used in the dyeing of keratin fibers and as defined above.

The composition that is finally applied to the keratin fibers may be in various forms chosen, for example, from liquids, creams, gels, and any other forms that are suitable for dyeing keratin fibers such as human hair.

According to one embodiment, the composition according to the present disclosure is free of oxidation base and of coupler.

The composition applied to the keratin fibers may optionally comprise at least one oxidizing agent.

The composition is thus applied to the wet or dry keratin fibers and is then left for a leave-in time that is sufficient to give the desired coloration.

Regardless of whether the dyeing composition does or does not comprise an oxidizing agent, the leave-in time generally may range from few seconds to one hour, for example, from 3 to 30 minutes.

The temperature at which the composition is left to act generally may range from 15 to 220° C., for example, from 15 to 80° C., or from 15 to 40° C.

After a sufficient leave-in time, the composition may be removed by rinsing with water, optionally followed by washing with a shampoo, and then optionally by drying.

Device

Still further disclosed herein is a device comprising a plurality of compartments, or a dyeing kit, in which a first compartment contains a dyeing composition of the present disclosure and a second compartment contains an oxidizing composition. This device may be equipped with a means for delivering the desired mixture to the hair, such as the devices described in French Patent No. 2 586 913.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, unless otherwise indicated the numerical values set forth in the specific examples are reported as precisely as possible. Any numerical value, however, inherently contain certain errors necessarily resulting from the standard deviation found in their respective testing measurements.

By way of non-limiting illustration, concrete examples of certain embodiments of the present disclosure are given below.

EXAMPLES

Example 1

Synthesis of Compound 2

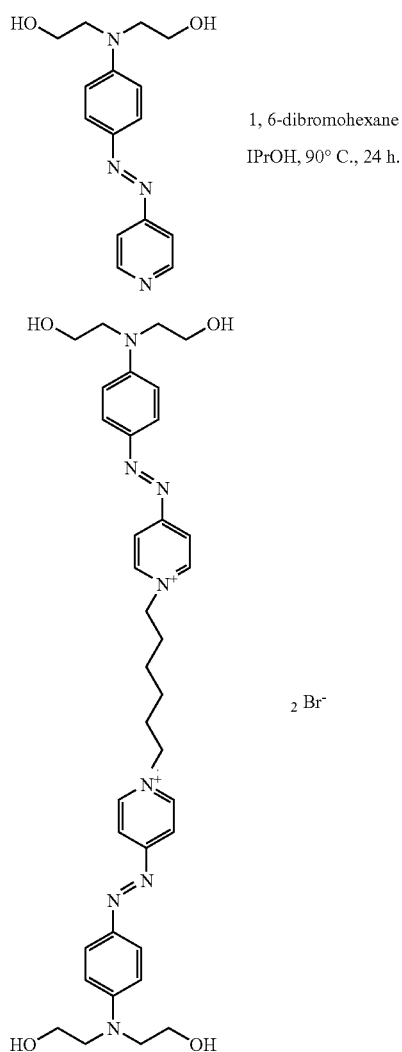

Compound 1 was obtained by reacting the diazonium salt of 4-aminopyridine with the aniline derivative.

Compound 1 (15 g) was reacted in the presence of 6.39 g of 1,6-dibromohexane in 100 ml of isopropanol at 100° C. for 24 hours. The reaction mixture was brought to ambient temperature beforehand. A precipitate formed in the course of cooling. The resulting precipitate was isolated by filtration, resuspended in 75 ml of isopropanol, isolated by filtration again and, finally, dried under vacuum. A violet powder (23 g) corresponding to the compound of structure 2 was obtained.

The $^1$H NMR and mass analyses were in accordance with the expected product.

Example 2

Synthesis of Compound 3

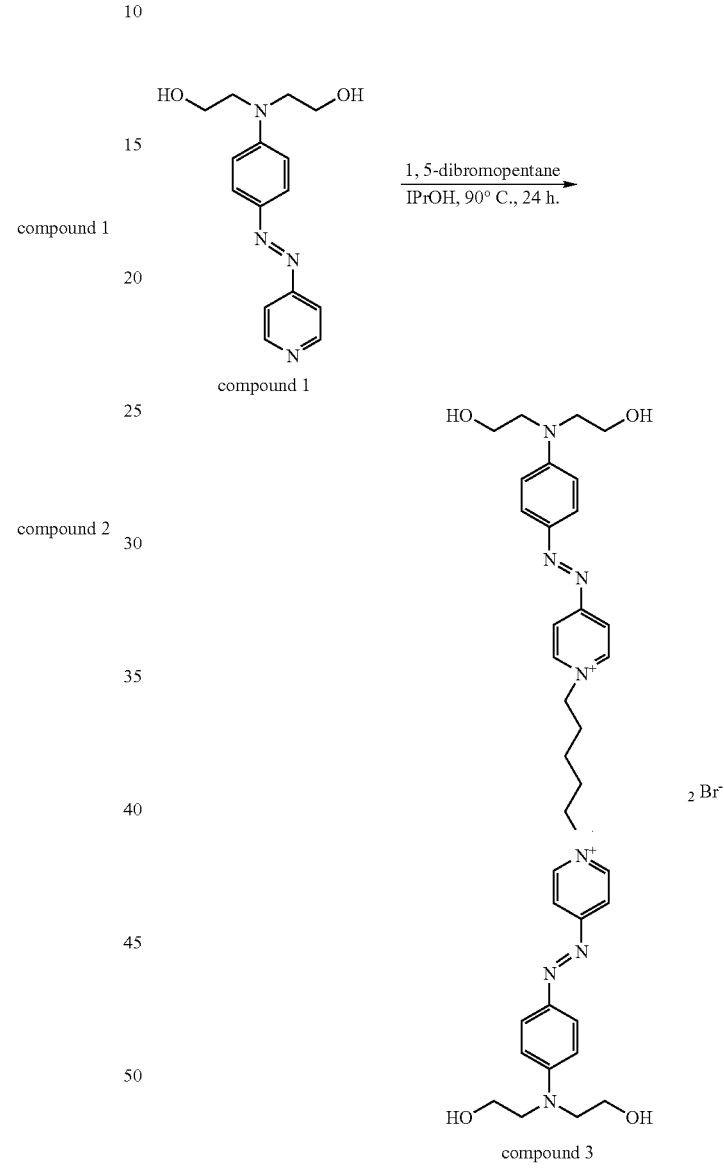

Compound 1 (15 g) was reacted in the presence of 6.03 g of 1,5-dibromopentane in 100 ml of isopropanol at 100° C. for 24 hours. The reaction mixture was brought to ambient temperature beforehand. A precipitate formed in the course of cooling. The resulting precipitate was isolated by filtration, resuspended in 75 ml of isopropanol, then isolated by filtration again and, finally, dried under vacuum. A violet powder (23 g) corresponding to the compound of structure 3 was obtained.

The $^1$H NMR and mass analyses were in accordance with the expected product.

Example 3

Synthesis of Compound 4

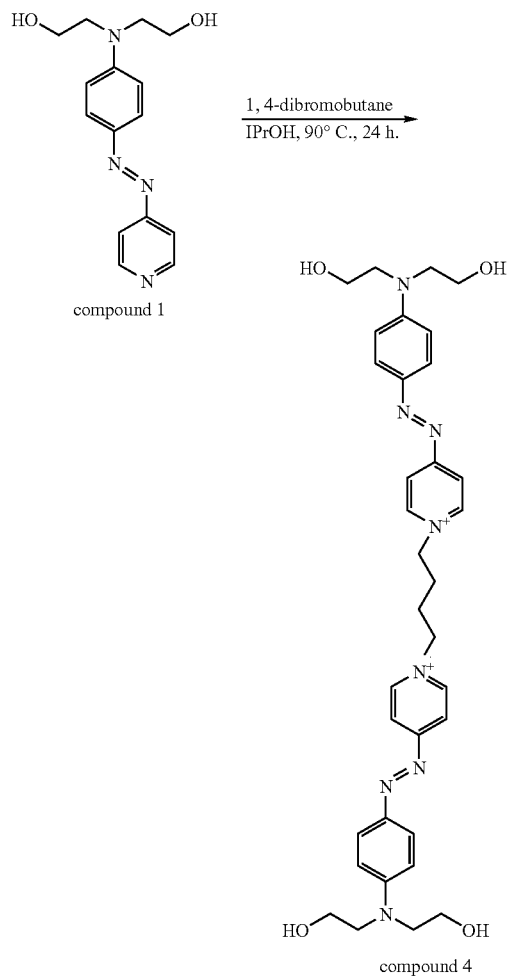

Compound 1 (15 g) was reacted in the presence of 5.66 g of 1,4-dibromobutane in 100 ml of isopropanol at 100° C. for 24 hours. The reaction mixture was brought to ambient temperature beforehand. A precipitate formed in the course of cooling. The resulting precipitate was isolated by filtration, resuspended in 75 ml of isopropanol, then isolated by filtration again and, finally, dried under vacuum. A violet powder (19 g) corresponding to the compound of structure 4 was obtained.

The $^1$H NMR and mass analyses were in accordance with the expected product.

Example 4

Synthesis of Compound 5

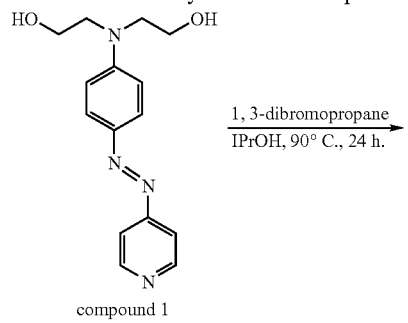

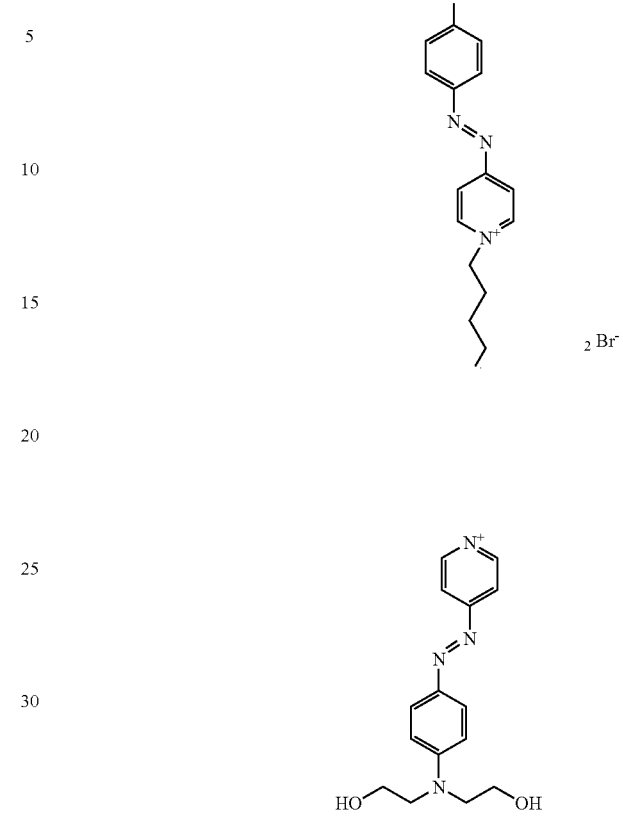

Compound 1 (15 g) was reacted in the presence of 5.29 g of 1,3-dibromopropane in 100 ml of isopropanol at 100° C. for 24 hours. The reaction mixture was brought to ambient temperature beforehand. A precipitate formed in the course of cooling. The resulting precipitate was isolated by filtration, resuspended in 75 ml of isopropanol, then isolated by filtration again and, finally, dried under vacuum. A violet powder (16 g) corresponding to the compound of structure 5 was obtained.

The $^1$H NMR and mass analyses were in accordance with the expected product.

Example 5

Synthesis of Compound 7

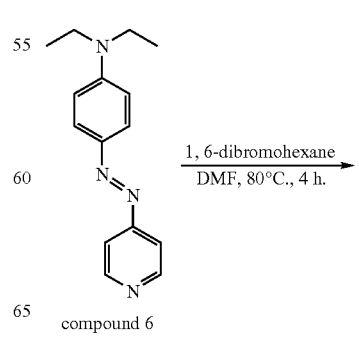

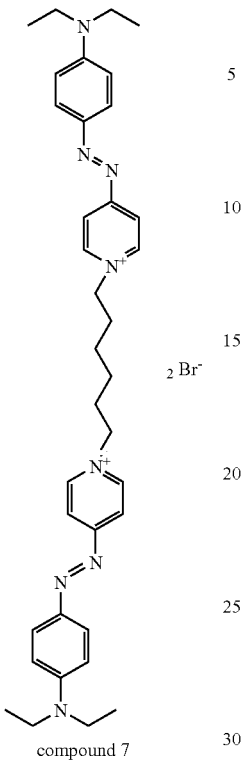

compound 7

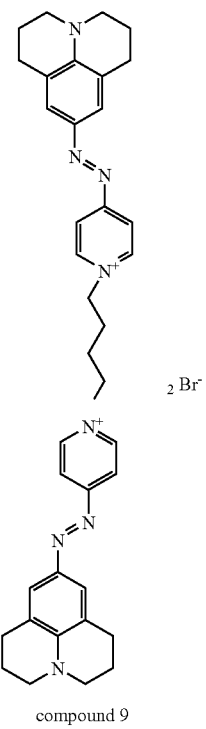

compound 9

Compound 6 is a commercially available product.

Compound 6 (3.98 g) was reacted in the presence of 1.83 g of 1,6-dibromohexane in 6 ml of DMF at 80° C. for 4 hours. The reaction mixture was brought to ambient temperature beforehand. A precipitate formed in the course of cooling. The reaction mixture containing the precipitate was poured into a solution containing 100 ml of ethyl acetate. The heterogeneous reaction mixture was filtered and the precipitate thus obtained was dried under vacuum. A violet powder (5.1 g) corresponding to the compound of structure 7 was obtained.

The $^1$H NMR and mass analyses were in accordance with the expected product.

Example 6

Synthesis of Compound 9

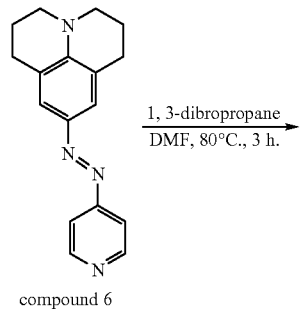

compound 6

Compound 8 was obtained by reacting the diazonium salt of 4-aminopyridine with julolidine.

Compound 8 (0.278 g) was reacted in the presence of 0.101 g of 1,3-dibromopropane in 0.3 ml of DMF at 80° C. for 3 hours. The reaction mixture was brought to ambient temperature beforehand. The reaction mixture was diluted with 50 ml of acetonitrile and then poured into a solution containing 200 ml of ethyl acetate. A precipitate was formed. The heterogeneous reaction mixture was filtered and the precipitate thus obtained was dried under vacuum. A violet powder (0.095 g) corresponding to the compound of structure 9 was obtained.

The $^1$H NMR and mass analyses were in accordance with the expected product.

Example 7

Synthesis of Compound 13

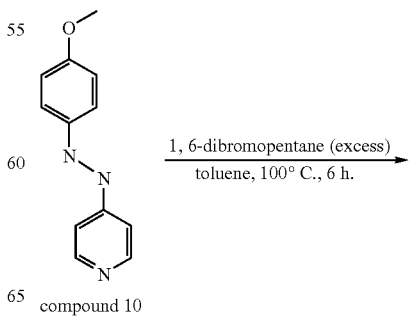

compound 10

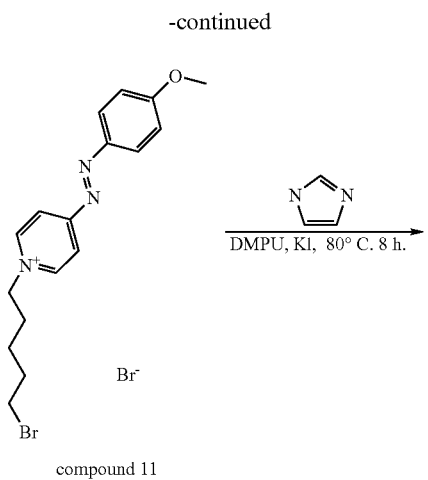

compound 11

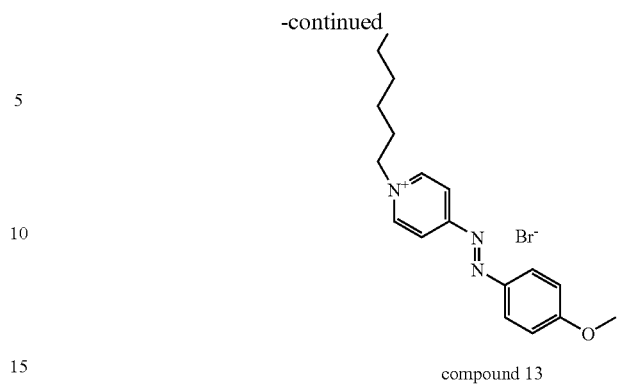

compound 13

Compound 10 was obtained in two steps:
a coupling reaction of the diazonium salt of 4-aminopyridine to phenol, and
an O-alkylation reaction in the presence of methanol and sulphuric acid.

Step 1

Compound 10 (3 g) was reacted in the presence of 68 ml of 1,5-dibromopentane in 50 ml of toluene at 100° C. for 6 hours. The reaction mixture, brought to ambient temperature beforehand, was poured into 100 ml of ethyl acetate. A precipitate was formed. The precipitate was washed a number of times with ethyl acetate, isolated by filtration, and then dried under vacuum. An orange-colored powder corresponding to the structure of compound 11 was obtained.

The $^1$H NMR and mass analyses were in accordance with the expected product.

Step 2

Compound 11 (0.2 g) was reacted in the presence of 0.187 g of imidazole, 0.091 g of potassium iodide in 4 ml of DMPU at 80° C. for 8 hours. The reaction mixture, brought to ambient temperature beforehand, was poured into 30 ml of ethyl acetate. A dark orange-colored precipitate was formed. It was isolated by filtration and then dried under vacuum. A dark orange-colored powder (0.18 g) corresponding to the compound of structure 12 was obtained.

The $^1$H NMR and mass analyses were in accordance with the expected product.

Step 3

Compound 12 (0.156 g), compound 13 (0.151 g), and potassium iodide (0.072 g) in 8 ml of DMPU were reacted at 80° C. for 8 hours. The reaction mixture, brought to ambient temperature beforehand, was poured into 50 ml of ethyl acetate. The orange-colored precipitate obtained was isolated by filtration, dried and then purified by liquid chromatography. A dark orange-colored powder corresponding to the compound of structure 13 was obtained.

The $^1$H NMR and mass analyses were in accordance with the expected product.

Example 8

Coloring Under Non-oxidizing Conditions

Compound 2

$5\times10^{-4}$ mol of compound 2, obtained above, was dissolved in 5 ml of a mixture of water (2.5 ml) and pH 10 buffer (2.5 ml) with the following composition:
2 g of ammonium acetate,
40 ml of water,
NH$_3$ at 20% to pH 9-10, and
Water to 100 ml.

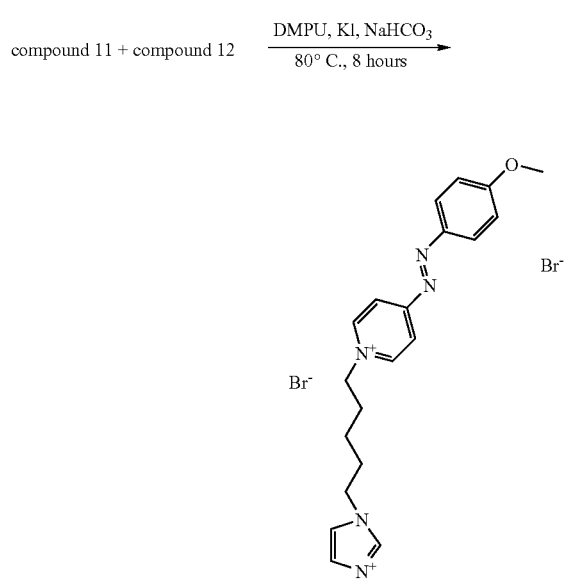

compound 12 compound 11 + compound 12 $\xrightarrow{\text{DMPU, KI, NaHCO}_3}{80° \text{C., 8 hours}}$ 100 g of the above composition was applied to the hair at ambient temperature for 30 minutes. The hair was subsequently rinsed with water and dried.

The hair was colored violet.

Compound 13

$5 \times 10^{-4}$ mol of compound 13, obtained above, was dissolved in 5 ml of a mixture of water (2.5 ml) and pH 10 buffer (2.5 ml) with the following composition:

2 g of ammonium acetate,
40 ml of water,
$NH_3$ at 20% to pH 9-10, and
Water to 100 ml.

100 g of the above composition was applied to the hair at ambient temperature for 30 minutes. The hair was subsequently rinsed with water and dried.

The hair was colored orange-yellow.

What is claimed is:

1. A symmetrical cationic diazo compound chosen from compounds of formula (I), their resonance forms, their acid addition salts, and their solvates:

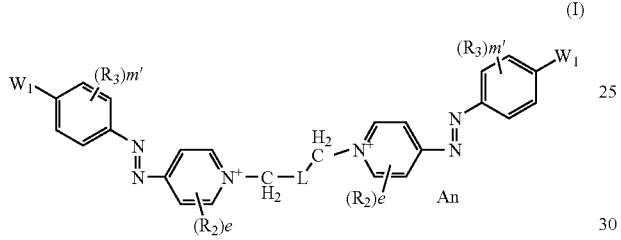

in which:

the radicals $R_2$, which may be identical or different, are independently chosen from:
- optionally substituted $C_1$-$C_{16}$ alkyl radicals optionally interrupted by at least one entity chosen from heteroatoms and groups comprising at least one heteroatom, said alkyl radicals being further optionally substituted by at least one group chosen from thio (—SH), $C_1$-$C_4$ thioalkyl; $C_1$-$C_4$ alkylsulphinyl, and $C_1$-$C_4$ alkylsulphonyl groups;
- hydroxyl groups,
- $C_1$-$C_4$ alkoxy groups,
- $C_2$-$C_4$ (poly)hydroxyalkoxy groups;
- alkoxycarbonyl groups (R"O—CO—) in which R" is chosen from $C_1$-$C_4$ alkyl radicals,
- alkylcarbonyloxy radicals (R"CO—O—) in which R" is chosen from $C_1$-$C_4$ alkyl radicals,
- alkylcarbonyl radicals (R"—CO—) in which R" is chosen from $C_1$-$C_4$ alkyl radicals,
- amino groups,
- amino groups substituted by one or two identical or different $C_1$-$C_4$ alkyl radicals optionally carrying at least one hydroxyl group, it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;
- alkylcarbonylamino groups (R"CO—NR—) in which the radical R" is chosen from $C_1$-$C_4$ alkyl radicals and the radical R is chosen from hydrogen and $C_1$-$C_4$ alkyl radicals;
- aminocarbonyl groups ((R)$_2$N—CO—) in which the radicals R, which may be identical or different, are independently chosen from hydrogen and $C_1$-$C_4$ alkyl radicals;
- ureido groups (N(R)$_2$—CO—NR—) in which the radicals R, which may be identical or different, are independently chosen from hydrogen and $C_1$-$C_4$ alkyl radicals;
- aminosulphonyl groups ((R)$_2$N—SO$_2$—) in which the radicals R, which may be identical or different, are independently chosen from hydrogen and $C_1$-$C_4$ alkyl radicals;
- alkylsulphonylamino groups (R"SO$_2$—NR—) in which R" is chosen from $C_1$-$C_4$ alkyl radicals and R is chosen from hydrogen and $C_1$-$C_4$ alkyl radicals;
- optionally substituted aryl radicals;
- optionally substituted ($C_1$-$C_4$)alkylaryl radicals;
- alkylsulphinyl groups (R"—SO—) in which R" is chosen from $C_1$-$C_4$ alkyl radicals;
- alkylsulphonyl groups (R"—SO$_2$—) in which R" is chosen from $C_1$-$C_4$ alkyl radicals;
- nitro groups;
- cyano groups;
- halogen atoms;
- thio groups (HS—); and
- alkylthio groups (R"S—) in which the radical R" is chosen from optionally substituted $C_1$-$C_4$ alkyl radicals;

when e is 2, the two radicals $R_2$ may optionally form, together with the carbon atoms to which they are attached, a secondary, aromatic or non-aromatic ring comprising 5 or 6 ring members which is optionally substituted by at least one identical or non-identical group chosen from hydroxyl groups, $C_1$-$C_4$ alkyl groups, $C_1$-$C_4$ alkoxy groups, $C_2$-$C_4$ (poly)hydroxyalkoxy groups, and amino groups, amino substituted by one or two identical or different $C_1$-$C_4$ alkyl radicals which optionally carry at least one hydroxyl group;

e is an integer ranging from 0 to 4; wherein when e is less than 4, the one or more unsubstituted carbon atoms of the heterocycle carry a hydrogen atom, the radicals $R_3$, which may be identical or different, are independently chosen from:
- optionally substituted $C_1$-$C_{16}$ alkyl radicals optionally interrupted by at least one entity chosen from heteroatoms and groups comprising at least one heteroatom,
- hydroxyl groups,
- $C_1$-$C_4$ alkoxy groups,
- $C_2$-$C_4$ (poly)hydroxyalkoxy groups;
- alkoxycarbonyl groups (R"O—CO—) in which R" is chosen from $C_1$-$C_4$ alkyl radicals,
- alkylcarbonyloxy radicals (R"CO—O—) in which R" is chosen from $C_1$-$C_4$ alkyl radicals;
- alkylcarbonyl radicals (R"—CO—) in which R" is chosen from $C_1$-$C_4$ alkyl radicals;
- amino groups;
- amino groups substituted by one or two identical or different $C_1$-$C_4$ alkyl radicals optionally carrying at least one hydroxyl group; it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;
- alkylcarbonylamino groups (R"CO—NR—) in which the radical R" is chosen from $C_1$-$C_4$ alkyl radicals and the radical R is chosen from hydrogen and $C_1$-$C_4$ alkyl radicals;
- aminocarbonyl groups ((R)$_2$N—CO—) in which the radicals R, which may be identical or different, are independently chosen from hydrogen and $C_1$-$C_4$ alkyl radicals;

ureido groups (N(R)$_2$—CO—NR—) in which the radicals R, which may be identical or different, are independently chosen from hydrogen and $C_1$-$C_4$ alkyl radicals;

aminosulphonyl groups ((R)$_2$N—SO$_2$—) in which the radicals R, which may be identical or different, are independently chosen from hydrogen and $C_1$-$C_4$ alkyl radicals;

alkylsulphonylamino groups (RSO$_2$—NR—) in which the radicals R, which may be identical or different, are independently chosen from hydrogen and $C_1$-$C_4$ alkyl radicals;

thio groups (HS—);

alkylthio groups (R"S—) in which the radical R" is chosen from $C_1$-$C_4$ alkyl radicals;

alkylsulphinyl groups (R"—SO—) in which R" is chosen from $C_1$-$C_4$ alkyl radicals;

alkylsulphonyl groups (R"—SO$_2$—) in which R" is chosen from $C_1$-$C_4$ alkyl radicals;

nitro groups;

cyano groups; and halogen atoms;

when m' is greater than or equal to 2, two adjacent radicals R$_3$ may form, together with the carbon atoms to which they are attached, a secondary, aromatic or non-aromatic ring comprising 6 ring members, which is optionally substituted by at least one identical or different group chosen from hydroxyl groups, $C_1$-$C_4$ alkyl groups, $C_1$-$C_4$ alkoxy groups, $C_2$-$C_4$ (poly)hydroxyalkoxy groups, $C_1$-$C_4$ alkylcarbonylamino groups, amino groups, amino groups substituted by one or two identical or different $C_1$-$C_4$ alkyl radicals which optionally carry at least one hydroxyl group, m' is an integer ranging from 0 to 4; wherein when m' is less than 4, the one or more unsubstituted carbon atoms of the aromatic ring carry a hydrogen atom;

the radicals W$_1$, which are identical, are chosen from:
hydrogen,
halogen atoms chosen from bromine, chlorine, and fluorine, and
—NR$_5$R$_6$, OR$_7$, —NR$_4$—Ph—NR$_5$R$_6$, —NR$_4$—Ph—OR$_7$, —O—Ph—OR$_7$, and —O—Ph—NR$_5$R$_6$ groups, wherein:

R$_4$ and R$_7$, which may be identical or different, are independently chosen from hydrogen, optionally substituted $C_1$-$C_{20}$ alkyl radicals, optionally substituted $C_1$-$C_3$ aralkyl radicals, and optionally substituted phenyl radicals;

R$_5$ and R$_6$, which may be identical or different, are independently chosen from hydrogen, optionally substituted $C_1$-$C_{20}$ alkyl radicals, optionally substituted phenyl radicals, optionally substituted $C_1$-$C_3$ aralkyl radicals, and alkylcarbonyl radicals (R"—CO—) in which R" is chosen from $C_1$-$C_4$ alkyl radicals;

R$_5$ and R$_6$ may optionally form, together with the nitrogen atom to which they are attached, a heterocycle comprising from 1 to 3 heteroatoms, chosen from N, O, and S, said heterocycle comprising from 5 to 7 ring members, and being saturated or unsaturated, aromatic or non-aromatic, and optionally substituted;

R$_5$ and R$_6$ may form, together with the carbon atom of the aromatic ring adjacent to that to which —NR$_5$R$_6$ is attached, a 5- or 6-membered saturated heterocycle; and Ph is chosen from optionally substituted phenyl radicals;

L is chosen from cationic linkers and non-cationic linkers; and the electroneutrality of the compound of formula (I) being ensured by at least one identical or non-identical, cosmetically acceptable anion An.

2. The compound of claim 1, wherein in R$_2$ and R$_3$, said at least one entity chosen from heteroatoms and groups comprising at least one heteroatom is chosen from oxygen, nitrogen, sulphur, —CO—, —SO$_2$—, and combinations thereof.

3. The compound of claim 1, wherein the radicals R$_2$, which may be identical or different, are independently chosen from:

halogen atoms chosen from chlorine and fluorine;

$C_1$-$C_4$ alkyl radicals optionally substituted by at least one identical or non-identical radical chosen from hydroxyl, $C_1$-$C_2$ alkoxy, $C_2$-$C_4$ (poly)hydroxyalkoxy, amino, $C_1$-$C_2$ (di)alkylamino, thio (—SH), $C_1$-$C_4$ alkylsulphinyl, $C_1$-$C_4$ alkylsulphonyl, and $C_1$-$C_4$ thioalkyl radicals;

phenyl radicals optionally substituted by at least one identical or non-identical radical chosen from hydroxyl, $C_1$-$C_2$ alkoxy, $C_2$-$C_4$ (poly)hydroxyalkoxy, amino, and $C_1$-$C_2$ (di)alkylamino radicals and halogen atoms;

$C_1$-$C_4$ alkoxy radicals;

$C_1$-$C_4$ alkylsulphonylamino radicals;

$C_2$-$C_4$ (poly)hydroxyalkoxy radicals;

amino radicals;

$C_1$-$C_2$ (di)alkylamino radicals;

$C_2$-$C_4$ (poly)hydroxyalkylamino radicals;

alkylsulphonylamino radicals (R"SO$_2$N—) in which the radical R" is chosen from $C_1$-$C_4$ alkyl radicals;

aminosulphonyl radicals ((R)$_2$NSO$_2$—) in which the radicals R, which may be identical or different, are independently chosen from hydrogen and $C_1$-$C_4$ alkyl radicals;

alkylthio radicals (R"S—) in which the radical R" is chosen from $C_1$-$C_4$ alkyl radicals;

alkylsulphinyl radicals (R"SO—) in which the radical R" is chosen from $C_1$-$C_4$ alkyl radicals;

alkylsulphonyl radicals (R"—SO$_2$—) in which the radical R" is chosen from $C_1$-$C_4$ alkyl radicals; and alkylcarbonylamino radicals (RCONR—) in which the radicals R, which may be identical or different, are independently chosen from hydrogen and $C_1$-$C_4$ alkyl radicals.

4. The compound of claim 1, wherein the two radicals R$_2$ may optionally form, together with the carbon atoms to which they are attached, a secondary, 6-membered aromatic ring optionally substituted by at least one identical or different group chosen from hydroxyl groups, $C_1$-$C_4$ alkyl groups, $C_1$-$C_4$ alkoxy groups, amino groups, and amino groups substituted by one or two identical or different $C_1$-$C_4$ alkyl radicals which optionally carry at least one group chosen from hydroxyl and methylcarbonylamino groups.

5. The compound of claim 1, wherein the radicals R$_3$, which may be identical or different, are independently chosen from:

optionally substituted $C_1$-$C_{16}$ alkyl radicals;

halogen atoms;

hydroxyl groups;

$C_1$-$C_2$ alkoxy radicals;

$C_2$-$C_4$ (poly)hydroxyalkoxy radicals;

amino radicals;

amino radicals substituted by one or two identical or different $C_1$-$C_4$ alkyl radicals which optionally carry at least one group chosen from hydroxyl and $C_1$-$C_4$ alkoxy groups, it being possible for the two alkyl radicals to form, together with the nitrogen atom to which they are attached, a heterocycle comprising from 1 to 3 heteroatoms, chosen from N, O, and S, the heterocycle comprising from 5 to 7 ring members, being saturated or unsaturated, aromatic or non-aromatic, and being optionally substituted;

alkylcarbonylamino radicals (R"CO—NR—) in which the radical R" is chosen from $C_1$-$C_4$ alkyl radicals and the radical R is chosen from hydrogen and $C_1$-$C_4$ alkyl radicals;

alkylsulphonylamino radicals (R"SO$_2$—NR—) in which the radical R is chosen from hydrogen and $C_1$-$C_4$ alkyl radicals and the radical R" is chosen from $C_1$-$C_4$ alkyl radicals;

aminosulphonyl radicals ((R)$_2$N—SO$_2$—) in which the radicals R, which may be identical or different, are independently chosen from hydrogen and $C_1$-$C_4$ alkyl radicals;

alkylthio radicals (R"S—) in which the radical R" is chosen from $C_1$-$C_4$ alkyl radicals; and alkylsulphonyl radicals (R"—SO$_2$—) in which the radical R" is chosen from $C_1$-$C_4$ alkyl radicals.

6. The compound of claim 1, wherein the radicals $R_3$, which may be identical or different, are independently chosen from:
$C_1$-$C_4$ alkyl radicals which are optionally substituted by at least one radical chosen from hydroxyl radicals, $C_1$-$C_2$ alkylcarbonylamino radicals, amino radicals substituted by two identical or different $C_1$-$C_2$ alkyl radicals which optionally carry at least one hydroxyl group, and $C_1$-$C_2$ alkoxy radicals, it being possible for these two alkyl radicals optionally to form, together with the nitrogen atom to which they are attached, a 5- or 6-membered heterocycle which is saturated or unsaturated and is optionally aromatic;
$C_2$-$C_4$ hydroxyalkoxy radicals;
halogen atoms chosen from chlorine and fluorine;
amino radicals;
amino radicals substituted by one or two identical or different $C_1$-$C_2$ alkyl radicals which optionally carry at least one hydroxyl group;
methylcarbonylamino radicals;
methylsulphonylamino radicals;
hydroxyl radicals;
$C_1$-$C_2$ alkoxy radicals; and
methylsulphonyl radicals.

7. The compound of claim 6, wherein the 5- or 6-membered heterocycle is chosen from pyrrolidine, piperazine, homopiperazine, pyrrole, imidazole and pyrazole heterocycles.

8. The compound of claim 1, wherein when the coefficient m' is greater than or equal to 2, then two adjacent radicals $R_3$ may form, together with the carbon atoms to which they are attached, a secondary, 6-membered aromatic ring optionally substituted by at least one identical or different group chosen from hydroxyl groups, —NR$_4$—Ph, —NR$_4$—Ph—NR$_5$R$_6$, and —NR$_4$—Ph—OR$_7$ groups, $C_1$-$C_4$ alkyl groups, $C_1$-$C_4$ alkoxy groups, $C_2$-$C_4$ (poly)hydroxyalkoxy groups, $C_1$-$C_4$ alkylcarbonylamino groups, amino groups, and amino groups substituted by one or two identical or different $C_1$-$C_4$ alkyl radicals which optionally carry at least one hydroxyl group.

9. The compound of claim 8, wherein the two adjacent radicals $R_3$ may form, with the carbon atoms to which they are attached, a secondary, 6-membered aromatic ring which is optionally substituted by at least one group chosen from hydroxyl, methoxy, ethoxy, 2-hydroxyethyloxy, amino, methylcarbonylamino, (di)-2-hydroxyethylamino, —NH—Ph, —NH—Ph—NH$_2$, —NH—Ph—NHCOCH$_3$, —NH—Ph—OH, and —NH—Ph—OCH$_3$ groups.

10. The compound of claim 1, wherein $R_4$ and $R_7$, which may be identical or different, are independently chosen from:
hydrogen;
$C_1$-$C_6$ alkyl radicals which are optionally substituted by at least one identical or different group chosen from hydroxyl and $C_1$-$C_2$ alkoxy groups; and
aryl and arylalkyl radicals, the aryl moieties being optionally substituted by at least one identical or different radical chosen from chlorine, amino radicals, hydroxyl radicals, $C_1$-$C_2$ alkoxy radicals, amino radicals which are mono- or disubstituted by one or two identical or different $C_1$-$C_4$ alkyl radicals which optionally carry at least one hydroxyl group.

11. The compound of claim 1, wherein the radicals $R_5$ and $R_6$, which may be identical or different, are independently chosen from:
hydrogen;
alkylcarbonyl radicals (R"—CO—) in which R" is chosen from optionally substituted $C_1$-$C_4$ alkyl radical;
$C_1$-$C_6$ alkyl radicals which are optionally substituted by at least one identical or non-identical group chosen from hydroxyl groups, $C_1$-$C_2$ alkoxy groups, amino groups, $C_1$-$C_4$ (di)alkylamino groups; the alkyl radicals optionally being further substituted by at least one identical or non-identical group chosen from $C_1$-$C_4$ alkylsulphonyl groups, $C_1$-$C_4$ alkylsulphinyl groups, and $C_1$-$C_4$ alkylcarbonyl groups; and
aryl and arylalkyl radicals, the aryl moieties being optionally substituted by at least one group chosen from chlorine, amino groups, hydroxyl groups, $C_1$-$C_4$ alkoxy groups, amino groups which are mono- or disubstituted by one or two identical or different $C_1$-$C_4$ alkyl radicals which optionally carry at least one hydroxyl group.

12. The compound of claim 1, wherein the radicals $R_5$ and $R_6$, which may be identical or different, are independently chosen from:
hydrogen;
methylcarbonyl, ethylcarbonyl, and propylcarbonyl radicals;
optionally substituted $C_1$-$C_3$ alkyl radicals; and
phenyl radicals which are optionally substituted by at least one radical chosen from hydroxyl radicals, $C_1$-$C_2$ alkoxy radicals, amino radicals, amino radicals substituted by at least one identical or non-identical $C_1$-$C_4$ alkyl group which optionally carries at least one hydroxyl group.

13. The compound of claim 1, wherein the radicals $R_5$ and $R_6$ form, together with the nitrogen atom to which each is attached, a heterocycle comprising from 1 to 3 heteroatoms, chosen from N, O and S, said heterocycle comprising from 5 to 7 ring members, and being saturated or unsaturated, aromatic or non-aromatic, and optionally substituted.

14. The compound of claim 13, wherein the heterocycle comprising from 5 to 7 ring members is chosen from piperidine, 2-(2-hydroxyethylpiperidine), 4-(aminomethyl)piperidine, 4-(2-hydroxyethyl)piperidine, 4-(dimethylamino)piperidine, piperazine, 1-methylpiperazine, 1-(2-hydroxyethyl)piperazine, 1-(2-aminoethyl)piperazine, 1-hydroxyethylethoxypiperazine, homopiperazine, 1-methyl-1,4-perhydrodiazepine, pyrrole, 1,4-dimethylpyrrole, 1-methyl-4-ethylpyrrole, and 1-methyl-4-propylpyrrole heterocycles.

15. The compound of claim 1, wherein the radicals $R_5$ and $R_6$, which may be identical or different, are independently chosen from alkyl radicals which, independently of one another, form, together with the carbon atom of the aromatic ring optionally substituted by a hydroxyl and adjacent to that to which —NR$_5$R$_6$ is attached, a 5- or 6-membered saturated heterocycle.

16. The compound of claim 1, wherein L is a non-cationic linker chosen from:
covalent bonds;
optionally substituted $C_1$-$C_{40}$ alkyl radicals optionally interrupted by a saturated or unsaturated, aromatic or non-aromatic (hetero)cycle comprising from 3 to 7 ring members which is optionally substituted and optionally fused, said alkyl radicals being optionally interrupted by at least one entity chosen from heteroatoms and groups comprising at least one heteroatom with the proviso that the linker L does not contain an azo, nitro, nitroso, or peroxo bond; and optionally substituted phenyl radicals.

17. The compound of claim 1, wherein said at least one entity chosen from heteroatoms and groups comprising at least one heteroatom is chosen from oxygen, nitrogen, sulphur, —CO—, —SO$_2$—, and combinations thereof.

18. The compound of claim 1, wherein L is a cationic linker chosen from C$_2$-C$_{40}$ alkyl radicals which carry at least one cationic charge and are optionally substituted and/or optionally interrupted by at least one saturated or unsaturated, aromatic or non-aromatic, identical or different (hetero)cycle comprising from 3 to 7 ring members and/or optionally interrupted by at least one entity chosen from heteroatoms, groups comprising at least one heteroatom, and combinations thereof, the linker L containing no azo, nitro, nitroso or peroxo bond; and with the proviso that the linker L carries at least one cationic charge.

19. The compound of claim 18, wherein said at least one entity chosen from heteroatoms, groups comprising at least one heteroatom, and combinations thereof is chosen from oxygen, nitrogen, sulphur, —CO—, —SO$_2$—, and combinations thereof.

20. The compound of claim 1, wherein An is chosen from organic anions, inorganic anions, and anion mixtures so as to allow the charge or charges on the compound of formula (I) to be balanced.

21. The compound of claim 1, wherein An is chosen from halides; hydroxides; sulphates; hydrogensulphates; alkylsulphates for which the linear or branched alkyl moieties are chosen from C$_1$-C$_6$ alkyls; carbonates; hydrogencarbonates; salts of carboxylic acids; alkylsulphonates for which the linear or branched alkyl moieties are chosen from C$_1$-C$_6$ alkyls; arylsulphonates for which the aryl moieties are optionally substituted by at least one C$_1$-C$_4$ alkyl radical; and alkylsulphonyls.

22. The compound of claim 1, wherein the compound is chosen from compounds of formula (I'), (II'), and (III'), their resonance forms, their acid addition salts, and their solvates:

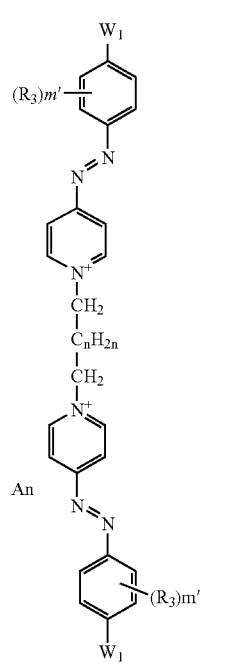

(I')

-continued

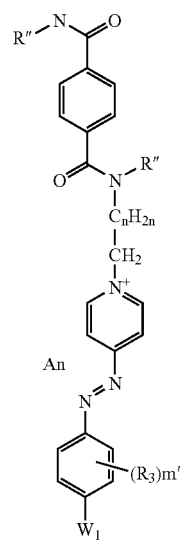

(I'')

R'' = H, Me
n = integer between 1 and 6

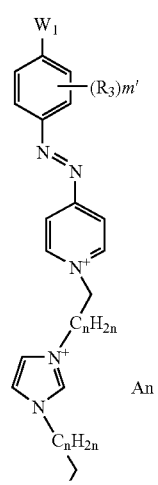

(I''')

-continued
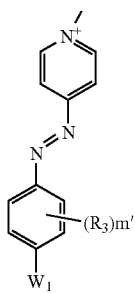
n = integer between 1 and 5.
23. The compound of claim 1, wherein the compound is chosen from compounds of the following formulae, their acid addition salts, and their solvates:
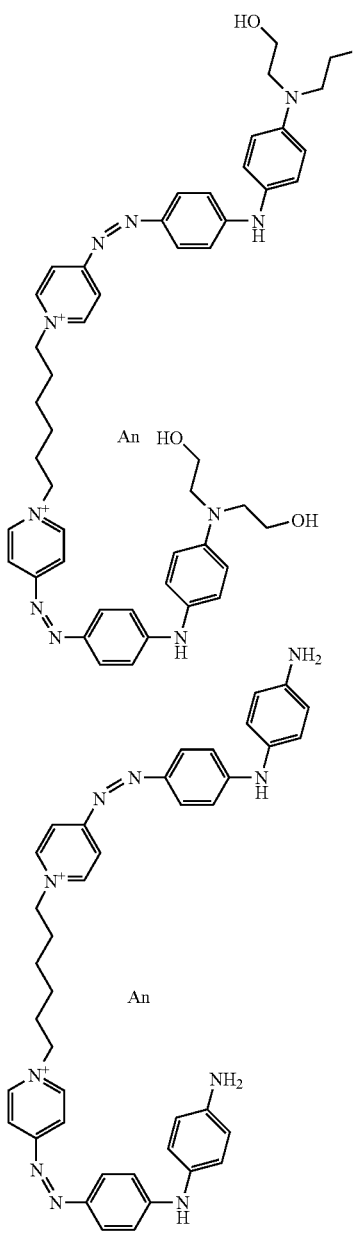
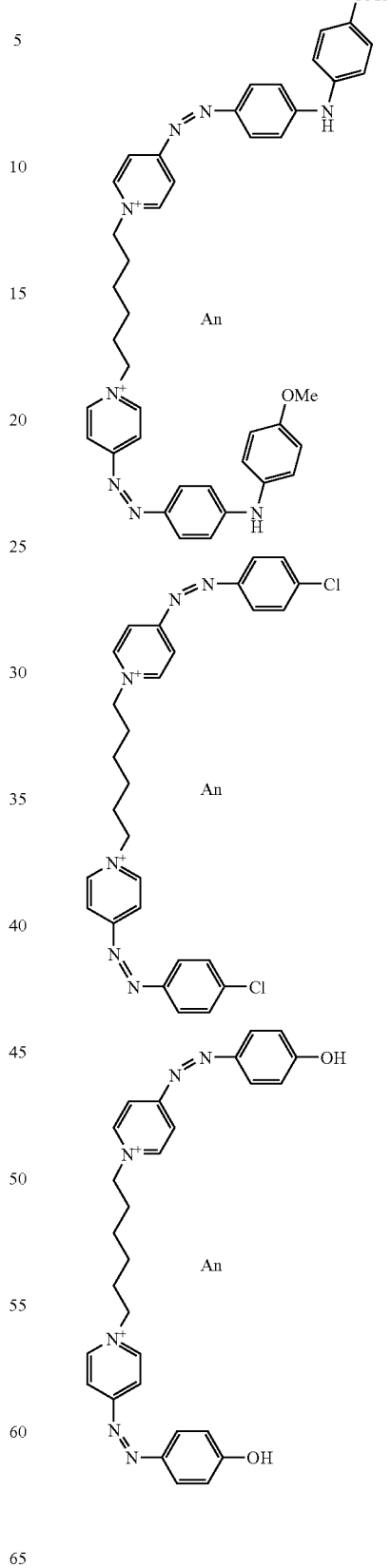

-continued
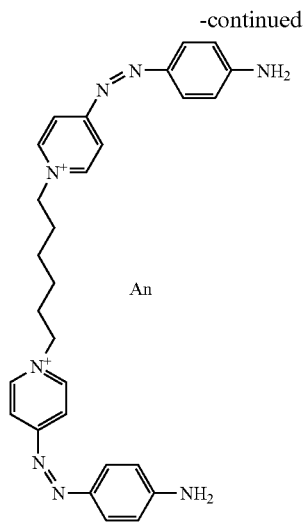
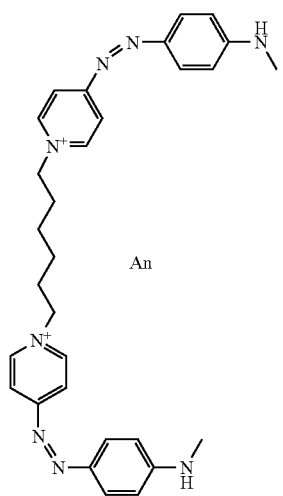
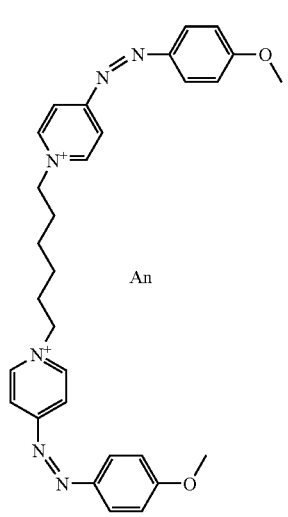
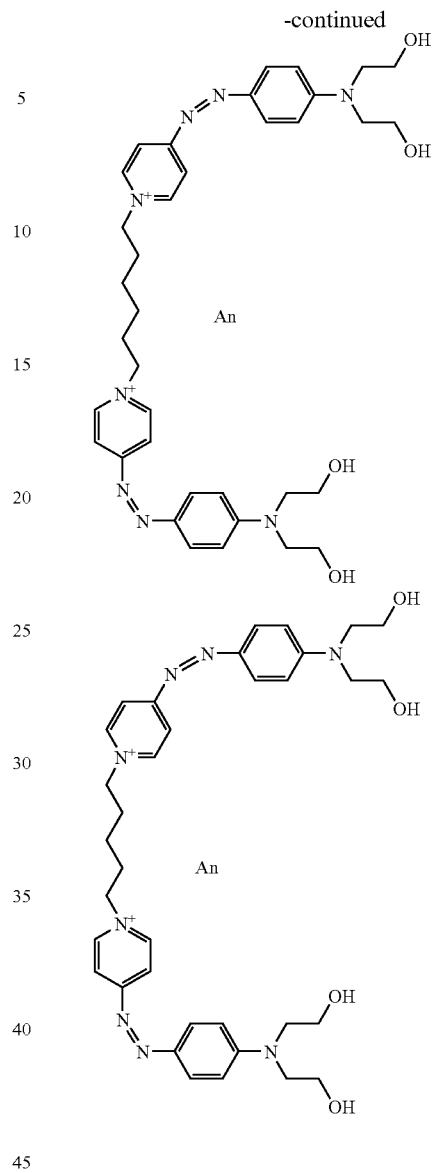
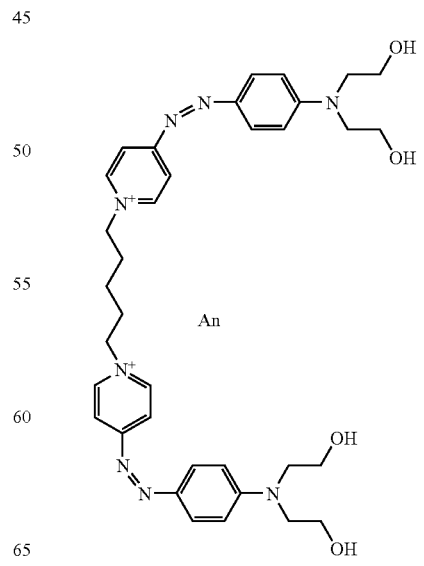

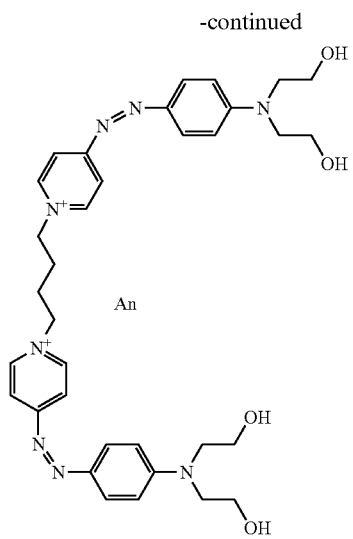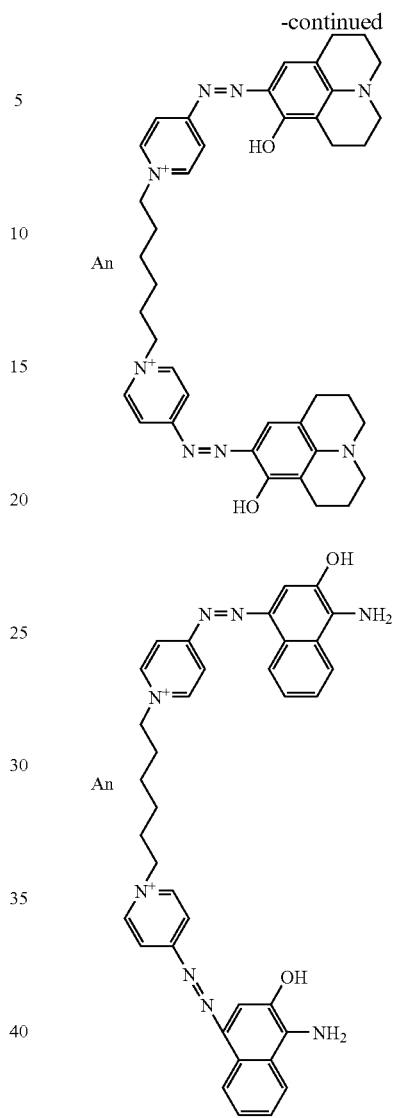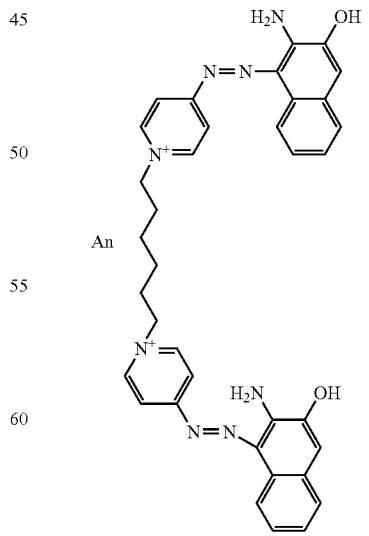

-continued
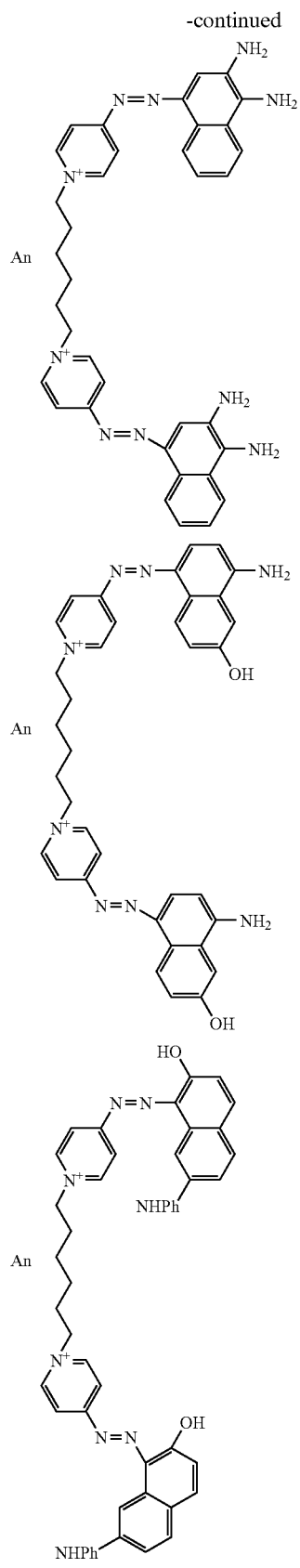
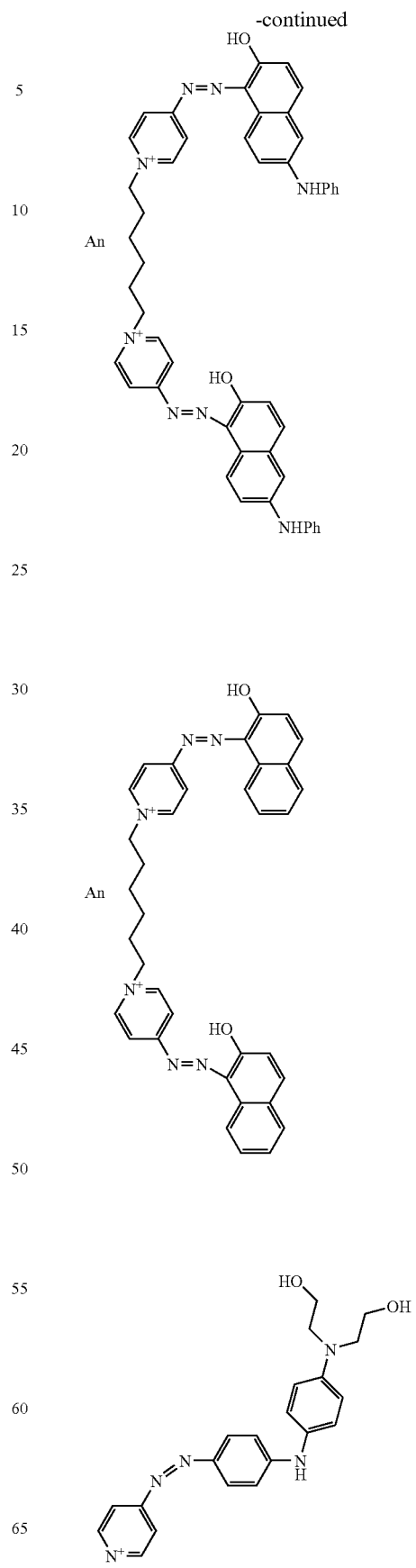

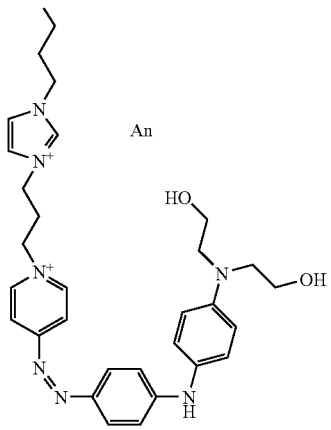
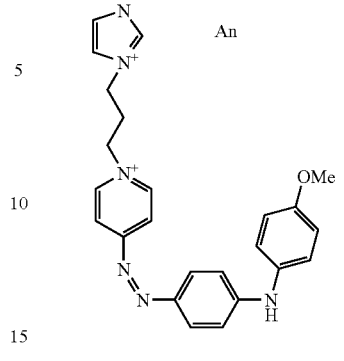
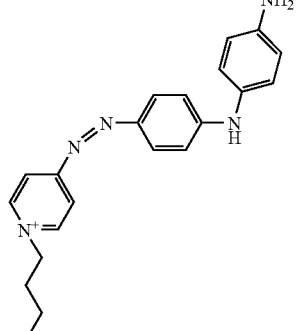
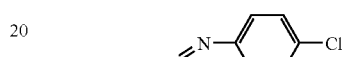
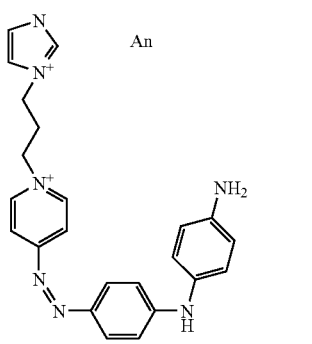
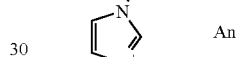
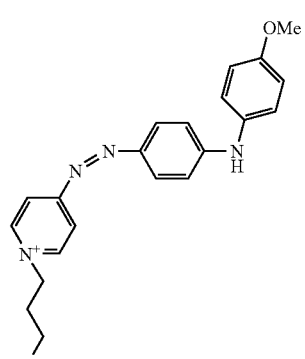
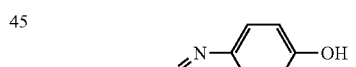
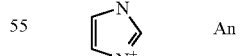
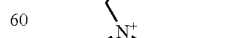
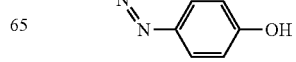

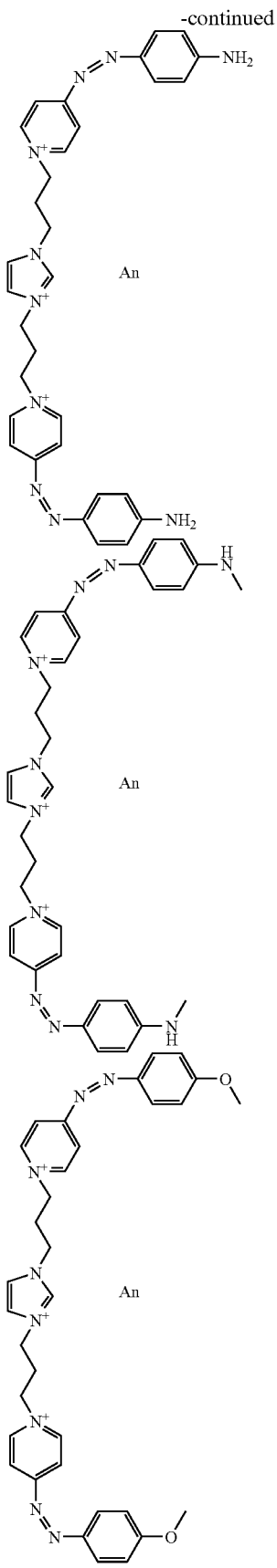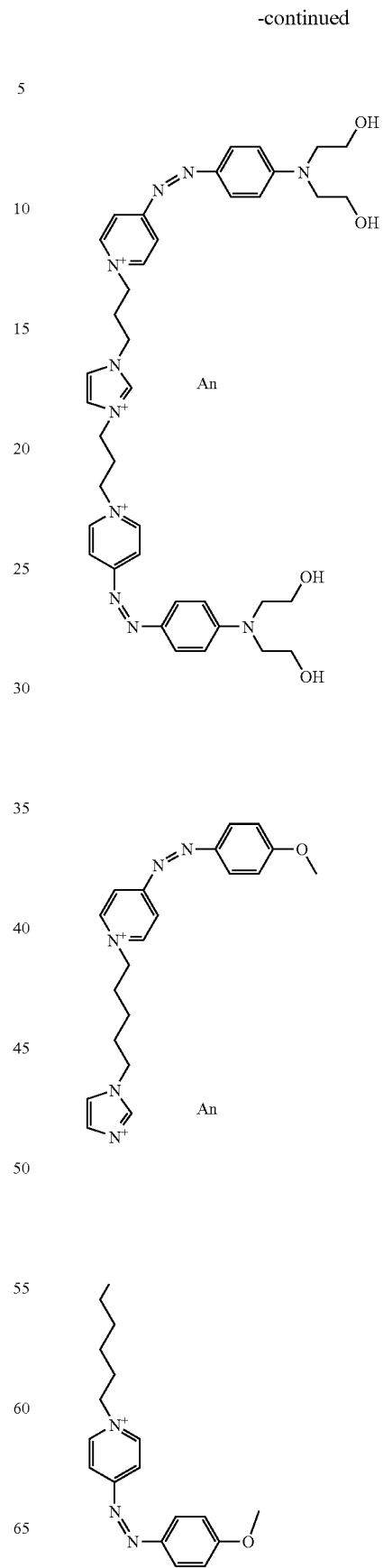

-continued
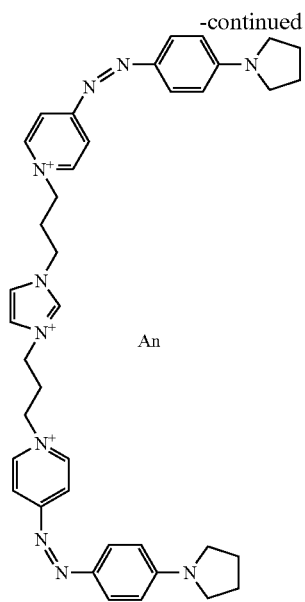
An
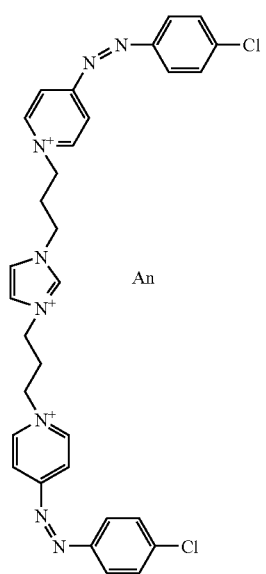
An
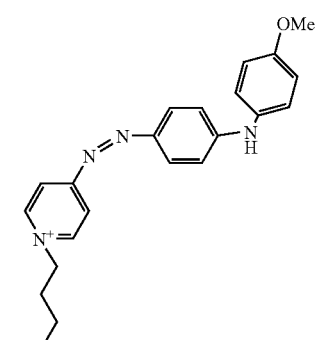
-continued
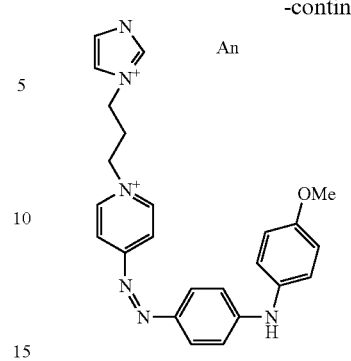
An
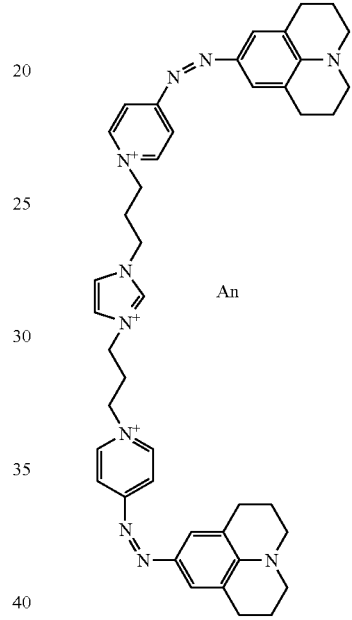
An
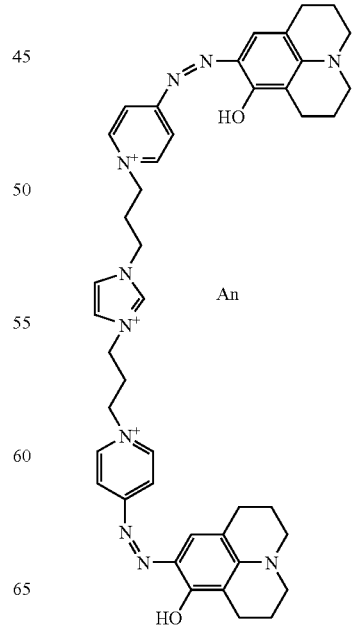
An -continued
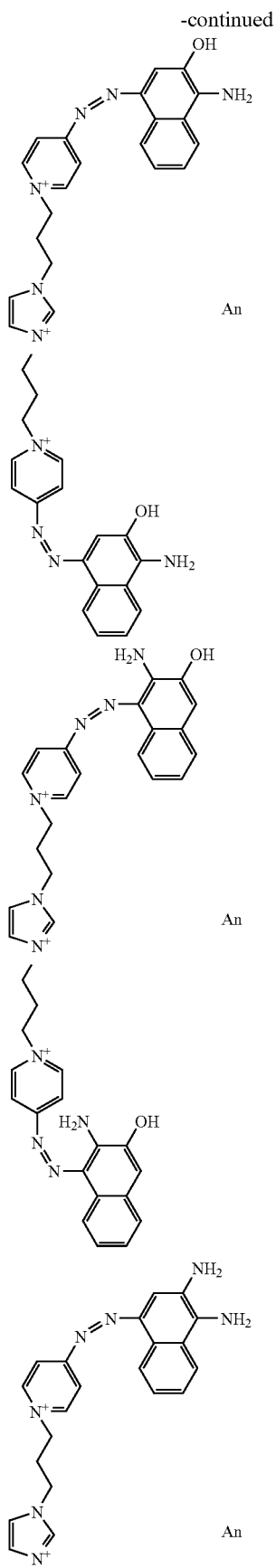
An
An
An
-continued
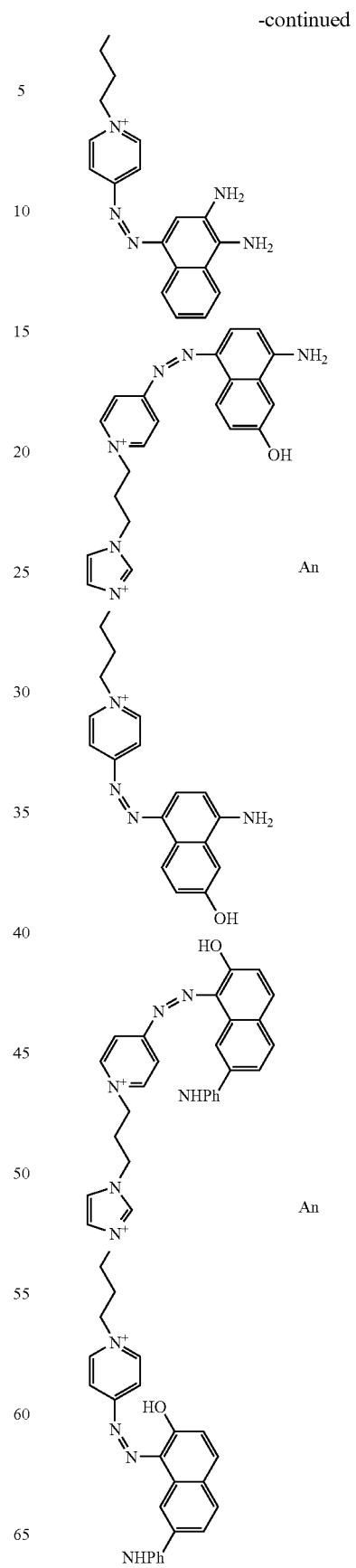
An
An -continued

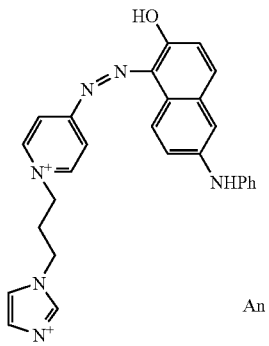

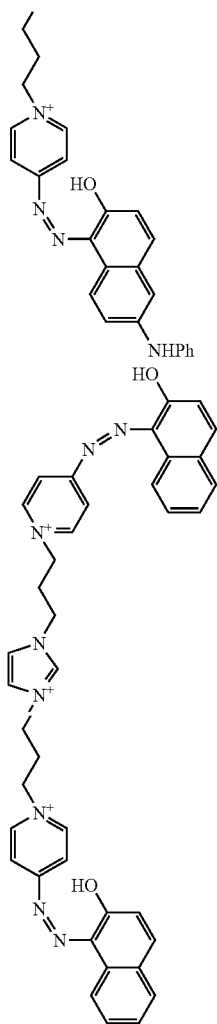

24. A dyeing composition comprising, in a medium appropriate for the dyeing of keratin fibers, as direct dye at least one symmetrical cationic diazo compound chosen from compounds of formula (I), their acid addition salts, and their solvates:

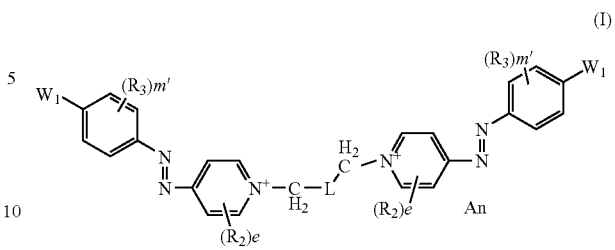

in which:
the radicals $R_2$, which may be identical or different, are independently chosen from:
  optionally substituted $C_1$-$C_{16}$ alkyl radicals optionally interrupted by at least one entity chosen from heteroatoms and groups comprising at least one heteroatom, said alkyl radicals being further optionally substituted by at least one group chosen from thio (—SH), $C_1$-$C_4$ thioalkyl; $C_1$-$C_4$ alkylsulphinyl, and $C_1$-$C_4$ alkylsulphonyl groups;
  hydroxyl groups,
  $C_1$-$C_4$ alkoxy groups,
  $C_2$-$C_4$ (poly)hydroxyalkoxy groups;
  alkoxycarbonyl groups (R"O—CO—) in which R" is chosen from $C_1$-$C_4$ alkyl radicals,
  alkylcarbonyloxy radicals (R"CO—O—) in which R" is chosen from $C_1$-$C_4$ alkyl radicals,
  alkylcarbonyl radicals (R"—CO—) in which R" is chosen from $C_1$-$C_4$ alkyl radicals,
  amino groups,
  amino groups substituted by one or two identical or different $C_1$-$C_4$ alkyl radicals optionally carrying at least one hydroxyl group, it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;
  alkylcarbonylamino groups (R"CO—NR—) in which the radical R" is chosen from $C_1$-$C_4$ alkyl radicals and the radical R is chosen from hydrogen and $C_1$-$C_4$ alkyl radicals;
  aminocarbonyl groups ((R)$_2$N—CO—) in which the radicals R, which may be identical or different, are independently chosen from hydrogen and $C_1$-$C_4$ alkyl radicals;
  ureido groups (N(R)$_2$—CO—NR—) in which the radicals R, which may be identical or different, are independently chosen from hydrogen and $C_1$-$C_4$ alkyl radicals;
  aminosulphonyl groups ((R)$_2$N—SO$_2$—) in which the radicals R, which may be identical or different, are independently chosen from hydrogen and $C_1$-$C_4$ alkyl radicals;
  alkylsulphonylamino groups (R"SO$_2$—NR—) in which R" is chosen from $C_1$-$C_4$ alkyl radicals and R is chosen from hydrogen and $C_1$-$C_4$ alkyl radicals;
  optionally substituted aryl radicals;
  optionally substituted ($C_1$-$C_4$)alkylaryl radicals;
  alkylsulphinyl groups (R"—SO—) in which R" is chosen from $C_1$-$C_4$ alkyl radicals;
  alkylsulphonyl groups (R"—SO$_2$—) in which R" is chosen from $C_1$-$C_4$ alkyl radicals;

nitro groups;
cyano groups;
halogen atoms;
thio groups (HS—); and
alkylthio groups (R"S—) in which the radical R" is chosen from optionally substituted $C_1$-$C_4$ alkyl radicals;

when e is 2, the two radicals $R_2$ may optionally form, together with the carbon atoms to which they are attached, a secondary, aromatic or non-aromatic ring comprising 5 or 6 ring members which is optionally substituted by at least one identical or non-identical group chosen from hydroxyl groups, $C_1$-$C_4$ alkyl groups, $C_1$-$C_4$ alkoxy groups, $C_2$-$C_4$ (poly)hydroxyalkoxy groups, and amino groups, amino substituted by one or two identical or different $C_1$-$C_4$ alkyl radicals which optionally carry at least one hydroxyl group;

e is an integer ranging from 0 to 4; wherein when e is less than 4, the one or more unsubstituted carbon atoms of the heterocycle carry a hydrogen atom, the radicals $R_3$, which may be identical or different, are independently chosen from:
  optionally substituted $C_1$-$C_{16}$ alkyl radicals optionally interrupted by at least one entity chosen from heteroatoms and groups comprising at least one heteroatom,
  hydroxyl groups,
  $C_1$-$C_4$ alkoxy groups,
  $C_2$-$C_4$ (poly)hydroxyalkoxy groups;
  alkoxycarbonyl groups (R"O—CO—) in which R" is chosen from $C_1$-$C_4$ alkyl radicals,
  alkylcarbonyloxy radicals (R"CO—O—) in which R" is chosen from $C_1$-$C_4$ alkyl radicals;
  alkylcarbonyl radicals (R"—CO—) in which R" is chosen from $C_1$-$C_4$ alkyl radicals;
  amino groups;
  amino groups substituted by one or two identical or different $C_1$-$C_4$ alkyl radicals optionally carrying at least one hydroxyl group; it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;
  alkylcarbonylamino groups (R"CO—NR—) in which the radical R" is chosen from $C_1$-$C_4$ alkyl radicals and the radical R is chosen from hydrogen and $C_1$-$C_4$ alkyl radicals;
  aminocarbonyl groups ((R)$_2$N—CO—) in which the radicals R, which may be identical or different, are independently chosen from hydrogen and $C_1$-$C_4$ alkyl radicals;
  ureido groups (N(R)$_2$—CO—NR—) in which the radicals R, which may be identical or different, are independently chosen from hydrogen and $C_1$-$C_4$ alkyl radicals;
  aminosulphonyl groups ((R)$_2$N—SO$_2$—) in which the radicals R, which may be identical or different, are independently chosen from hydrogen and $C_1$-$C_4$ alkyl radicals;
  alkylsulphonylamino groups (RSO$_2$—NR—) in which the radicals R, which may be identical or different, are independently chosen from hydrogen and $C_1$-$C_4$ alkyl radicals;
  thio groups (HS—);
  alkylthio groups (R"S—) in which the radical R" is chosen from $C_1$-$C_4$ alkyl radicals;
  alkylsulphinyl groups (R"—SO—) in which R" is chosen from $C_1$-$C_4$ alkyl radicals;
  alkylsulphonyl groups (R"—SO$_2$—) in which R" is chosen from $C_1$-$C_4$ alkyl radicals;
  nitro groups;
  cyano groups; and
  halogen atoms;

when m' is greater than or equal to 2, two adjacent radicals $R_3$ may form, together with the carbon atoms to which they are attached, a secondary, aromatic or non-aromatic ring comprising 6 ring members, which is optionally substituted by at least one identical or different group chosen from hydroxyl groups, $C_1$-$C_4$ alkyl groups, $C_1$-$C_4$ alkoxy groups, $C_2$-$C_4$ (poly)hydroxyalkoxy groups, $C_1$-$C_4$ alkylcarbonylamino groups, amino groups, amino groups substituted by one or two identical or different $C_1$-$C_4$ alkyl radicals which optionally carry at least one hydroxyl group, m' is an integer ranging from 0 to 4; wherein when m' is less than 4, the one or more unsubstituted carbon atoms of the aromatic ring carry a hydrogen atom;

the radicals $W_1$, which are identical, are chosen from:
  hydrogen,
  halogen atoms chosen from bromine, chlorine, and fluorine, and
  —$NR_5R_6$, $OR_7$, —$NR_4$—Ph—$NR_5R_6$, —$NR_4$—Ph—$OR_7$, —O—Ph—$OR_7$, and —O—Ph—$NR_5R_6$ groups, wherein:
    $R_4$ and $R_7$, which may be identical or different, are independently chosen from hydrogen, optionally substituted $C_1$-$C_{20}$ alkyl radicals, optionally substituted $C_1$-$C_3$ aralkyl radicals, and optionally substituted phenyl radicals;
    $R_5$ and $R_6$, which may be identical or different, are independently chosen from hydrogen, optionally substituted $C_1$-$C_{20}$ alkyl radicals, optionally substituted phenyl radicals, optionally substituted $C_1$-$C_3$ aralkyl radicals, and alkylcarbonyl radicals (R"—CO—) in which R" is chosen from $C_1$-$C_4$ alkyl radicals;
    $R_5$ and $R_6$ may optionally form, together with the nitrogen atom to which they are attached, a heterocycle comprising from 1 to 3 heteroatoms, chosen from N, O, and S, said heterocycle comprising from 5 to 7 ring members, and being saturated or unsaturated, aromatic or non-aromatic, and optionally substituted;
    $R_5$ and $R_6$ may form, together with the carbon atom of the aromatic ring adjacent to that to which —$NR_5R_6$ is attached, a 5- or 6-membered saturated heterocycle; and
    Ph is chosen from optionally substituted phenyl radicals;

L is chosen from cationic linkers and non-cationic linkers; and the electroneutrality of the compound of formula (I) being ensured by at least one identical or non-identical, cosmetically acceptable anion An.

25. The composition of claim 24, wherein the at least one symmetrical cationic diazo compound is present in the dyeing composition in an amount ranging from 0.001% to 20% by weight relative to the total weight of the dyeing composition.

26. The composition of claim 25, wherein the at least one symmetrical cationic diazo compound is present in the dyeing composition in an amount ranging from 0.01% to 10% by weight relative to the total weight of the dyeing composition.

27. The composition of claim 24, further comprising at least one additional direct dye, at least one oxidation base optionally in combination with at least one coupler, and/or mixtures thereof.

28. The composition of claim 27, wherein the at least one additional direct dye is a cationic or nonionic dye chosen from nitrobenzene dyes; azo, azomethine, methine, tetraazapentamethine, anthraquinone, naphthoquinone, benzoquinone, phenothiazine, indigoid, xanthene, phenanthridine, and phthalocyanine dyes; dyes derived from triarylmethane; natural dyes; and mixtures thereof.

29. The composition of claim 27, wherein the at least one oxidation base is chosen from p-phenylenediamines, bisphenylalkylenediamines, o-aminophenols, p-aminophenols, and heterocyclic bases.

30. The composition of claim 27, wherein the at least one coupler is chosen from m-aminophenols, m-phenylenediamines, m-diphenols, naphthols, and heterocyclic couplers.

31. The composition of claim 24, further comprising at least one oxidizing agent.

32. A method for coloring keratin fibers comprising contacting the keratin fibers, which are dry or wet, with a dyeing composition for a time sufficient to give the desired effect, wherein the dyeing composition comprises, in a medium appropriate for the dyeing of keratin fibers, as direct dye at least one symmetrical cationic diazo compound chosen from compounds of formula (I), their acid addition salts, and their solvates:

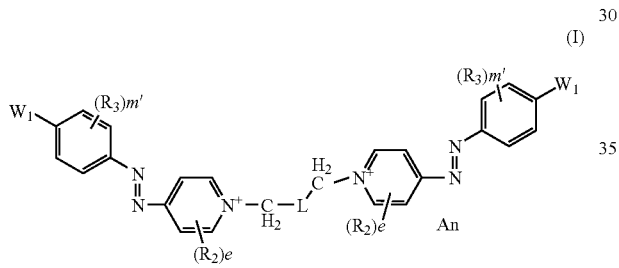

(I)

in which:
the radicals $R_2$, which may be identical or different, are independently chosen from:
optionally substituted $C_1$-$C_{16}$ alkyl radicals optionally interrupted by at least one entity chosen from heteroatoms and groups comprising at least one heteroatom, said alkyl radicals being further optionally substituted by at least one group chosen from thio (—SH), $C_1$-$C_4$ thioalkyl; $C_1$-$C_4$ alkylsulphinyl, and $C_1$-$C_4$ alkylsulphonyl groups;
hydroxyl groups,
$C_1$-$C_4$ alkoxy groups,
$C_2$-$C_4$ (poly)hydroxyalkoxy groups;
alkoxycarbonyl groups (R"O—CO—) in which R" is chosen from $C_1$-$C_4$ alkyl radicals,
alkylcarbonyloxy radicals (R"CO—O—) in which R" is chosen from $C_1$-$C_4$ alkyl radicals,
alkylcarbonyl radicals (R"—CO—) in which R" is chosen from $C_1$-$C_4$ alkyl radicals,
amino groups,
amino groups substituted by one or two identical or different $C_1$-$C_4$ alkyl radicals optionally carrying at least one hydroxyl group, it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;
alkylcarbonylamino groups (R"CO—NR—) in which the radical R" is chosen from $C_1$-$C_4$ alkyl radicals and the radical R is chosen from hydrogen and $C_1$-$C_4$ alkyl radicals;
aminocarbonyl groups ((R)$_2$N—CO—) in which the radicals R, which may be identical or different, are independently chosen from hydrogen and $C_1$-$C_4$ alkyl radicals;
ureido groups (N(R)$_2$—CO—NR—) in which the radicals R, which may be identical or different, are independently chosen from hydrogen and $C_1$-$C_4$ alkyl radicals;
aminosulphonyl groups ((R)$_2$N—SO$_2$—) in which the radicals R, which may be identical or different, are independently chosen from hydrogen and $C_1$-$C_4$ alkyl radicals;
alkylsulphonylamino groups (R"SO$_2$—NR—) in which R" is chosen from $C_1$-$C_4$ alkyl radicals and R is chosen from hydrogen and $C_1$-$C_4$ alkyl radicals;
optionally substituted aryl radicals;
optionally substituted ($C_1$-$C_4$)alkylaryl radicals;
alkylsulphinyl groups (R"—SO—) in which R" is chosen from $C_1$-$C_4$ alkyl radicals;
alkylsulphonyl groups (R"—SO$_2$—) in which R" is chosen from $C_1$-$C_4$ alkyl radicals;
nitro groups;
cyano groups;
halogen atoms;
thio groups (HS—); and
alkylthio groups (R"S—) in which the radical R" is chosen from optionally substituted $C_1$-$C_4$ alkyl radicals;
when e is 2, the two radicals $R_2$ may optionally form, together with the carbon atoms to which they are attached, a secondary, aromatic or non-aromatic ring comprising 5 or 6 ring members which is optionally substituted by at least one identical or non-identical group chosen from hydroxyl groups, $C_1$-$C_4$ alkyl groups, $C_1$-$C_4$ alkoxy groups, $C_2$-$C_4$ (poly)hydroxyalkoxy groups, and amino groups, amino substituted by one or two identical or different $C_1$-$C_4$ alkyl radicals which optionally carry at least one hydroxyl group;
e is an integer ranging from 0 to 4; wherein when e is less than 4, the one or more unsubstituted carbon atoms of the heterocycle carry a hydrogen atom,
the radicals $R_3$, which may be identical or different, are independently chosen from:
optionally substituted $C_1$-$C_{16}$ alkyl radicals optionally interrupted by at least one entity chosen from heteroatoms and groups comprising at least one heteroatom,
hydroxyl groups,
$C_1$-$C_4$ alkoxy groups,
$C_2$-$C_4$ (poly)hydroxyalkoxy groups;
alkoxycarbonyl groups (R"O—CO—) in which R" is chosen from $C_1$-$C_4$ alkyl radicals,
alkylcarbonyloxy radicals (R"CO—O—) in which R" is chosen from $C_1$-$C_4$ alkyl radicals;
alkylcarbonyl radicals (R"—CO—) in which R" is chosen from $C_1$-$C_4$ alkyl radicals;
amino groups;
amino groups substituted by one or two identical or different $C_1$-$C_4$ alkyl radicals optionally carrying at least one hydroxyl group; it being possible for the two alkyl radicals optionally to form, together with the nitrogen atom to which they are attached, a heterocycle comprising from 1 to 3 heteroatoms, chosen from N, O and S, said heterocyle comprising from 5 to 7 ring members, and being saturated or unsaturated, aromatic or non-aromatic, and optionally substituted;

alkylcarbonylamino groups (R"CO—NR—) in which the radical R" is chosen from $C_1$-$C_4$ alkyl radicals and the radical R is chosen from hydrogen and $C_1$-$C_4$ alkyl radicals;

aminocarbonyl groups ((R)$_2$N—CO—) in which the radicals R, which may be identical or different, are independently chosen from hydrogen and $C_1$-$C_4$ alkyl radicals;

ureido groups (N(R)$_2$—CO—NR—) in which the radicals R, which may be identical or different, are independently chosen from hydrogen and $C_1$-$C_4$ alkyl radicals;

aminosulphonyl groups ((R)$_2$N—SO$_2$—) in which the radicals R, which may be identical or different, are independently chosen from hydrogen and $C_1$-$C_4$ alkyl radicals;

alkylsulphonylamino groups (RSO$_2$—NR—) in which the radicals R, which may be identical or different, are independently chosen from hydrogen and $C_1$-$C_4$ alkyl radicals;

thio groups (HS—);

alkylthio groups (R"S—) in which the radical R" is chosen from $C_1$-$C_4$ alkyl radicals;

alkylsulphinyl groups (R"—SO—) in which R" is chosen from $C_1$-$C_4$ alkyl radicals;

alkylsulphonyl groups (R"—SO$_2$—) in which R" is chosen from $C_1$-$C_4$ alkyl radicals;

nitro groups;

cyano groups; and halogen atoms;

when m' is greater than or equal to 2, two adjacent radicals $R_3$ may form, together with the carbon atoms to which they are attached, a secondary, aromatic or non-aromatic ring comprising 6 ring members, which is optionally substituted by at least one identical or different group chosen from hydroxyl groups, $C_1$-$C_4$ alkyl groups, $C_1$-$C_4$ alkoxy groups, $C_2$-$C_4$ (poly)hydroxyalkoxy groups, $C_1$-$C_4$ alkylcarbonylamino groups, amino groups, amino groups substituted by one or two identical or different $C_1$-$C_4$ alkyl radicals which optionally carry at least one hydroxyl group, m' is an integer ranging from 0 to 4; wherein when m' is less than 4, the one or more unsubstituted carbon atoms of the aromatic ring carry a hydrogen atom;

the radicals $W_1$, which are identical, are chosen from:
hydrogen,
halogen atoms chosen from bromine, chlorine, and fluorine, and
—NR$_5$R$_6$, OR$_7$, —NR$_4$—Ph—NR$_5$R$_6$, —NR$_4$—Ph—OR$_7$, —O—Ph—OR$_7$, and —O—Ph—NR$_5$R$_6$ groups, wherein:
$R_4$ and $R_7$, which may be identical or different, are independently chosen from hydrogen, optionally substituted $C_1$-$C_{20}$ alkyl radicals, optionally substituted $C_1$-$C_3$ aralkyl radicals, and optionally substituted phenyl radicals;
$R_5$ and $R_6$, which may be identical or different, are independently chosen from hydrogen, optionally substituted $C_1$-$C_{20}$ alkyl radicals, optionally substituted phenyl radicals, optionally substituted $C_1$-$C_3$ aralkyl radicals, and alkylcarbonyl radicals (R"—CO—) in which R" is chosen from $C_1$-$C_4$ alkyl radicals;

$R_5$ and $R_6$ may optionally form, together with the nitrogen atom to which they are attached, a heterocycle comprising from 1 to 3 heteroatoms, chosen from N, O, and S, said heterocycle comprising from 5 to 7 ring members, and being saturated or unsaturated, aromatic or non-aromatic, and optionally substituted;

$R_5$ and $R_6$ may form, together with the carbon atom of the aromatic ring adjacent to that to which —NR$_5$R$_6$ is attached, a 5- or 6-membered saturated heterocycle; and Ph is chosen from optionally substituted phenyl radicals;

L is chosen from cationic linkers and non-cationic linkers; and the electroneutrality of the compound of formula (I) being ensured by at least one identical or non-identical, cosmetically acceptable anion An.

33. A device having a plurality of compartments, in which a first compartment contains at least one dyeing composition and a second compartment contains at least one oxidizing composition, wherein the dyeing composition comprises, in a medium appropriate for the dyeing of keratin fibers, as direct dye at least one symmetrical cationic diazo compound chosen from compounds of formula (I), their acid addition salts, and their solvates:

(I)

in which:
the radicals $R_2$, which may be identical or different, are independently chosen from:
optionally substituted $C_1$-$C_{16}$ alkyl radicals optionally interrupted by at least one entity chosen from heteroatoms and groups comprising at least one heteroatom, said alkyl radicals being further optionally substituted by at least one group chosen from thio (—SH), $C_1$-$C_4$ thioalkyl; $C_1$-$C_4$ alkylsulphinyl, and $C_1$-$C_4$ alkylsulphonyl groups;

hydroxyl groups, $C_1$-$C_4$ alkoxy groups, $C_2$-$C_4$ (poly)hydroxyalkoxy groups;

alkoxycarbonyl groups (R"O—CO—) in which R" is chosen from $C_1$-$C_4$ alkyl radicals, alkylcarbonyloxy radicals (R"CO—O—) in which R" is chosen from $C_1$-$C_4$ alkyl radicals, alkylcarbonyl radicals (R"—CO—) in which R" is chosen from $C_1$-$C_4$ alkyl radicals, amino groups, amino groups substituted by one or two identical or different $C_1$-$C_4$ alkyl radicals optionally carrying at least one hydroxyl group, it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;

alkylcarbonylamino groups (R"CO—NR—) in which the radical R" is chosen from $C_1$-$C_4$ alkyl radicals and the radical R is chosen from hydrogen and $C_1$-$C_4$ alkyl radicals;

aminocarbonyl groups ((R)$_2$N—CO—) in which the radicals R, which may be identical or different, are independently chosen from hydrogen and $C_1$-$C_4$ alkyl radicals;

ureido groups (N(R)$_2$—CO—NR—) in which the radicals R, which may be identical or different, are independently chosen from hydrogen and $C_1$-$C_4$ alkyl radicals;

aminosulphonyl groups ((R)$_2$N—SO$_2$—) in which the radicals R, which may be identical or different, are independently chosen from hydrogen and $C_1$-$C_4$ alkyl radicals;

alkylsulphonylamino groups (R"SO$_2$—NR—) in which R" is chosen from $C_1$-$C_4$ alkyl radicals and R is chosen from hydrogen and $C_1$-$C_4$ alkyl radicals;

optionally substituted aryl radicals;

optionally substituted ($C_1$-$C_4$)alkylaryl radicals;

alkylsulphinyl groups (R"—SO—) in which R" is chosen from $C_1$-$C_4$ alkyl radicals;

alkylsulphonyl groups (R"—SO$_2$—) in which R" is chosen from $C_1$-$C_4$ alkyl radicals;

nitro groups;

cyano groups;

halogen atoms;

thio groups (HS—); and alkylthio groups (R"S—) in which the radical R" is chosen from optionally substituted $C_1$-$C_4$ alkyl radicals;

when e is 2, the two radicals $R_2$ may optionally form, together with the carbon atoms to which they are attached, a secondary, aromatic or non-aromatic ring comprising 5 or 6 ring members which is optionally substituted by at least one identical or non-identical group chosen from hydroxyl groups, $C_1$-$C_4$ alkyl groups, $C_1$-$C_4$ alkoxy groups, $C_2$-$C_4$ (poly)hydroxyalkoxy groups, and amino groups, amino substituted by one or two identical or different $C_1$-$C_4$ alkyl radicals which optionally carry at least one hydroxyl group;

e is an integer ranging from 0 to 4; wherein when e is less than 4, the one or more unsubstituted carbon atoms of the heterocycle carry a hydrogen atom, the radicals $R_3$, which may be identical or different, are independently chosen from:

optionally substituted $C_1$-$C_{16}$ alkyl radicals optionally interrupted by at least one entity chosen from heteroatoms and groups comprising at least one heteroatom, hydroxyl groups, $C_1$-$C_4$ alkoxy groups, $C_2$-$C_4$ (poly)hydroxyalkoxy groups;

alkoxycarbonyl groups (R"O—CO—) in which R" is chosen from $C_1$-$C_4$ alkyl radicals, alkylcarbonyloxy radicals (R"CO—O—) in which R" is chosen from $C_1$-$C_4$ alkyl radicals;

alkylcarbonyl radicals (R"—CO—) in which R" is chosen from $C_1$-$C_4$ alkyl radicals;

amino groups;

amino groups substituted by one or two identical or different $C_1$-$C_4$ alkyl radicals optionally carrying at least one hydroxyl group; it being possible for the two alkyl radicals optionally to form, together with the nitrogen atom to which they are attached, a heterocycle comprising from 1 to 3 heteroatoms, chosen from N, O and S, said heterocycle comprising from 5 to 7 ring members, and being saturated or unsaturated, aromatic or non-aromatic, and optionally substituted;

alkylcarbonylamino groups (R"CO—NR—) in which the radical R" is chosen from $C_1$-$C_4$ alkyl radicals and the radical R is chosen from hydrogen and $C_1$-$C_4$ alkyl radicals;

aminocarbonyl groups ((R)$_2$N—CO—) in which the radicals R, which may be identical or different, are independently chosen from hydrogen and $C_1$-$C_4$ alkyl radicals;

ureido groups (N(R)$_2$—CO—NR—) in which the radicals R, which may be identical or different, are independently chosen from hydrogen and $C_1$-$C_4$ alkyl radicals;

aminosulphonyl groups ((R)$_2$N—SO$_2$—) in which the radicals R, which may be identical or different, are independently chosen from hydrogen and $C_1$-$C_4$ alkyl radicals;

alkylsulphonylamino groups (RSO$_2$—NR—) in which the radicals R, which may be identical or different, are independently chosen from hydrogen and $C_1$-$C_4$ alkyl radicals;

thio groups (HS—);

alkylthio groups (R"S—) in which the radical R" is chosen from $C_1$-$C_4$ alkyl radicals;

alkylsulphinyl groups (R"—SO—) in which R" is chosen from $C_1$-$C_4$ alkyl radicals;

alkylsulphonyl groups (R"—SO$_2$—) in which R" is chosen from $C_1$-$C_4$ alkyl radicals;

nitro groups;

cyano groups; and halogen atoms;

when m' is greater than or equal to 2, two adjacent radicals $R_3$ may form, together with the carbon atoms to which they are attached, a secondary, aromatic or non-aromatic ring comprising 6 ring members, which is optionally substituted by at least one identical or different group chosen from hydroxyl groups, $C_1$-$C_4$ alkyl groups, $C_1$-$C_4$ alkoxy groups, $C_2$-$C_4$ (poly)hydroxyalkoxy groups, $C_1$-$C_4$ alkylcarbonylamino groups, amino groups, amino groups substituted by one or two identical or different $C_1$-$C_4$ alkyl radicals which optionally carry at least one hydroxyl group, m' is an integer ranging from 0 to 4; wherein when m' is less than 4, the one or more unsubstituted carbon atoms of the aromatic ring carry a hydrogen atom;

the radicals $W_1$, which are identical, are chosen from:

hydrogen, halogen atoms chosen from bromine, chlorine, and fluorine, and

—NR$_5$R$_6$, OR$_7$, —NR$_4$—Ph—NR$_5$R$_6$, —NR$_4$—Ph—OR$_7$, —O—Ph—OR$_7$, and —O—Ph—NR$_5$R$_6$ groups, wherein:

$R_4$ and $R_7$, which may be identical or different, are independently chosen from hydrogen, optionally substituted $C_1$-$C_{20}$ alkyl radicals, optionally substituted $C_1$-$C_3$ aralkyl radicals, and optionally substituted phenyl radicals;

$R_5$ and $R_6$, which may be identical or different, are independently chosen from hydrogen, optionally substituted $C_1$-$C_{20}$ alkyl radicals, optionally substituted phenyl radicals, optionally substituted $C_1$-$C_3$ aralkyl radicals, and alkylcarbonyl radicals (R"—CO—) in which R" is chosen from $C_1$-$C_4$ alkyl radicals;

$R_5$ and $R_6$ may optionally form, together with the nitrogen atom to which they are attached, a heterocycle comprising from 1 to 3 heteroatoms, chosen from N, O, and S, said heterocycle comprising from 5 to 7 ring members, and being saturated or unsaturated, aromatic or non-aromatic, and optionally substituted;

$R_5$ and $R_6$ may form, together with the carbon atom of the aromatic ring adjacent to that to which —$NR_5R_6$ is attached, a 5- or 6-membered saturated heterocycle; and Ph is chosen from optionally substituted phenyl radicals;

L is chosen from cationic linkers and non-cationic linkers; and the electroneutrality of the compound of formula (I) being ensured by at least one identical or non-identical, cosmetically acceptable anion An.

* * * * *